(12) United States Patent
Atarashi et al.

(10) Patent No.: US 8,107,411 B2
(45) Date of Patent: Jan. 31, 2012

(54) MOBILE STATION CAPABLE OF AND A METHOD FOR GENERATING CHIP PATTERNS FOR TRANSMISSION

(75) Inventors: Hiroyuki Atarashi, Yokohama (JP); Mamoru Sawahashi, Yokohama (JP); Teruo Kawamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 903 days.

(21) Appl. No.: 12/115,919

(22) Filed: May 6, 2008

(65) Prior Publication Data
US 2008/0225820 A1 Sep. 18, 2008

Related U.S. Application Data

(62) Division of application No. 10/771,549, filed on Feb. 5, 2004, now Pat. No. 7,372,889.

(30) Foreign Application Priority Data

Feb. 6, 2003 (JP) ................................. 2003-029883
Jul. 14, 2003 (JP) ................................. 2003-196748

(51) Int. Cl.
*H04B 7/216* (2006.01)
*H04B 7/212* (2006.01)

(52) U.S. Cl. ........................................ 370/320; 370/321

(58) Field of Classification Search .................... 370/320
See application file for complete search history.

(56) References Cited

U.S. PATENT DOCUMENTS

| | | | |
|---|---|---|---|
| 5,583,853 A * | 12/1996 | Giallorenzi et al. ......... 370/441 |
| 5,930,230 A | 7/1999 | Odenwalder et al. |
| 6,366,601 B1 | 4/2002 | Ghosh et al. |
| 6,708,041 B1 * | 3/2004 | Butovitsch et al. ........... 455/522 |
| 6,741,614 B1 * | 5/2004 | Porter et al. .................. 370/508 |
| 6,963,600 B1 * | 11/2005 | Fan et al. ....................... 375/141 |
| 7,593,367 B2 * | 9/2009 | Amerga et al. ............... 370/332 |
| 7,813,703 B2 * | 10/2010 | Niwano ..................... 455/67.11 |
| 2001/0028637 A1 * | 10/2001 | Abeta et al. .................. 370/335 |
| 2002/0118765 A1 | 8/2002 | Nangia et al. |
| 2002/0172180 A1 | 11/2002 | Hall et al. |
| 2003/0053413 A1 | 3/2003 | Sawahashi et al. |
| 2004/0008614 A1 | 1/2004 | Matsuoka et al. |

(Continued)

FOREIGN PATENT DOCUMENTS

EP 1 009 110 A2 6/2000

(Continued)

OTHER PUBLICATIONS

M. Schnell, et al., Universal Personal Communicatons ICUPC IEEE 1998 International Conference, XP-010314992, pp. 1267-1272, "Application of IFDMA to Mobile Radio Transmission", Oct. 5, 1998.

(Continued)

*Primary Examiner* — Jeffrey Pwu
*Assistant Examiner* — Shaq Taha
(74) *Attorney, Agent, or Firm* — Oblon, Spivak, McClelland, Maier & Neustadt, L.L.P.

(57) ABSTRACT

A mobile station for wirelessly transmitting to a base station by DS-CDMA a signal which is spread by multiplying a spreading code includes a high-precision transmission timing control unit configured to control transmitting timings of transmitting signals so that a time difference at the base station among timings of receiving from a plurality of mobile stations approaches zero.

10 Claims, 45 Drawing Sheets

U.S. PATENT DOCUMENTS

| | | |
|---|---|---|
| 2004/0085918 A1 | 5/2004 | Shamsunder |
| 2004/0120274 A1* | 6/2004 | Petre et al. .................. 370/320 |

FOREIGN PATENT DOCUMENTS

| | | |
|---|---|---|
| JP | 10-28077 | 1/1998 |
| JP | 10-98444 | 4/1998 |
| JP | 2002-232396 | 8/2002 |
| JP | 2002-539736 | 11/2002 |
| TW | 357503 | 5/1999 |
| WO | WO 00/56107 | 9/2000 |
| WO | WO 02/060073 A2 | 8/2002 |

OTHER PUBLICATIONS

Een-Kee Hong, et al., "Synchronous Transmission Technique for the Reverse Link in DS-CDMA Terrestrial Mobile Systems", IEEE Transactions on Communications, vol. 47, No. 11, XP-002316257, Nov. 1999, pp. 1632-1635.

Hiroyuki Atarashi, et al., "Broadband Packet Wireless Access Based on VSF-OFCDM and MC/DS-CDMA", IEEE, 'Online!, 2002, XP-002316258, pp. 1-6.

Michael Schnell, et al., "A Promising New Wideband Multiple-Access Scheme for Future Mobile Communications Systems", European Transactions on Telecommunications, Eurel Publication, vol. 10, No. 4, XP-000866694, Jul. 1999, pp. 417-427.

Ivan Cosovic, et al., "Time Division Duplex MC-CDMA for Next Generation Mobile Radio Systems", 10$^{th}$ Telecommunications forum TELFOR'2002, XP-002316259, Nov. 26-28, 2002, pp. 1-5.

E. Haas, et al., "Development and Implementation of an Advanced Airport Data Link Based on Multi-Carrier Communications", IEEE, 'Online!, XP-002316260, Sep. 5, 2002, pp. 373-379.

Yoshikazu Goto, et al., "Variable Spreading and Chip Repetition Factors (VSCRF)-CDMA in Reverse Link for Broadband Wireless Acces", The 14$^{th}$ IEEE 2003 International Symposium on Personal, Indoor and Mobile Radio Communications Proceedings, 2003, vol. 1, XP-010681596, Sep. 2003, pp. 254-259.

Hiroyuki Atarashi, et al., "Broadband Packet Wireless Access and Its Experiments", International Forum on 4$^{th}$ generation Mobile Communications, XP-002316261, May 27, 2003, pp. 1-34.

* cited by examiner

FIG.43A RELATED ART
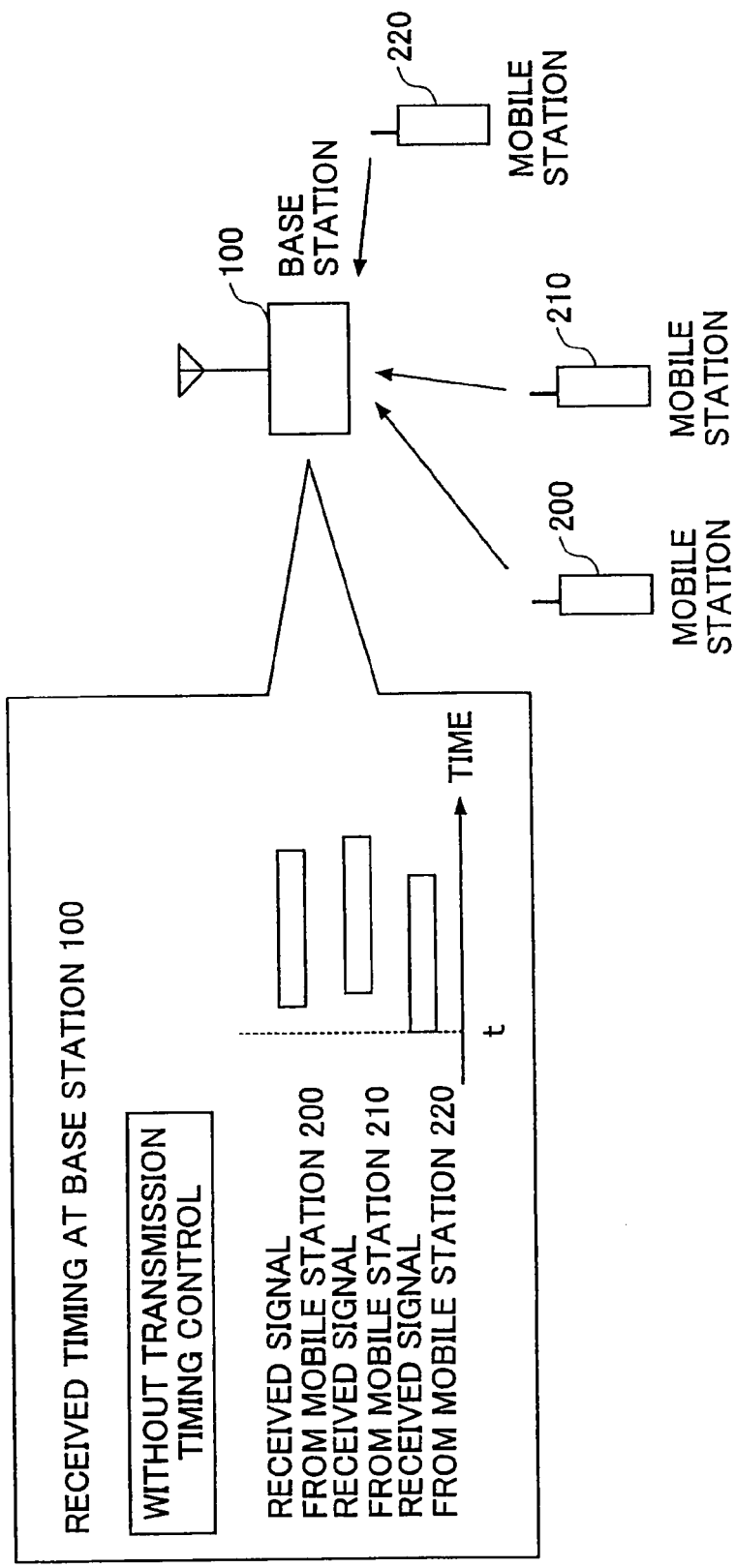

MOBILE STATION CAPABLE OF AND A METHOD FOR GENERATING CHIP PATTERNS FOR TRANSMISSION

CROSS REFERENCE TO RELATED APPLICATIONS

This application is a divisional of U.S. application Ser. No. 10/771,549, filed Feb. 5, 2004, and is based upon and claims the benefit of priority from the prior Japanese Patent Application Nos. 2003-196748 filed on Jul. 14, 2003, and 2003-029883 filed on Feb. 6, 2003, the entire contents of each of which are incorporated herein by reference.

BACKGROUND OF THE INVENTION

1. Field of the Invention

The present invention generally relates to a technology for wireless transmission, and particularly relates to a mobile station, a base station, and a program for and a method of wireless transmission.

2. Description of the Related Art

The development of a fourth-generation mobile communications method, which is the next-generation mobile communications method beyond IMT-2000 (International Mobile Telecommunications-2000), has been underway. A fourth-generation mobile communications method flexibly supporting a multi-cell environment including a cellular system, as well as an isolated cell environment such as a hot-spot area and an indoor environment so as to seek a further increase in spectral usage efficiency at the respective cell environments, is being desired.

As a candidate wireless access method in the fourth-generation mobile communications which is applied to a link from a mobile station to a base station (referred to as an uplink below), DS-CDMA (Direct Sequence-Code Division Multiple Access) is considered to be promising from the point of view that it is particularly suitable for the cellular system. DS-CDMA multiplies to a transmitting signal a spreading code so as to spread to a wideband signal for transmission (refer to below-identified Non-Patent Document 1, for example).

Reasons that DS-CDMA is suitable for the multi-cell environment including the cellular system are described below.

First, a suppression of the peak-to-average power ratio to a low level relative to a wireless access method using a large number of sub-carriers such as OFDM (Orthogonal Frequency Division Multiplexing) and MC-CDMA (Multi-Carrier-Code Division Multiple Access) is enabled. Therefore, it is easy to implement a reduced power consumption which is one of the important desired conditions for the mobile station.

Second, while there is potential for a reduction in a required transmitting power by a coherent-detection using dedicated pilot channels, assuming that power levels of the pilot channels are the same, DS-CDMA relative to such methods as OFDM and MC-CDMA has a larger pilot-channel power per carrier. Therefore, an accurate channel estimation so as to suppress the required transmitting power to a low level is enabled.

Third, in the multi-cell environment, even when using carriers having the same frequency in neighboring cells, DS-CDMA enables a suppression in interference from the neighboring cells (referred to as "other-cell interference" below) due to a spreading gain obtained by spreading. Therefore, an easy implementation of one-cell frequency reuse which allocates all available spectral bands to the respective cells is enabled. Therefore, relative to TDMA (Time Division Multiple Access) which divides all available spectral bands so as to allocate different spectral bands to the respective cells, an increase in the spectral usage efficiency is enabled.

However, as DS-CDMA is a wireless access method suitable in the multi-cell environment, there is a problem as described below as a cause for concern. In other words, in the isolated cell environment such as the hot spot area and the indoor environment in which an effect of other-cell interference is usually small, the advantage of reducing other-cell interference by spreading is low. Therefore, in DS-CDMA, a large number of signals of simultaneously accessing mobile stations need to be accommodated in order to achieve the same level of spectral usage efficiency as in TDMA.

For example, when the respective mobile stations transmit transmitting signals having multiplied spreading codes with spreading factor of SF, the transmission data rate becomes 1/SF so that with DS-CDMA there is a need to accommodate the signals from SF mobile stations in order to achieve the same level of spectral usage efficiency as TDMA. However, in an actual uplink wireless propagation environment, an effect of Multiple-Access Interference (MAI) in which the signals from the respective mobile stations interfere with one another due to differences in condition of propagation from the respective mobile stations to the base station (for instance, propagation delay time, change of propagation channel) becomes predominant. As a result, the spectral usage efficiency normalized by the spreading factor as described above is reduced to about 20-30 percent.

On the other hand, IFDMA (Interleaved Frequency Division Multiple Access) is being studied as a wireless access method which enables a reduction of the MAI as described above (for example, refer to below-identified Non-Patent Document 2). IFDMA applies a symbol repetition to a data symbol so as to perform a sorting to generate a predetermined symbol pattern and to multiply a mobile station-specific phase to a transmitting signal for transmission. IFDMA reduces the MAI as the generation of the predetermined symbol pattern and the multiplying of the mobile station-specific phase set the signals from the respective mobile station to be arranged on the frequency axis without overlapping one another.

Furthermore, a study of a transmission timing control as another method of reducing such MAI so as to improve the spectral usage efficiency is underway (for example, refer to below-identified Non-Patent Document 3). FIG. 43A and FIG. 43B are diagrams which respectively illustrate time charts for a case of applying a transmission timing control in an uplink and for a case of not applying such control according to the related art. As illustrated in the case of FIG. 43A in which a transmission timing control is not applied, the signals transmitted from the respective receivers 200 through 220 have non-coincident received timings at the base station 100 due to the different delay times of propagation to the base station 100. Therefore, with the transmission timing control, the transmitting timings of the respective mobile stations 200 through 220 are controlled so that the respective signals transmitted from the respective mobile stations 200 through 220 are received at the same timing at the base station 100. Such performing of transmission timing control enables reception of signals at the base station 100 from the respective mobile stations 200 through 220 at the same time (refer to FIG. 43B). When using at this time orthogonal code as spreading code, the received signals from the different respective mobile stations at such timing are orthogonal to one another so as to reduce the MAI. Hereby, improvement in the spectral usage efficiency is enabled.

Furthermore, a study of a technology which suppresses, for a received signal affected by multi-path interference, multi-path interference by signal processing at the receiver is underway. A multi-path interference canceller (for example, refer to below-identified Non-Patent Document 4) as illustrated in FIG. 44, a chip equalizer (for example, refer to below-identified Non-Patent Document 5) as illustrated in FIG. 45, and a frequency-domain equalizer (for example, refer to below-identified Non-Patent Document 6) as illustrated in FIG. 46 are representative examples.

The multi-path interference canceller as illustrated in FIG. 44 estimates and generates at a multi-path interference signal estimator 351 a signal component causing multi-path interference (referred to as a multi-path replica below) and subtracts the estimated multi-path interference replica as described above from a received signal. Hereby, a reproduction of a received signal having a reduced multi-path interference effect is enabled.

The chip equalizer as illustrated in FIG. 45 generates at a channel-matrix generator 361 a channel matrix which shows the amount of change through a propagation channel of a received signal so as to derive from the matrix at a weighting factor estimator 362 a weighting factor which reduces multi-path interference from the matrix and to multiply at the chip equalizer 363 the weighting factor as described above and the received signal (this operation is referred to as an chip equalization). Hereby, a reduction of an effect of multi-path interference is enabled.

The frequency-domain equalizer as illustrated in FIG. 46 converts a received signal at a time-to-frequency converter 371 into a frequency-domain signal so as to then derive at a weighting-factor estimator 372 a weighting factor which reduces multi-path interference, and to multiply at the frequency-domain equalizer 373 a weighting factor to the received frequency-domain signal so as to convert to the time domain at the frequency-to-time converter 374. The performing of such operations enables a reducing of the effect of multi-path interference.

Non-Patent Document 1
H. Atarashi, S. Abeta, and M. Sawahashi, "Broadband packet wireless access appropriate for high-speed and high-capacity throughput," IEEE VTC2001-Spring, pp. 566-570, May 2001

Non-Patent Document 2
M. Schnell, I. Broek, and U. Sorger, "A promising new wideband multiple-access scheme for future mobile communication systems," European Trans. on Telecommun. (ETT), Vol. 10, No. 4, pp. 417-427, July/August 1999

Non-Patent Document 3
Een-Kee Hong, Seung-Hoon Hwang, and Keum-Chan Whang, "Synchronous transmission technique for the reverse link in DS-CDMA terrestrial mobile systems," pp. 1632-1635, Vol. 46, No. 11, IEEE Trans. on Commun., November, 1999

Non-Patent Document 4
Kenichi Higuchi, Akihiro Fujimura, and Mamoru Sawahashi, "Multi-path Interference Canceller for High-Speed Packet Transmission With Adaptive Modulation and Coding Scheme in W-CDMA Forward Link," IEEE Selected Area Communications, Vol. 20, No. 2, February 2002

Non-Patent Document 5
A. Klein, "Data detection algorithms specially designed for the downlink of CDMA mobile radio systems", in Proc. IEEE VTC'97, pp. 203-207, May 1997

Non-Patent Document 6
D. Falconer, SL Ariyavisitakul, A. Benyamin-Seeyar, and B. Eidson, "Frequency domain equalization for single-carrier broadband wireless systems", IEEE Commun. Mag., Vol. 40, No. 4, pp. 58-66, April 2002.

However, because there is no spreading gain in IFDMA, it is necessary to divide all available spectral bands so as to allocate different spectral bands to the respective cells. Therefore, even when adopting such wireless access method, it is difficult to seek an increase in the spectral usage efficiency in both the multi-cell environment and the isolated cell environment. The increase in the spectral usage efficiency increases the number of mobile stations which can be accommodated in the base station at the respective cells so as to achieve an increased communications-link capacity.

Furthermore, as the related-art technologies as described above are technologies concerning single elements within a wireless transmission system, in order to actually build a wireless transmission system, a study on a specific configuration of a base station and a mobile station as well as on an overall configuration and also on a specific controlling method of these single-element technologies is needed.

However, as a sufficient study concerning the points as described above has not been performed to date, there is a demand for a specific configuration of a base station and a mobile station.

SUMMARY OF THE INVENTION

It is a general object of the present invention to provide a wireless transmission, a mobile station, a base station, a program for, and a method of a wireless transmission that substantially obviate one or more problems caused by the limitations and disadvantages of the related art.

In light of the problems as described above, it is a more particular object of the present invention to provide a mobile station, a base station, a program for and a method of a wireless transmission that achieves an increased capacity of a communications link in both cell environments as described above for conducting communications by DS-CDMA. Furthermore, the present invention relates to a mobile station, a base station, a program for, and a method of a wireless transmission which achieves improvement in the spectral usage efficiency, for example, in an isolated cell environment as the increased capacity is achieved by one-cell reuse.

According to the invention, a mobile station which wirelessly transmits to a base station by DS-CDMA a signal which is spread by multiplying a spreading code includes a chip-pattern generating unit which generates a predetermined chip pattern by performing a chip repetition for a predetermined number of repetitions to a spreading chip sequence, and a multiplying unit which multiplies to a signal including the predetermined chip pattern which is generated by the generating unit a phase specific to the mobile station.

A mobile station in an embodiment of the invention enables a reduction in transmitting signals interfering with one another, as the frequency spectrums of the respective mobile stations are frequency-domain orthogonal even in a case of multiple mobile stations simultaneously connecting to the same base station. Such reduction of multiple-access interference increases the spectral usage efficiency in an isolated cell environment in which an effect of such interference is dominant so as to achieve an increased link capacity. As a result, when communicating by DS-CDMA, an applying of one-cell frequency reuse using only spreading not using chip repetition and also an applying of chip repetition in an isolated cell environment enables an implementation of an increased link capacity in both cell environments.

According to another aspect of the invention, a mobile station which wirelessly transmits to a base station by DS-CDMA a signal which is spread by multiplying a spreading code includes a high-precision transmission timing control unit which controls transmitting timings of transmitting signals so that a time difference at the base station among timings of receiving from mobile stations approaches zero.

A mobile station according to an embodiment of the invention enables an increased link capacity without having to set at the mobile station individual wireless interfaces for the respective cell environments by setting the wireless parameters of the spreading factor of the spreading code and the number of chip repetition to change. Furthermore, the spreading factor of the spreading code and the number of chip repetition may be variably controlled based on a set of controlling information from a source external to the mobile stations (such as the base stations and the networks which the mobile stations are connecting). A mobile station is enabled an applying of one-cell frequency reuse in DS-CDMA and a setting of the optimal spreading factor and the number of chip repetitions which take into account such effects as the reduction of MAI by chip repetition. An increase in the spectral usage efficiency so as to implement an increased link capacity is enabled. Furthermore, a switching of cell-specific or user-specific scrambling codes, and mobile station-specific phase sequences based on the set of information from the external source is enabled. The spectral usage efficiency is enabled so as to implement an increased capacity.

According to another aspect of the invention, a base station which is enabled to communicate with a mobile station includes a controlling-information transmitting unit which transmits to the mobile station as a set of controlling information, an information set indicating an environment of a cell which is resided by the mobile station, or an information set indicating the power of interference from surrounding cells, or an information set indicating a propagation channel condition, and a receiving unit which receives a signal which is transmitted from the mobile station, based on the set of controlling information, via a variably-controlling process of a spreading factor and the number of chip repetitions.

A base station in an embodiment of the invention enables a receiving of controlling information from the base station or the network connecting to the base station so as to variably control the spreading factor and the number of chip repetitions based on the controlling information. Furthermore, the base station is enabled a receiving of the transmitting signals from the mobile stations which have undergone the variably-controlling process.

According to another aspect of the invention, a program for wireless transmission, implements in a mobile station which wirelessly transmits to a base station by DS-CDMA a spreading signal multiplied by a spreading code, a chip-pattern generating function of generating a predetermined chip pattern by performing a chip repetition for a predetermined number of repetitions to a spreading chip sequence, and a multiplying function of multiplying to a signal including the predetermined chip pattern which is generated by the chip-pattern generating function a phase specific to the mobile station.

A program for wireless transmission in an embodiment of the invention enables a reduction in transmitting signals interfering with one another as the frequency spectrums of the respective mobile stations are frequency-domain orthogonal even in a case of multiple mobile stations simultaneously connecting to the same base station. Such reduction of multiple-access interference increases the spectral usage efficiency in an isolated cell environment in which an effect of such interference is dominant so as to achieve an increased link capacity. As a result, when communicating by DS-CDMA, an applying of one-cell frequency reuse using only spreading not using chip repetitions and also an applying of chip repetitions in an isolated cell environment enables an implementation of an increased link capacity in both cell environments.

According to another aspect of the invention, a method of wireless transmission, wherein a mobile station which wirelessly transmits to a base station by DS-CDMA a signal which is spread by multiplying a spreading code, includes a chip-pattern generating step of generating a predetermined chip pattern by performing a chip repetition for a predetermined number of repetitions to a spreading chip sequence, and a multiplying step of multiplying to a signal including the predetermined chip pattern which is generated by the generating step a phase specific to the mobile station.

A method of wireless transmission in an embodiment of the invention enables a reduction in transmitting signals interfering with one another as the frequency spectrums of the respective mobile stations are frequency-domain orthogonal even in a case of multiple mobile stations simultaneously connecting to the same base station. Such reduction of multiple-access interference increases the spectral usage efficiency in an isolated cell environment in which an effect of such interference is dominant so as to achieve an increased link capacity. As a result, when communicating by DS-CDMA, an applying of one-cell frequency reuse using only spreading not using chip repetitions and also an applying of chip repetitions in an isolated cell environment enables an implementation of an increased link capacity in both cell environments.

Other objects and further features of the present invention will become apparent from the following detailed description when read in conjunction with the accompanying drawings.

BRIEF DESCRIPTION OF THE DRAWINGS

FIG. 43A and FIG. 43B are schematic diagrams of a time chart for a case of applying a transmission timing control in an uplink and a case of not applying the controlling according to the related art;

DETAILED DESCRIPTION OF THE PREFERRED EMBODIMENTS

In the following, embodiments of the present invention are described with reference to the accompanying drawings.

A First Embodiment

Figure 1:
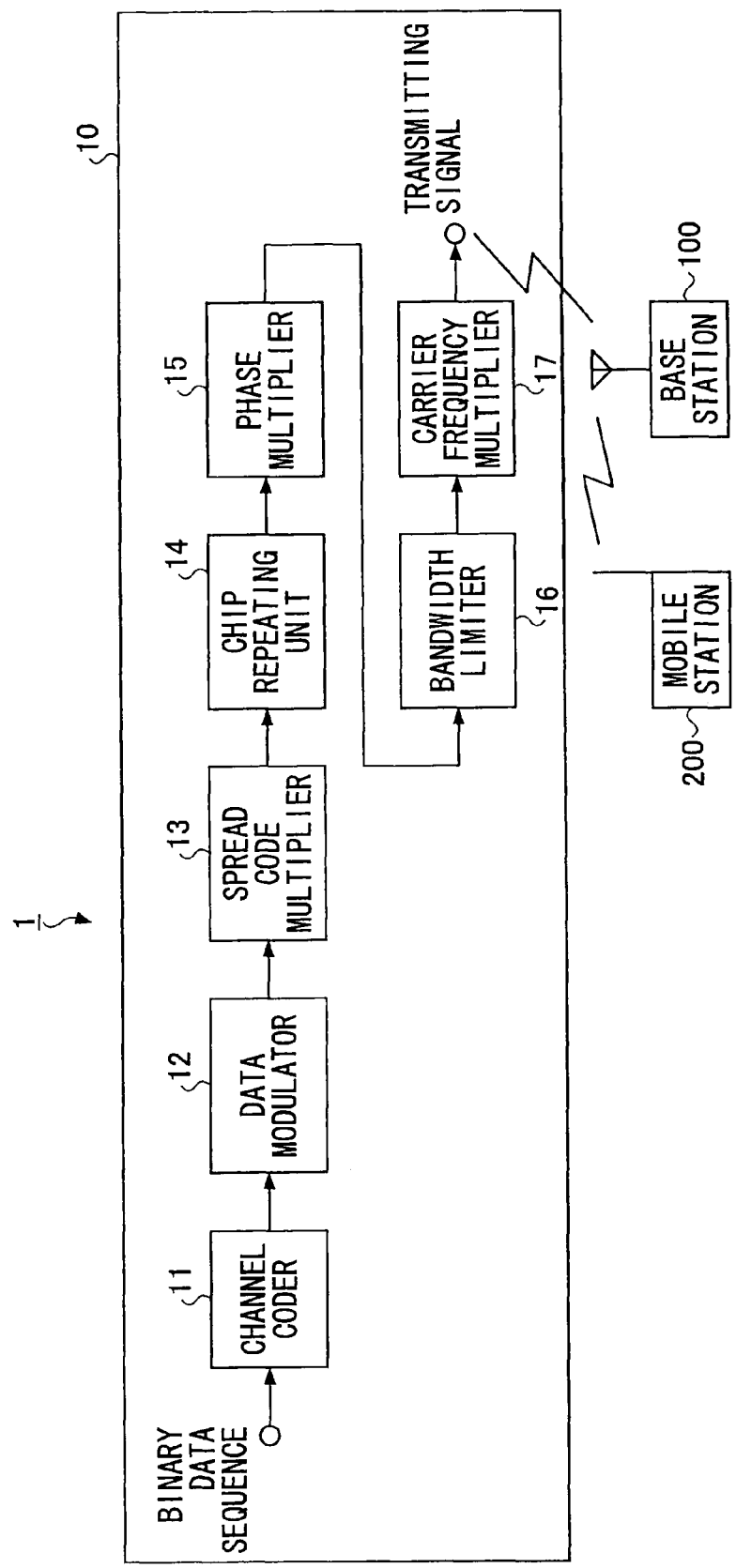
FIG. 1 is a schematic diagram of an overall configuration of a mobile transmission system and a configuration of a mobile station according to a first embodiment.

First, a configuration of a wireless transmission system according to a first embodiment is described. As illustrated in FIG. 1, a wireless transmission system 1 includes a mobile station 10 and a base station 100. The mobile station 10 transmits a wireless signal spread by multiplying spreading code. The mobile station 10 includes a channel encoder 11, a data modulator 12, a spreading-code multiplier 13, a chip repetition unit 14, a phase multiplier 15, a bandwidth limiter 16, and a carrier-frequency multiplier 17.

The channel encoder 11 performs channel coding by applying error-correction code such as Turbo code and convolution code. The data modulator 12 modulates the channel-coded data. The spreading-code multiplier 13 multiplies spreading code to the modulated data so as to generate spreading-chip sequence. The chip-repetition unit 14 performs chip repetition for a predetermined number of repetitions to the spreading-chip sequence so as to generate a predetermined chip pattern. The phase multiplier 15 multiplies to the chip pattern a phase specific to the mobile station 10. The bandwidth limiter 16 provides bandwidth-limiting to the phase-multiplied chip pattern and the carrier-frequency multiplier 17 multiplies a carrier frequency to the chip pattern for transmission.

Figure 2:
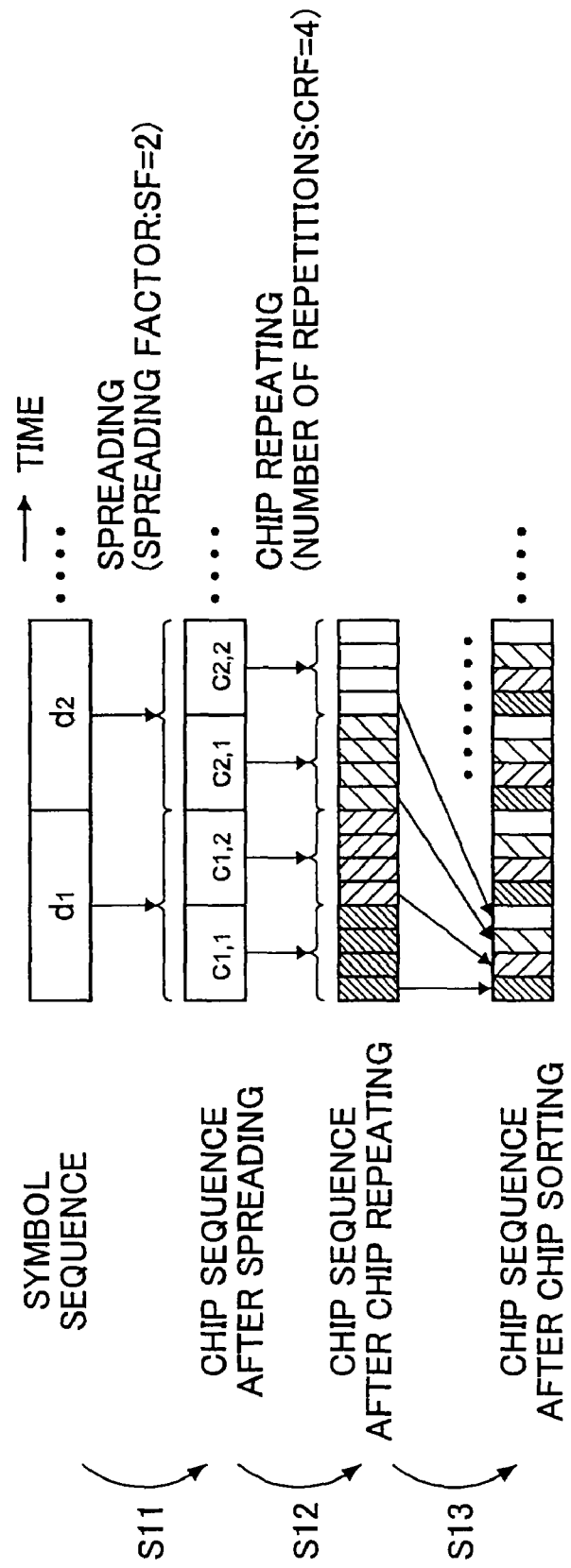
FIG. 2 is a schematic diagram of major operations of a mobile station according to a first embodiment.

Then, operations of the mobile station 10 according to the present invention are described. First, as illustrated in FIG. 2, at the spreading-code multiplier 13, the modulated chip sequence as a transmitting signal (d1, d2, ... ) is multiplied by spreading code having a spreading factor SF of 2 so as to generate a spreading chip sequence, "c1,1", "c1,2", "C2,1", "C2,2", ... (S11). Subsequently, the chip-repetition unit 14 applies chip repetition having the number of repetitions CRF=4 to the spreading chip sequence. Then, the chip-repetition unit 14 sorts the chip-repeated chip sequence so as to have the same sequential order as the spread sequence (S13). Herein, CRF stands for Chip Repetition Factor.

Figure 3:
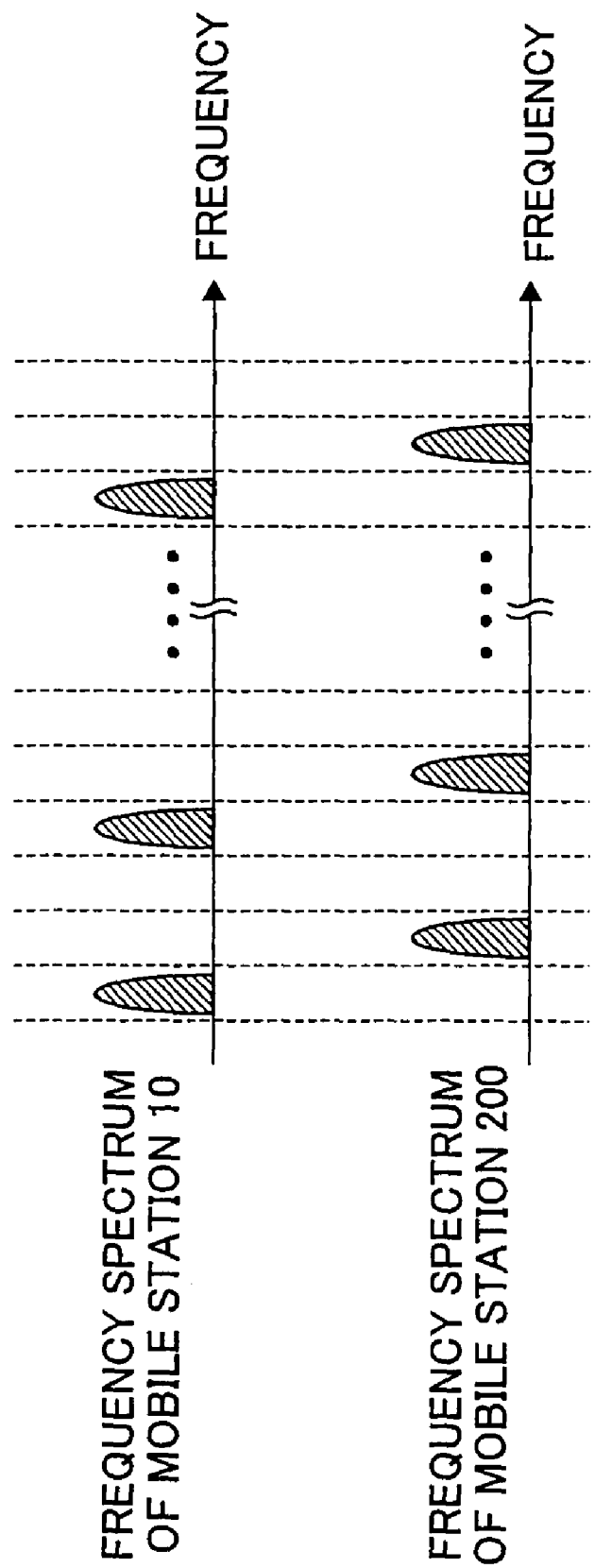
FIG. 3 is a schematic diagram of one example of the frequency spectrum of a signal transmitted by a mobile station according to a first embodiment.

Chip-repeated chip sequences comprise on the frequency axis frequency spectrums such as those illustrated in FIG. 3. As the chip sequence as described above is a signal comprising a predetermined chip pattern, the frequency spectrum becomes a comb tooth-shaped spectrum. The position of the comb tooth-shaped spectrum shifts as a phase specific to the mobile station 10 is added at the phase multiplier 15 to the signal comprising a predetermined chip pattern. Therefore, as illustrated in FIG. 3, the frequency spectrum of the mobile station 10 and the frequency spectrum of another mobile station 200 (refer to FIG. 1) do not overlap with each other.

Therefore, even in a case of multiple mobile stations 10 and 200 simultaneously connecting to the same base station 100, the frequency spectrum of one mobile station is orthogonal on the frequency axis to the frequency spectrum of the other mobile station so as to reduce interference caused by the respective transmitting signals. Herein, when the received timings at the base station 100 of the transmitting signals from the respective mobile stations 10 and 200 are the same, the frequency spectrum of one mobile station is orthogonal on the frequency axis to that of the other mobile station. This aspect is detailed in the fifth through the ninth embodiments.

Thus, in the wireless transmission system 1 according to the present invention, the mobile station 10, using the chip repetition and the phase multiplying, enables a generating of a transmitting signal having the frequency spectrum orthogonal to that of the other mobile station (such as the mobile station 200). Therefore, in an uplink in which multiple mobile stations are simultaneously connected to the base station 100, a reduced transmitting signal interference and an increased link capacity are enabled.

A Second Embodiment

While an exemplary aspect of applying on a fixed basis SF=2 as the spreading factor and CRF=4 as the number of repetitions is illustrated in the first embodiment, in a wireless transmission system according to the present embodiment, a mobile station comprises a function of variably controlling spreading factor of spreading code and the number of chip repetitions.

A wireless transmission system 2 according to the second embodiment has the same basic configuration as the wireless transmission system 1 as detailed in the first embodiment. Therefore, numerals of the same column (with the same tail-ends) are assigned to the mobile station and its elements so as to omit the description while detailing below the differences from the first embodiment, referring to FIG. 4 and FIG. 5.

Figure 4:
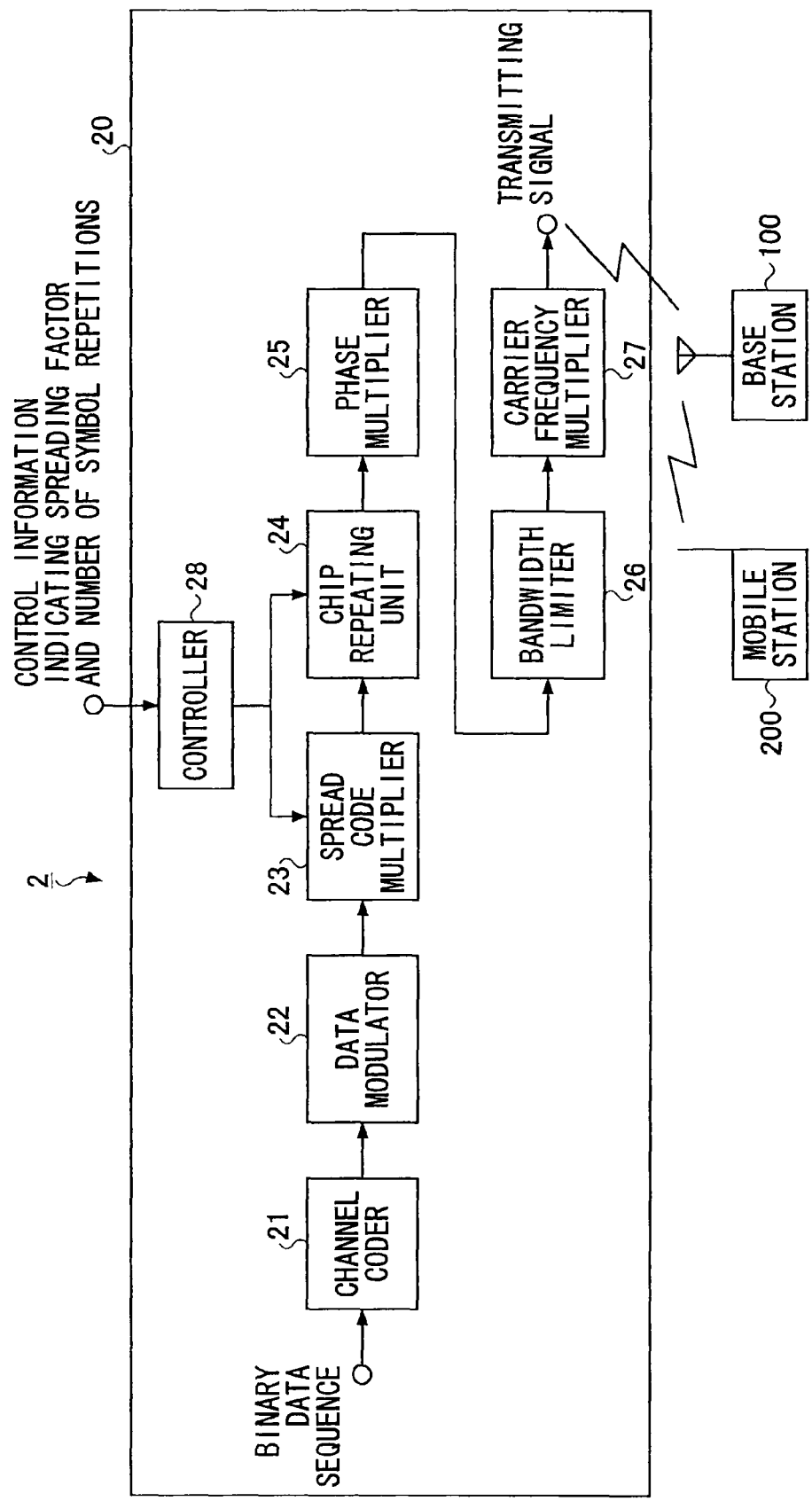
FIG. 4 is a schematic diagram of an overall configuration of a wireless transmission system and a configuration of a mobile station according to a second embodiment.

FIG. 4 is a schematic diagram of an overall configuration of the wireless transmission system 2 and a configuration of a mobile station 20 according to the present embodiment. The controller 28, which is an element specific to the mobile station 20, variably controls the spreading factor of the spreading code and the number of chip repetitions based on the controlling information sent from the base station as an external apparatus. This controlling information includes the spreading factor and the number of chip repetitions to be applied to the mobile station 20.

Figure 5:
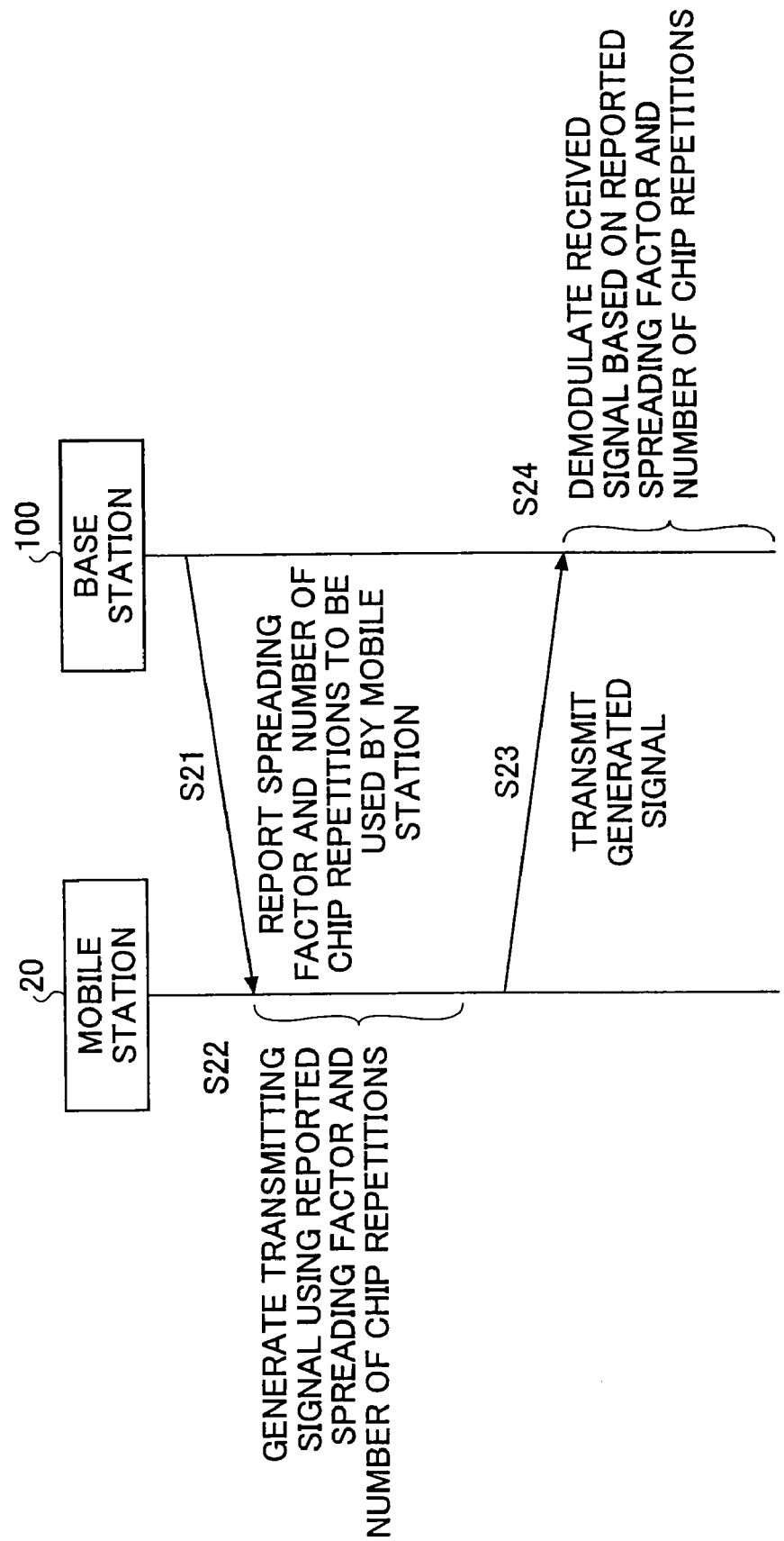
FIG. 5 is a schematic diagram of an operation of a wireless transmission system according to a second embodiment.

Below, referring to a sequence diagram in FIG. 5, an operation of the wireless transmission system 2 is described.

In S21, the spreading factor and the number of chip repetitions to be used by the mobile station 20 is reported from the base station 100 to the mobile station 20. Such reporting may be by controlling information sent as broadcast information to an indefinite number of mobile stations, or may be by controlling information sent to a specific mobile station 20.

In S22, at the mobile station 20, a transmitting signal is generated based on the spreading factor and the number of chip repetitions reported in S21. The generating of the transmitting signal is performed according to the same procedure as the generating of the transmitting signal in the first embodiment (S11 through S13 as illustrated in FIG. 2). The generated signal is sent from the mobile station 20 to the base station 100 via a wireless channel (S23). Then, the signal received from the base station 100 is demodulated according to the spreading factor and the number of chip repetitions reported from the base station 100 in S21 (S24).

As described above, using the wireless transmission system 2 according to the present embodiment, the mobile station 20 generates a transmitting signal based on the spreading factor of the spreading code and the number of chip repetitions. In other words, the base station 100 enables an appropriate changing of the spreading factor and the number of chip repetitions to be used in the signal generating at the mobile station 20. Therefore, a generating of a transmitting signal using the wireless parameters suitable for the respective cell environments without providing at the mobile station 20 individual wireless interfaces for the respective cell environments is enabled.

Furthermore, this transmitting signal comprises the frequency spectrum orthogonal on the frequency axis to the frequency spectrum of the transmitting signal from the other mobile station 200. Therefore, a reduction of interference in a transmitting signal in an uplink where multiple mobile stations 20 and 200 simultaneously connect to the base station 100 so as to increase the link capacity in an isolated cell environment is enabled.

A Third Embodiment

While an exemplary aspect which variably controls the spreading factor and the number of chip repetitions based on the spreading factor and the number of chip repetitions reported from the base station is shown in the second embodiment, the mobile station comprises a function of variably controlling the spreading factor and the number of chip repetitions based on the cell environment reported from the base station in the wireless transmission system according to the present embodiment.

A wireless transmission system 3 according to the third embodiment has the same basic configuration as the wireless transmission system 2 detailed in the second embodiment. Therefore, numerals of the same column (with the same tail-ends) are assigned to the mobile station and its elements so as to omit the description as well as detailing below the differences from the second embodiment, referring to FIG. 6 through FIG. 8.

Figure 6:
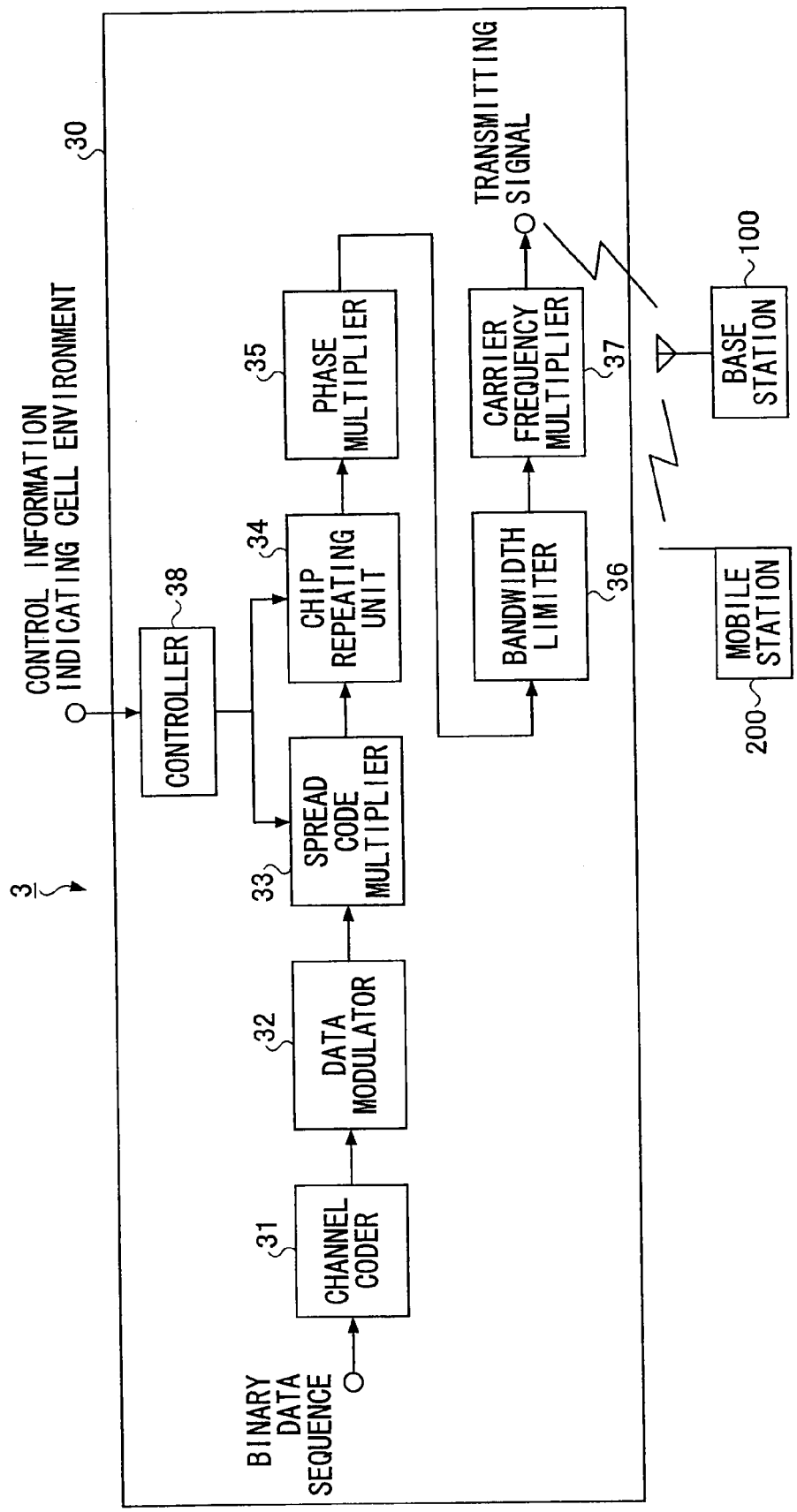
FIG. 6 is a schematic diagram of an overall configuration of a wireless transmission system and a configuration of a mobile station according to a third embodiment.

FIG. 6 is a diagram of an overall configuration of the wireless transmission system 3 according to the present embodiment and a configuration of a mobile station 30. The controller 38, which is an element specific to the mobile station 30, variably controls the spreading factor of the spreading code and the number of chip repetitions based on the controlling information indicating the cell environment transmitted from the base station 100 as an external apparatus. More specifically, the controller 38 performs a controlling operation which sets the number of chip repetitions by the chip-repetition unit 34 to "1" in a case that the cell environment which the mobile station 200 falls within is a multi-cell environment. In other words, it is set such that the chip repetition is not performed so that only the spreading factor is set. Hereby, the one-cell frequency reuse is achieved so as to increase the link capacity.

On the other hand, in a case where the cell environment which the mobile station 30 falls within is an isolated cell environment, the controller 38 performs controlling which increases the number of chip repetitions while decreasing the spreading factor. Preferably, the number of chip repetitions is set to be equal to 1 or more, for example CRF of around 4, so as to decrease the magnitude of the spreading factor only for the number of chip repetitions. Hereby, as in the wireless transmission system according to the first and the second embodiments, the frequency spectrum of the mobile station 30, and that of the mobile station 300 where the mobile stations simultaneously connect to the base station 100, are orthogonal to each other so as to reduce interference between the transmitting signals from the respective mobile stations. Such controlling is more effective in an isolated cell environment in which the reduction in the spectral usage efficiency due to multiple access interference is especially large.

Figure 7:
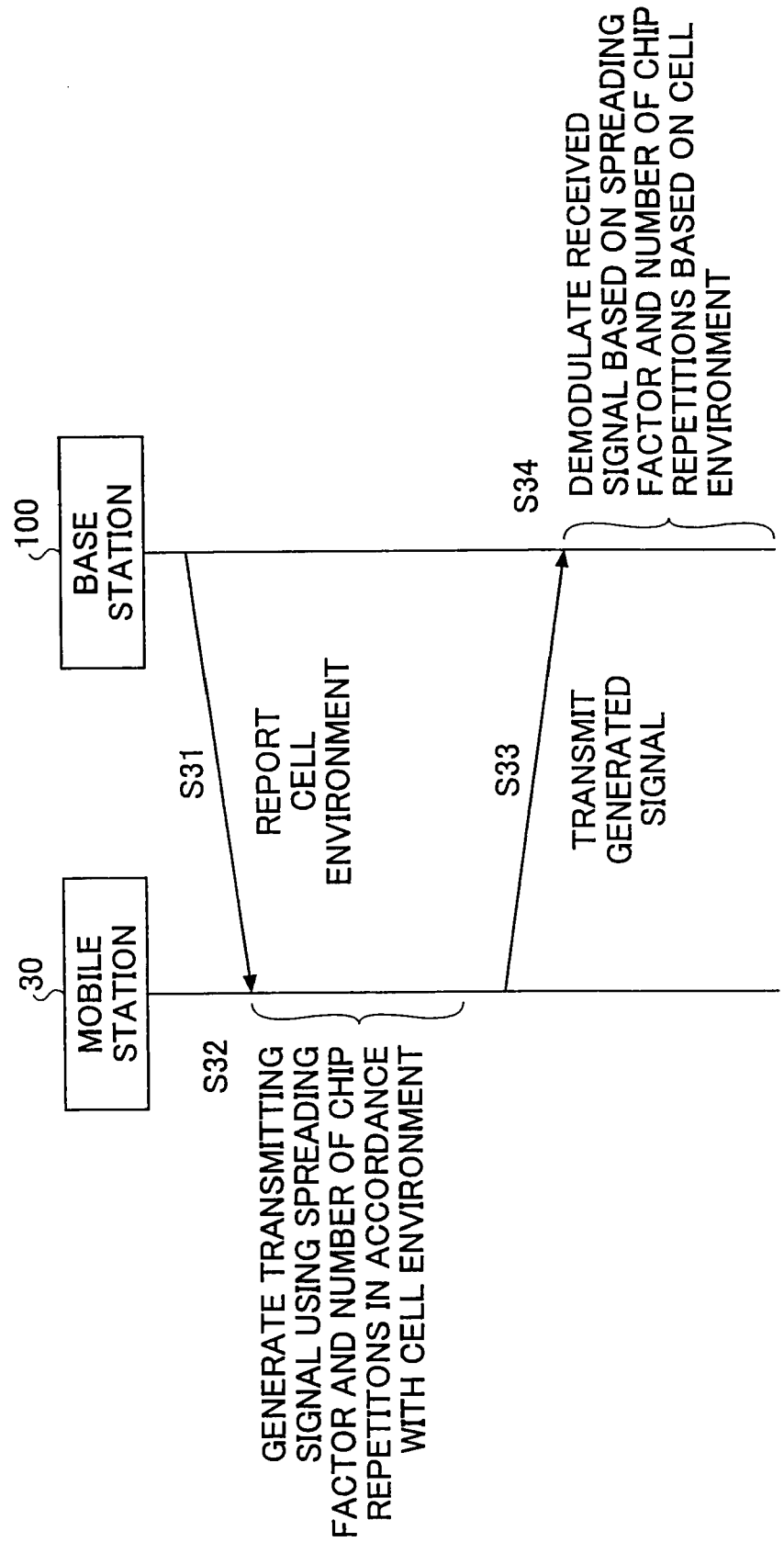
FIG. 7 is a sequence diagram of an operation of a wireless transmission system according to a third embodiment.

Below, an operation of the wireless transmission system 3, referring to FIG. 7, is described. In S31, the cell environment which the mobile station 30 falls within (one of a multi-cell environment and an isolated cell environment) is reported to the mobile station 30 from the base station 100. Such reporting may be by controlling information sent to an indefinite number of mobile stations (broadcast information), or may be by controlling information sent to a specific mobile station 20.

In S32, a transmitting signal is generated at the mobile station 30 based on the spreading factor and the number of chip repetitions which correspond to the cell environment reported in S31. The generating of the transmitting signal is performed according to the same procedure as the generating of the transmitting signal according to the first embodiment (S11 through S13 as illustrated in FIG. 2). The generated signal is transmitted via a wireless channel from the mobile station 30 to the base station 100 (S33). Then, the signal from the base station 100 is demodulated based on the spreading factor and the number of chip repetitions which correspond to the cell environment reported from the base station 100 in S31 (S34).

Below, a flow of major processes executed at the mobile station 30 is described, referring to FIG. 8. The wireless parameters set up at the spreading-code multiplier 33, the chip-repetition unit 34 and the phase multiplier 35, based on the controlling information input at the controller 38, are appropriately changed.

Figure 8:
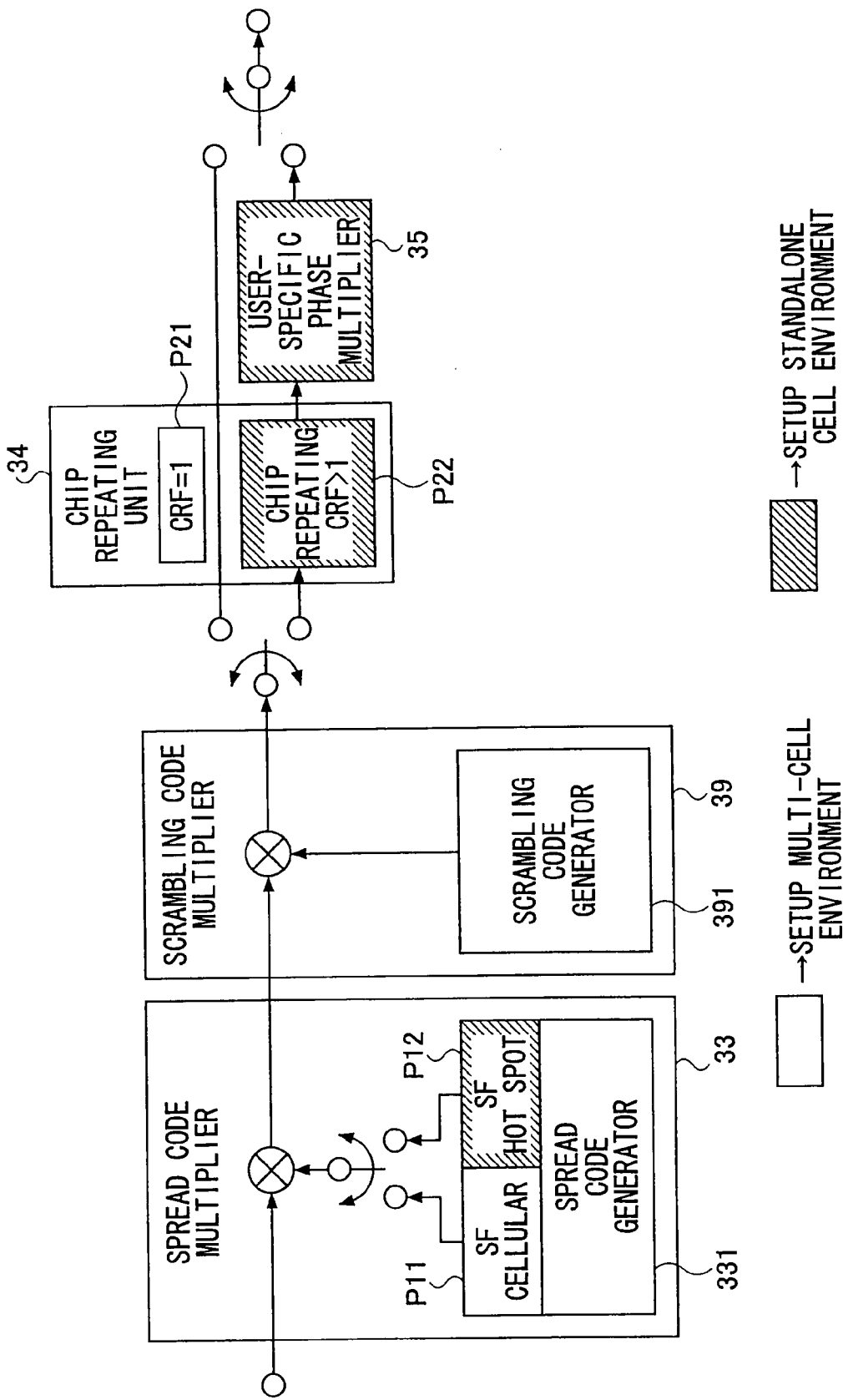
FIG. 8 is a schematic diagram of major operations of a mobile station according to a third embodiment.

In other words, in a case where the controlling information reports a multi-cell environment, P11 and P21 in FIG. 8 are applied as the wireless parameters. As a result, the spreading code (SF cellular) generated at the spreading code generator 33-1 is multiplied by the spreading-code multiplier 33 and then the scrambling code generated at the scrambling code generator 39-1 is multiplied by the scrambling-code multiplier 39 (not illustrated in FIG. 6). Subsequently, the outputting is performed without performing chip repetition at the chip-repetition unit 34 (CRF=1).

On the other hand, in a case where the controlling information indicates an isolated cell environment, P12 and P22 (hatched in FIG. 8) are applied as the wireless parameters. As a result, the spreading code generated at the spreading-code generator 33-1 by the spreading-code multiplier 33 (SF hot spot) is multiplied and then the scrambling code generated at the scrambling-code generator 39-1 is multiplied. Then, the chip repetition where CRF>1 at the chip-repetition unit 34 is performed so as to generate a signal having a predetermined chip pattern and to multiply an user-specific phase. Hereby, the chip pattern is kept constant.

As described above, using the wireless transmission system 3 according to the third embodiment, the mobile station 30 uses the wireless parameters to variably control the spreading factor of the spreading code and the number of chip repetitions based on the cell environment. Hereby, an increased link capacity using a single wireless interface regardless of the cell environment which the mobile station 30 falls within is enabled.

A Fourth Embodiment

While in the third embodiment an exemplary aspect which variably controls the spreading factor of the spreading code and the number of chip repetitions based on the cell environment which the mobile station falls within is described, the mobile station in a wireless transmission system 4 according to the present embodiment comprises a function of variably controlling the spreading factor and the number of chip repetitions according to the number of mobile stations simultaneously connected to a base station. The wireless transmission system 4 according to the fourth embodiment comprises the same basic configuration as the wireless transmission systems 2 and 3 detailed in the second and third embodiments. Therefore, numerals of the same column (with the same tail-ends) are assigned to the mobile station and its elements so as to omit the description while detailing below the differences from the second and the third embodiments, referring to FIG. 9 and FIG. 10.

Figure 9:
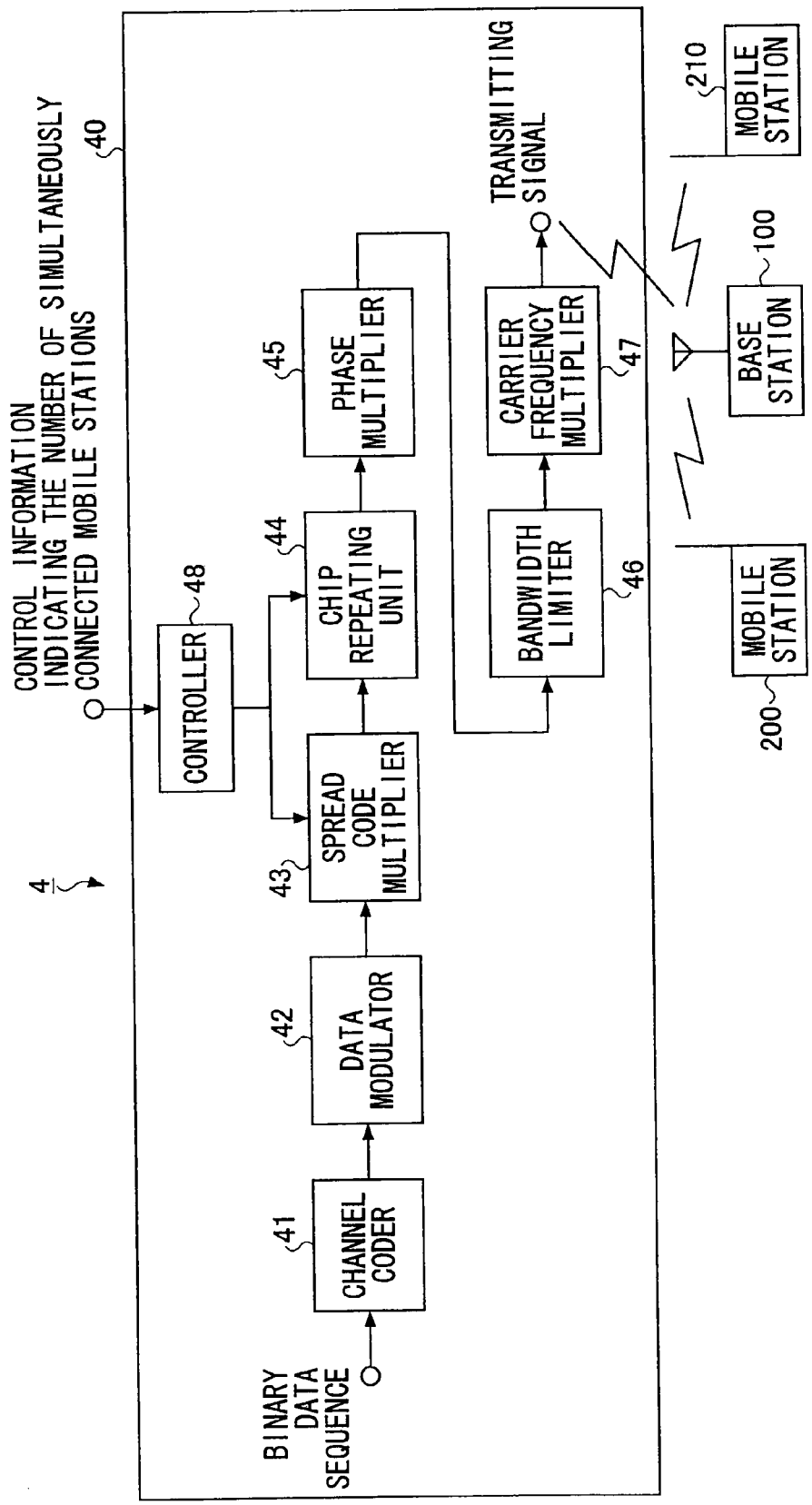
FIG. 9 is a schematic diagram of an overall configuration of a wireless transmission system and a configuration of a mobile station according to a fourth embodiment.

FIG. 9 is a diagram of an overall configuration of the wireless transmission system 4 and the configuration of a mobile station 40 in a case of wireless connections from the three mobile stations 40, 200, and 210 to the base station 100. The controller 48, which is an element specific to the mobile station 40, variably controls the spreading factor of the spreading code and the number of chip repetitions based on the controlling information indicating the number of simultaneous connections transmitted from the base station 100 as an external apparatus.

More specifically, the controller 48 performs the controlling to decrease the spreading factor of the spreading code with an increase in the number of mobile stations connected to the base station 100 as well as to increase the number of chip repetitions. Interference among the transmitting signals from the respective mobile stations increases as the number of mobile stations simultaneously connected increases. Thus, the arrangement such that the transmitting signals from the respective mobile stations 40, 200, and 210 being connected to the base station 100 are orthogonal on the frequency axis to one another with an increased number of chip repetitions enables a reduction of multiple-access interference so as to increase the spectral usage efficiency and the link capacity. As a result, an increase in the link capacity while suppressing interference among the respective mobile stations is enabled.

Figure 10:
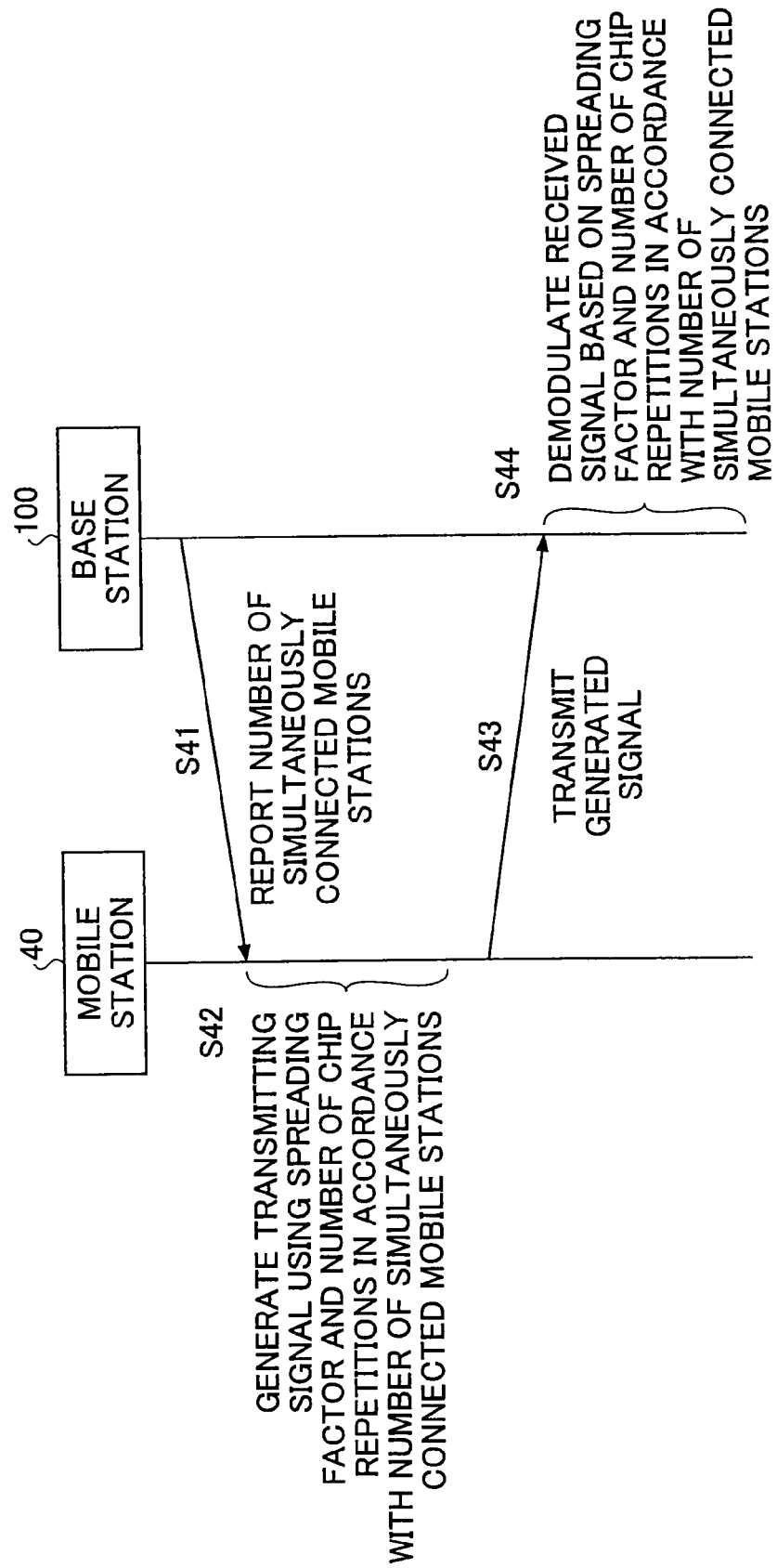
FIG. 10 is a sequence diagram of an operation of a wireless transmission system according to a fourth embodiment.

Below, an operation of the wireless transmission system 4 is described by referring to FIG. 10.

In S41, the number of simultaneously-connecting mobile stations that is the number of mobile stations currently connected to the mobile station 40 is reported from the base station 100 to the mobile station 40. Such reporting may be by controlling information sent from the base station 100 as broadcast information to an indefinite number of mobile stations, or may be by controlling information sent to a specific mobile station 40.

In S42, a transmitting signal is generated at the mobile station 40 based on the spreading factor and the number of chip repetitions which correspond to the number of simultaneously-connected mobile stations reported in S41. The generating of the transmitting signal is performed according to the same procedure as the generating of the transmitting signal according to the first embodiment (S11 through S13 as illustrated in FIG. 2). The generated signal is transmitted via a wireless channel from the mobile station 40 to the base station 100 (S43). Then, the signal received from the base station 100 is demodulated in S41 based on the spreading factor and the number of chip repetitions which correspond to the number of simultaneously-connecting mobile stations reported from the base station 100 (S44).

As described above, according to the wireless transmission system 4 according to the fourth embodiment, the mobile station 40 variably controls the spreading factor of the spreading code and the number of chip repetitions based on the number of mobile stations simultaneously connected to the base station which the mobile station 40 is connected to. Hereby, the mobile station 40 is enabled an increased link capacity by using a single wireless interface regardless of the resident cell environment.

Figure 11:
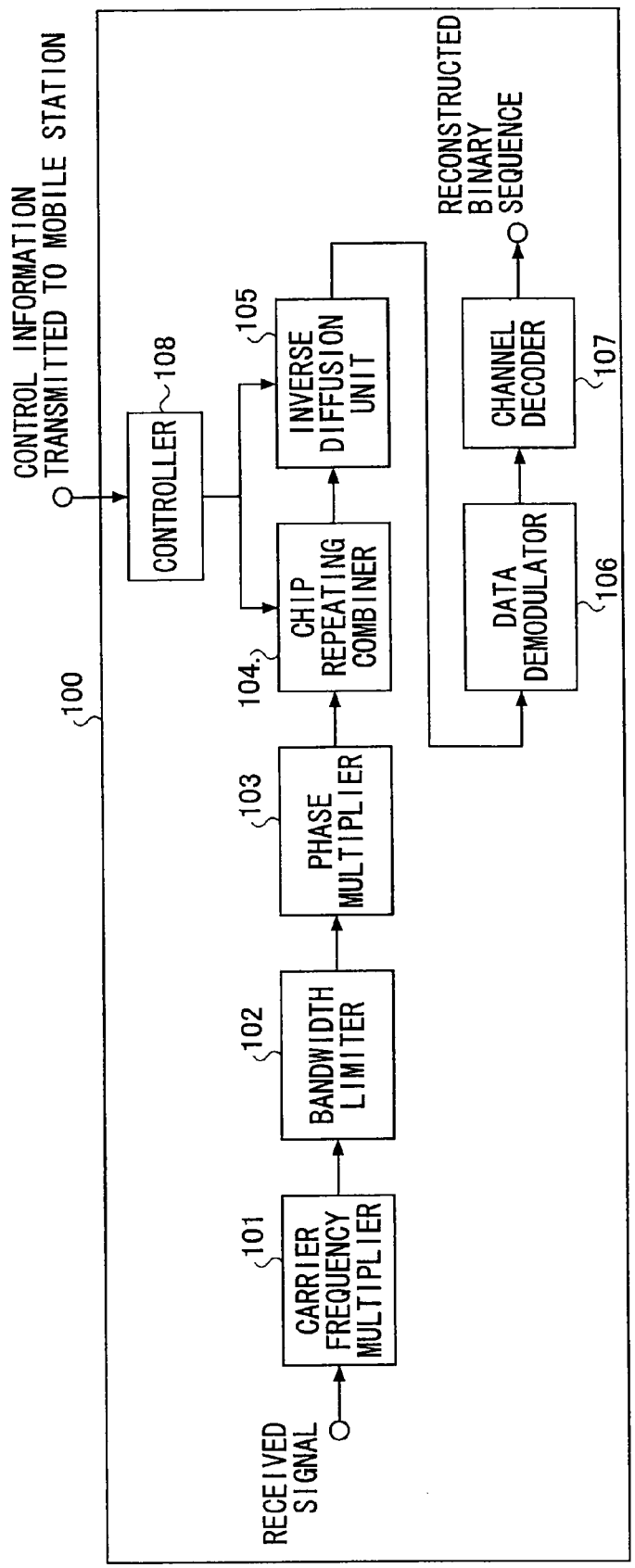
FIG. 11 is a schematic diagram of a configuration of a base station according to a second, a third, and a fourth embodiment.

Next, a configuration of the base station 100 according to the second, the third, and the fourth embodiments is described, referring to FIG. 11. The base station 100 receives a signal transmitted from the mobile stations 20, 30, and 40. As illustrated in FIG. 11, the base station 100 comprises a carrier-frequency multiplier 101, a bandwidth limiter 102, a phase multiplier 103, a chip-repetition combiner 104, a despreading unit 105, a data demodulator 106, and a channel decoder 107.

The base station 100 reconstructs a binary data sequence from the received signal according to an opposite process of generating the transmitting signal at the mobile station. In other words, the carrier-frequency multiplier 101 multiplies a carrier frequency to the received signal so as to convert the received signal into a digital baseband signal. The bandwidth limiter 102 provides a bandwidth limiting to the digital baseband signal. The phase multiplier 103 restores the phase of the signal multiplied at the transmitting mobile station to the original phase. As a result, a signal having a predetermined chip pattern is generated.

The chip repetition combiner 104 uses the number of chip repetitions, which is the same as the number of chip repetitions reported to the transmitting mobile station, to recombine from the signal as described above a chip-repeated signal. As a result, a spreading chip sequence is generated. The despreading unit 105 multiplies to the chip sequence the spreading code having the same spreading factor as the spreading factor reported to the transmitting mobile station so as to restore the received signal to the modulated data before spreading. The data demodulator 106 demodulates the modulated data while the channel decoder 107 decodes an error-correction code so as to channel-decode data after demodulation. As a result of the channel decoding process, the binary data sequence input to the mobile station is reconstructed.

The controller 108, based on the controlling information transmitted to the mobile stations 20, 30, and 40, variably controls the spreading factor of the spreading code to be used at the despreading unit 105 and the number of chip repetitions to be used at the chip-repetition combiner 104.

Figure 12:
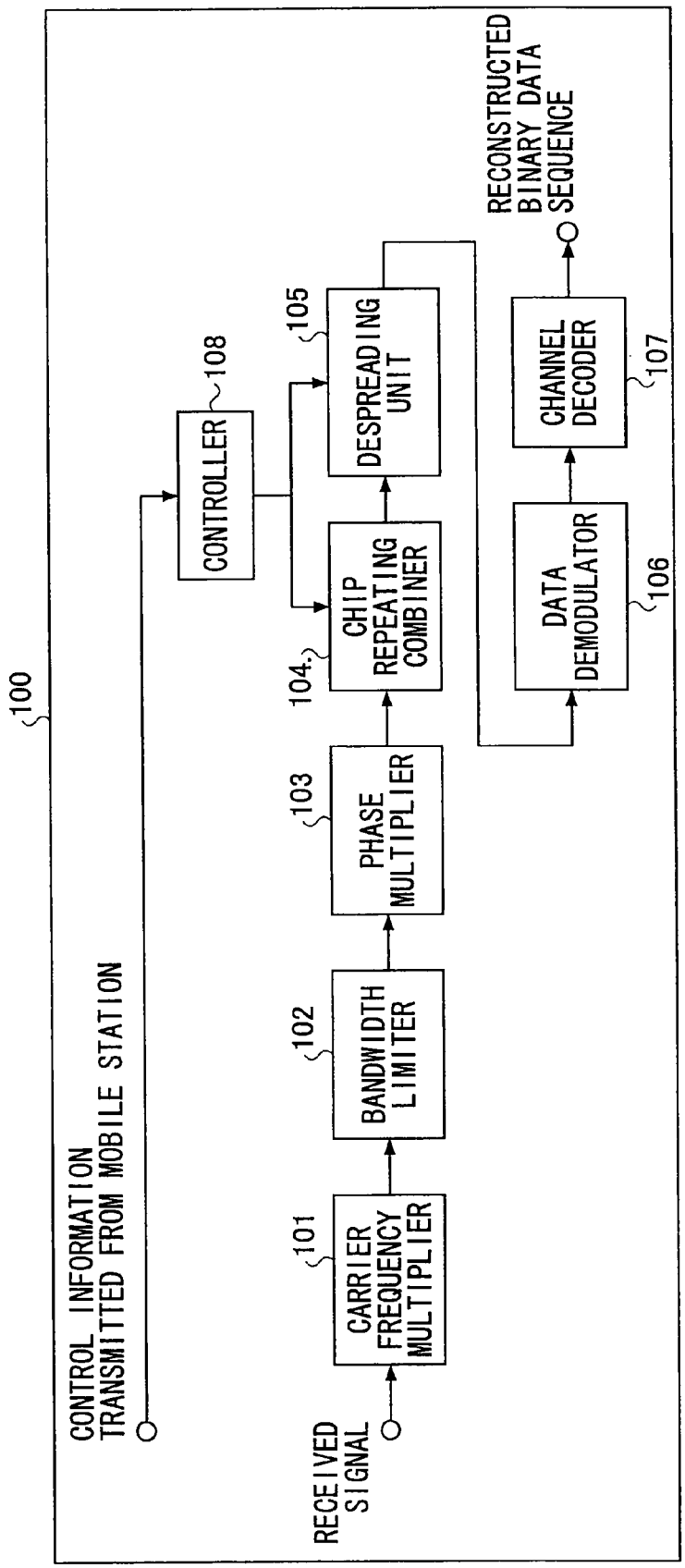
FIG. 12 is a schematic diagram of a variation of a configuration of a base station according to a second, a third, and a fourth embodiment.

Moreover, the base station 100 as illustrated in FIG. 12, based on the controlling information sent from one of the mobile stations 20, 30, and 40, may determine the number of chip repetitions and the spreading factor to be used in the reconstruction process of the received signal at the controller 108.

Figure 13:
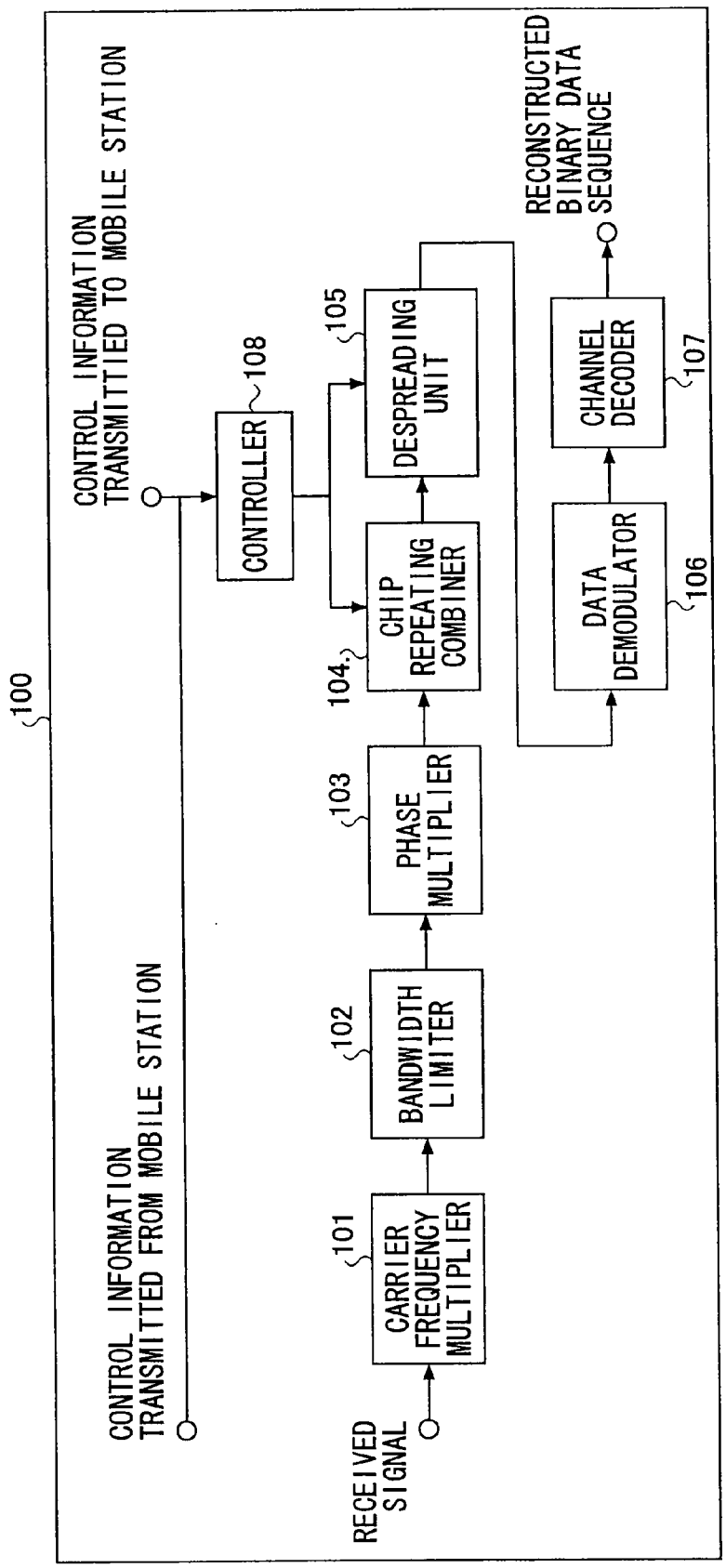
FIG. 13 is a schematic diagram of another form of a configuration of a base station according to a second, a third, and a fourth embodiment.

Furthermore, as illustrated in FIG. 13, the base station 100 may determine, based on both the controlling information transmitted to one of the mobile stations from the base station 13 and the controlling information transmitted from the mobile station, the number of chip repetitions and the spreading factor to be used in the reconstruction process of the received signal. Hereby, the base station 100 is enabled a collating of the controlling information transmitted to the mobile station with the controlling information received from the mobile station so that a simple and speedy confirmation as to whether the variable controlling of the spreading factor and the number of chip repetitions is performed. In such an aspect, a more accurate signal transmitting and receiving is enabled, assuming that the receiving of the signal from the mobile station is performed in a case that a variable controlling is appropriately performed.

A Fifth Embodiment

Incidentally, while in the first through the fourth embodiments the data rate of the transmitting signal from the mobile station is assumed to be constant, it is also possible to change the comb tooth-shaped sets orthogonal to one another in accordance with data rates desired by the respective mobile stations.

Below, as an example, are embodiments for a case of doubling the data rate desired by the respective mobile stations and for a case of halving such data rate are described.

Figure 14:
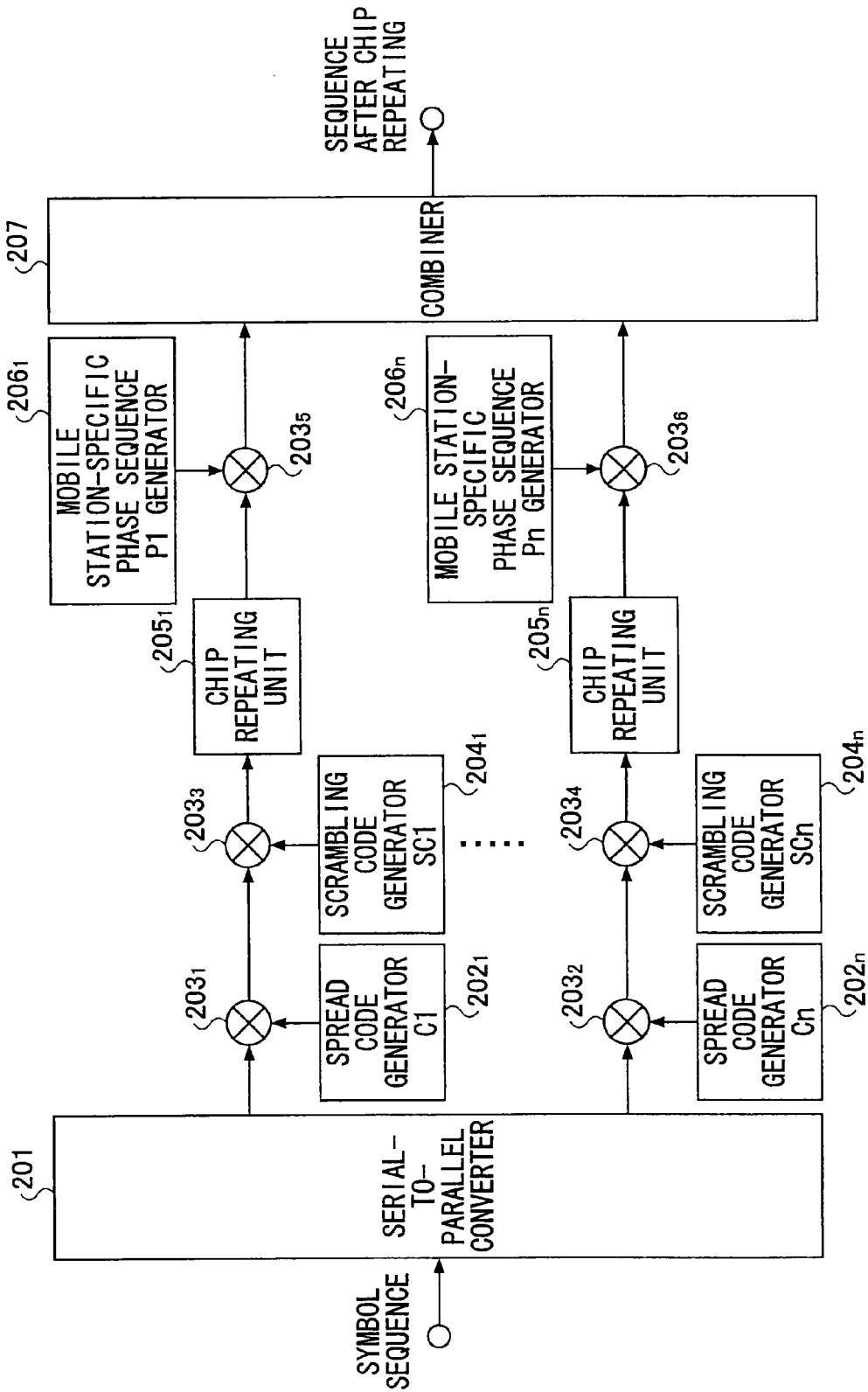
FIG. 14 is a schematic diagram of an exemplary configuration of a mobile station according to a fifth embodiment with the data rate doubled.
Figure 15A:
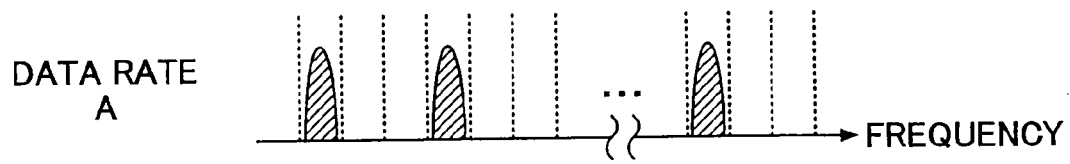
FIG. 15A and FIG. 15B are schematic diagrams of an exemplary frequency spectrum of a transmitting signal with the data rate doubled.
Figure 15B:
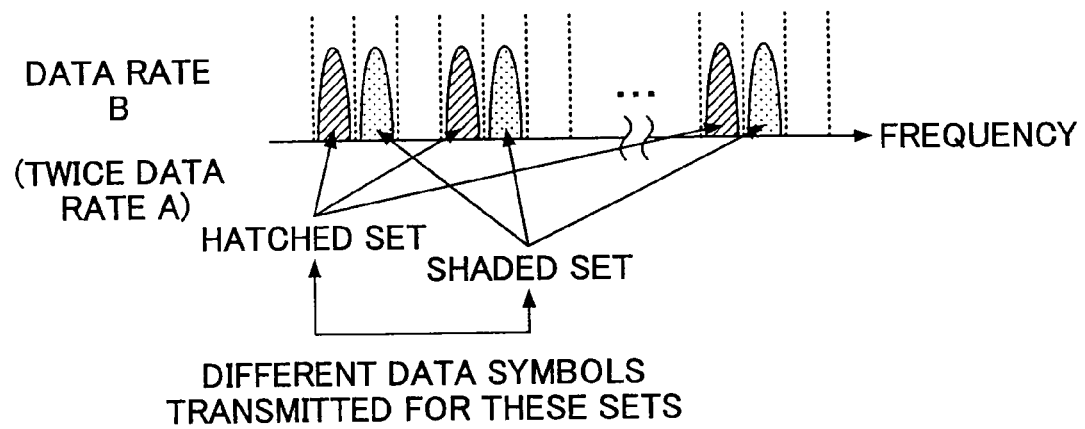

First, the embodiment in which the data rate desired by the respective mobile stations is doubled is described using FIG. 14, FIG. 15A and FIG. 15B.

FIG. 14 is a schematic diagram of a configuration of a mobile station according to the present embodiment. Needless to say, as the configuration is n parallel, the data rate would be multiplied by n.

In FIG. 14, the mobile station comprises a serial-to-parallel converter 201, spreading-code generators (C-1 through C-$n$) 202-1 through 202-$n$, multipliers 203-1 through 203-6, scrambling-code generators (SC-1 through SC-$n$) 204-1 through 204-$n$, chip-repetition units 205-1 through 205-$n$, mobile station-specific phase sequence (P-1 through P-$n$) generators 206-1 through 206-$n$, and a combiner 207.

The serial-to-parallel converter 201 serial-to-parallel converts an input symbol sequence so as to convert to n sequences. The respective parallel symbol sequences output from serial-to-parallel converter 201 are multiplied with the spreading codes (C-1 through C-$n$) generated at the spreading-code generators 202-1 through 202-$n$ and then with the scrambling codes (SC-1 through SC-$n$) generated at the scrambling code generators 204-1 through 204-$n$. Thereafter, the chip repetition is performed at the chip-repetition units 205-1 through 205-$n$. Herein, the spreading codes and the scrambling codes multiplied to the respective sequences may be common codes or different codes.

The respective parallel symbol sequences after chip repetition are phase-multiplied with the phase sequences (P-1 through P-n) generated at the mobile station-specific phase sequences generators 206-1 through 206-n so as to be combined for outputting at the combiner 207. Herein, the phase sequence used in the phase multiplying is shifted to another comb-tooth set so that a multiplying of a different phase sequence every n sequences is needed.

Such chip-repeated sequence combined at the combiner 207 comprises a frequency spectrum on the frequency axis as illustrated in FIG. 15A and FIG. 15B.

FIG. 15A and FIG. 15B are schematic diagrams of an exemplary frequency spectrum of a transmitting signal in which the data rate desired by the mobile station is doubled.

As illustrated in FIG. 15B, in a case of doubling the data rate desired by the mobile station (to the data rate B) according to the present embodiment, the hatched comb-toothed spectrum set as well as the shaded comb-toothed spectrum set are assigned to one mobile station so as to transmit different data symbols for the respective sets. Hereby, a transmitting of a transmitting signal from a mobile station at the data rate double the data rate A as indicated in FIG. 15A is enabled.

Figure 16:
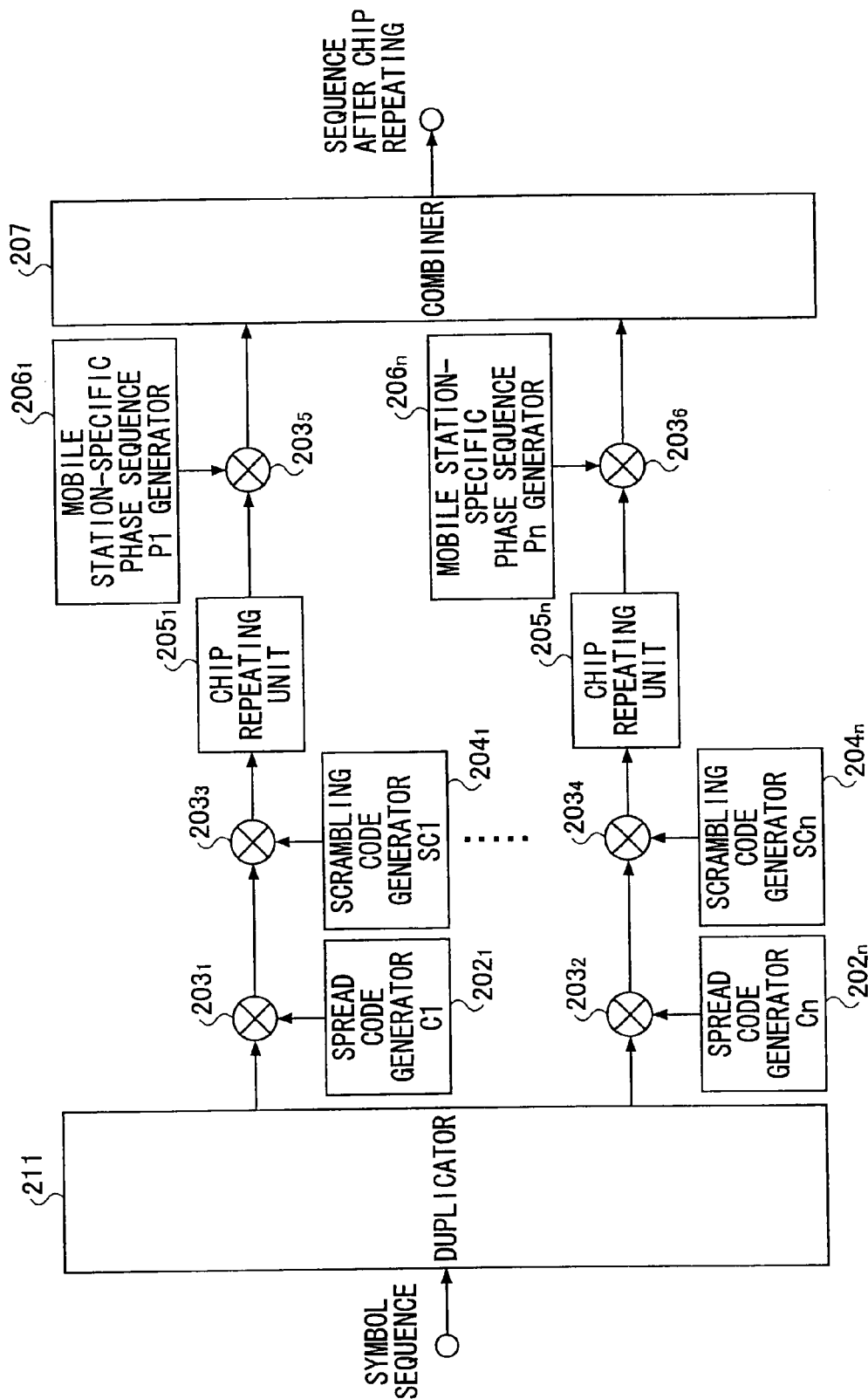
FIG. 16 is a schematic diagram of an exemplary configuration of a mobile station according to a fifth embodiment with the data rate halved.
Figure 17A:
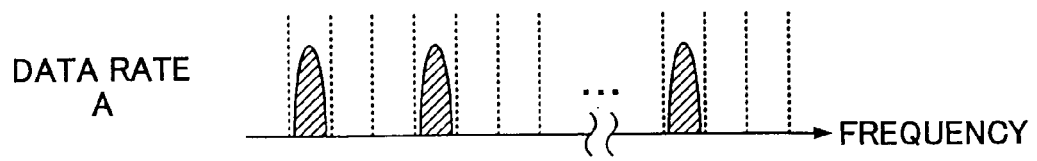
FIG. 17A and FIG. 17B are schematic diagrams of an exemplary frequency spectrum of a transmitting signal with the data rate halved.
Figure 17B:
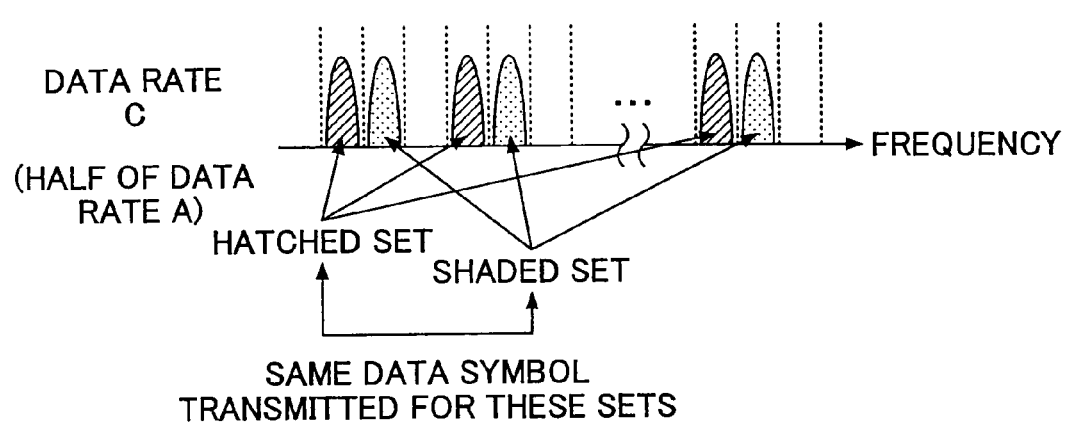

Next, an example of a case in which the data rates desired at the respective mobile stations is halved is described using FIG. 16, FIG. 17A, and FIG. 17B.

The mobile station according to the present embodiment has basically the same configuration as the configuration of the mobile station as illustrated in FIG. 14. Therefore, numerals of the same column (with the same tail-ends) are assigned to its elements so as to omit the description in addition to describing below the differences from the embodiment as described above, referring to FIG. 16, FIG. 17A, and FIG. 17B.

The difference between the mobile station as illustrated in FIG. 16 and the mobile station as illustrated in FIG. 14 is that the input symbol sequence is not serial-to-parallel converted, but rather parallel-copied. In other words, according to the present embodiment, the duplicator 211 is used in lieu of the serial-to-parallel converter 201 so as to duplicate the input symbol sequence to n sequences. Hereafter the same process as the mobile station as illustrated in FIG. 16 is performed.

FIG. 17A and FIG. 17B are schematic diagrams of an example of the frequency spectrum of a transmitting signal with the data rate desired by the mobile station halved.

As illustrated in FIG. 17B, in a case of halving the data rate desired by the mobile station according to the present embodiment, the hatched comb-toothed spectrum set as well as the shaded comb-toothed spectrum set are allocated to one mobile station so as to transmit the same data symbols at the respective sets. Hereby, a transmission of a transmitting signal of the mobile station at a halved data rate relative to the data rate A as illustrated in FIG. 17A is enabled. A transmitting having such redundancy enables characteristic improvement due to a frequency-diversity effect.

Figure 18:
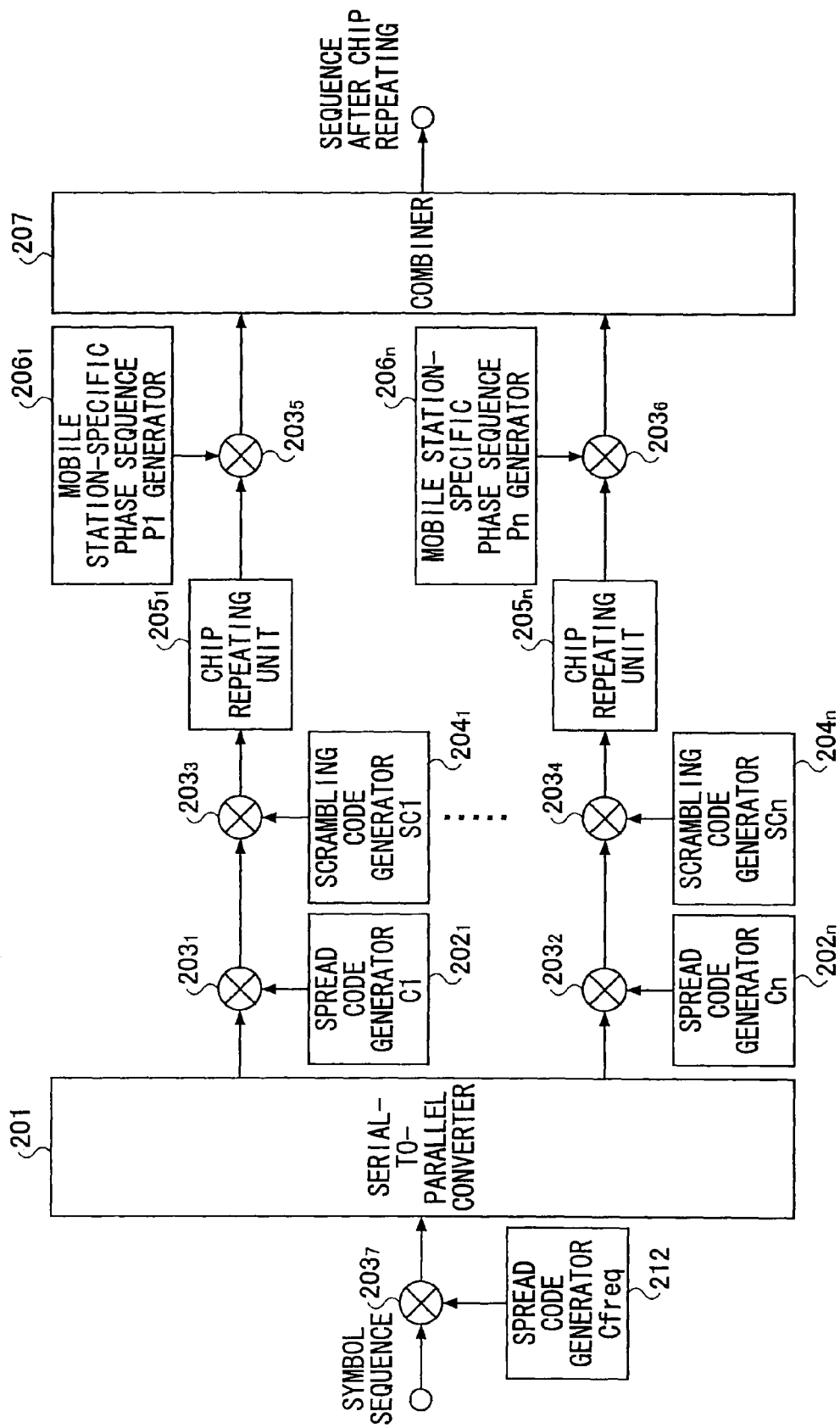
FIG. 18 is a schematic diagram of another exemplary configuration of a mobile station according to a fifth embodiment with the data rate halved.

Furthermore, as another example of a configuration of a mobile station which halves the data rate desired by the mobile station (to the data rate C), a configuration as illustrated in FIG. 18 may also be possible. The mobile station as illustrated in FIG. 18 is comprised by combining the frequency-domain spreading with the time-domain spreading (two-dimensional spreading). The configuration of the mobile station according to the present embodiment is basically the same as the configuration of the mobile station as illustrated in FIG. 16. Therefore, herein, the difference from the mobile station as illustrated in FIG. 16 is described. The mobile station as illustrated in FIG. 18 multiplies at the multiplier 203-7 the spreading code Cfreq generated at the Cfreq 212 before the serial-to-parallel conversion to the symbol sequence so as to serial-to-parallel convert the spreading signal. Subsequently the same process as in the mobile station as illustrated in FIG. 16 is performed.

As described above, according to the mobile station according to the fifth embodiment, a change of the orthogonal comb tooth-shaped sets allocated to a mobile station according to the data rate desired by the respective mobile stations and a flexible assignment of the data rate in accordance with a change in the communications environment of the mobile station while obtaining the MAI reduction effect is enabled.

Moreover, while the exemplary cases of doubling and halving the data rate desired by the mobile station according to the fifth embodiment are described, other multiplying factors may also be applicable. Furthermore, the chip pattern and the phase sequence, or the frequency band (whether neighboring or distant) may be changed in accordance with the communications condition of the respective mobile stations. An use of proximate frequency bands by neighboring mobile stations enables a reduction of inter-channel interference which impacts the surroundings. In addition, further enhancement of the frequency-diversity effect is enabled.

Figure 19:
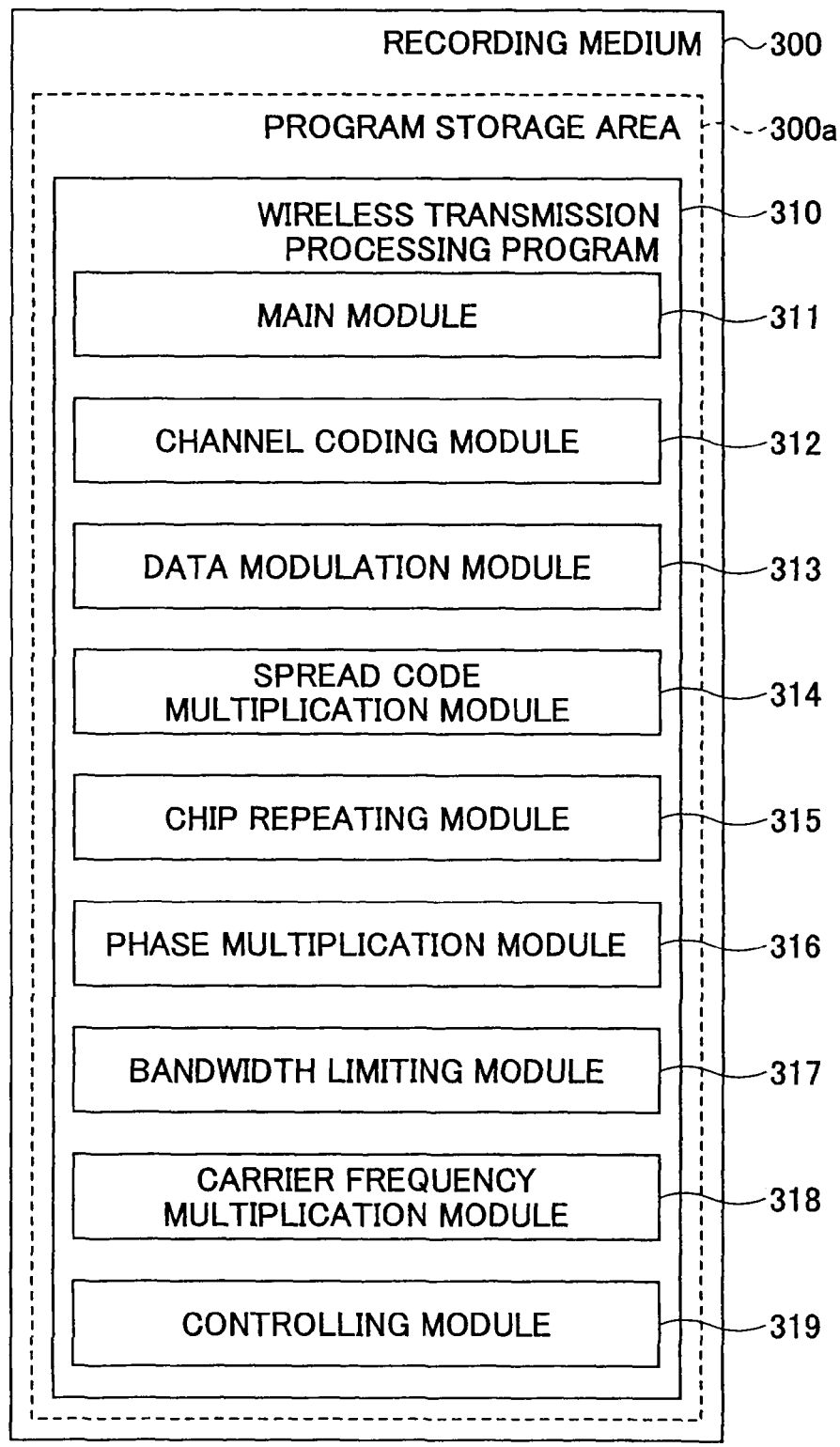
FIG. 19 is a schematic diagram of a configuration of a wireless transmission program according to the present invention.

Next, a program for performing the process of generating a transmitting signal from a binary data sequence is described. As illustrated in FIG. 19, a wireless transmission processing program 310 is stored at a program storage area 300a comprised in a recording medium 300. A wireless transmission processing program 310 comprises a main module 311 which superintends the process of generating a transmitting signal, a channel-coding module 312, a data modulation module 313, a spreading-code multiplying module 314, a chip-repetition module 315, a phase-multiplying module 316, a bandwidth-limiting module 317, a carrier-frequency multiplying module 318, and a controlling module 319 as its elements.

The functions implemented by executing the channel-coding module 312 are the same as the functions of the channel-encoders 11, 21, 31, and 41 of the mobile stations 10, 20, 30, and 40. In other words, the channel coding module 312 applies the error-correction codes such as the Turbo and the convolution codes to the input binary data sequence so as to enable an execution of the channel-coding process at the mobile station. The functions implemented by executing the data modulation module 313 are the same as the functions of the data modulators 12, 22, 32, and 42. In other words, the data modulation module 313 enables at the mobile station an execution of the process of modulating channel-coded data.

The functions implemented by executing the spreading-code multiplying module 314 are the same as the functions of the spreading-code multiplying at the mobile station as described above. In other words, the spreading-code multiplying module 314 multiplies the spreading code to modulated data so as to enable an execution at the mobile station of the process of generating a spreading chip sequence. The functions implemented by executing the chip repetition module 315 are the same as the functions of the chip-repetition units 14, 24, 34, and 44. In other words, the chip repetition module 315 performs chip repetition to the spreading chip sequence for a predetermined number of repetitions so as to enable the mobile station to execute the process of generating a predetermined chip pattern.

The functions implemented by executing the phase-multiplying module 316 are the same as the functions of the phase multipliers 15, 25, 35, and 45 of the mobile station as described above. In other words, the phase multiplying module 316 enables the mobile station an execution of the process of multiplying the mobile station-specific phase to the chip pattern. The functions implemented by executing the bandwidth-limiting module are the same as the functions of the bandwidth limiters 16, 26, 36, and 46 of the mobile station as described above. In other words, the bandwidth-limiting module 317 enables the mobile station an execution of the process of providing a bandwidth limiting to the phase-multiplied chip pattern.

The functions implemented by executing the carrier-frequency multiplying module 318 are the same as the functions of the carrier-frequency multipliers 17, 27, 37, and 47 of the mobile station as described above. In other words, the carrier-frequency multiplying module 318 enables the mobile station an executing of the process of multiplying the carrier frequency to the chip pattern for transmission. The functions implemented by executing the controlling module 319 are the same as the functions of the controllers 28, 38, and 48 of the mobile station as described above. In other words, the controlling module 319 enables the mobile station an executing of the process of variably controlling the spreading factor of the spreading code and the number of chip repetitions.

Moreover, the wireless transmission processing program 310 may be configured in a manner such that all or a portion of that program is transmitted via a transmission medium such as a communications line so as to be received by an information and communications equipment, such as a mobile terminal, for recording (including installation).

While the embodiment as described above is for a case of applying only chip repetition at the mobile station, hereafter the embodiment for a case of a combined use of chip repetition and transmission timing control is described.

A Sixth Embodiment

A configuration of a wireless transmission system according to a sixth embodiment is described. The wireless transmission system according to the sixth embodiment as in previously described embodiments, comprises a mobile station and a base station, the mobile station having the functions of chip repetition and transmission timing control. On the other hand, the receiver of the base station comprises the functions of a multi-path interference canceller, a chip equalizer, and a frequency-domain equalizer. A summary of the functions of the mobile station and the base station according to the sixth embodiment is provided below.

| TYPE OF INTERFERENCE | INTERFERENCE SIGNAL FROM OTHER MOBILE STATIONS (MULTIPLE-ACCESS INTERFERENCE) | INTERFERENCE BY MULTI-PATH PROPAGATION OF TRANSMITTING SIGNAL (MULTI-PATH INTERFERENCE) |
|---|---|---|
| APPLIED TECHNOLOGIES | COMBINED USE OF CHIP REPEATING AND TRANSMISSION TIMING CONTROL | REMOVAL OF MULTI-PATH INTERFERENCE AT THE BASE STATION (MULTI-PATH INTERFERENCE CANCELLER, CHIP EQUALIZER, FREQUENCY-DOMAIN EQUALIZER) |

Figure 20:
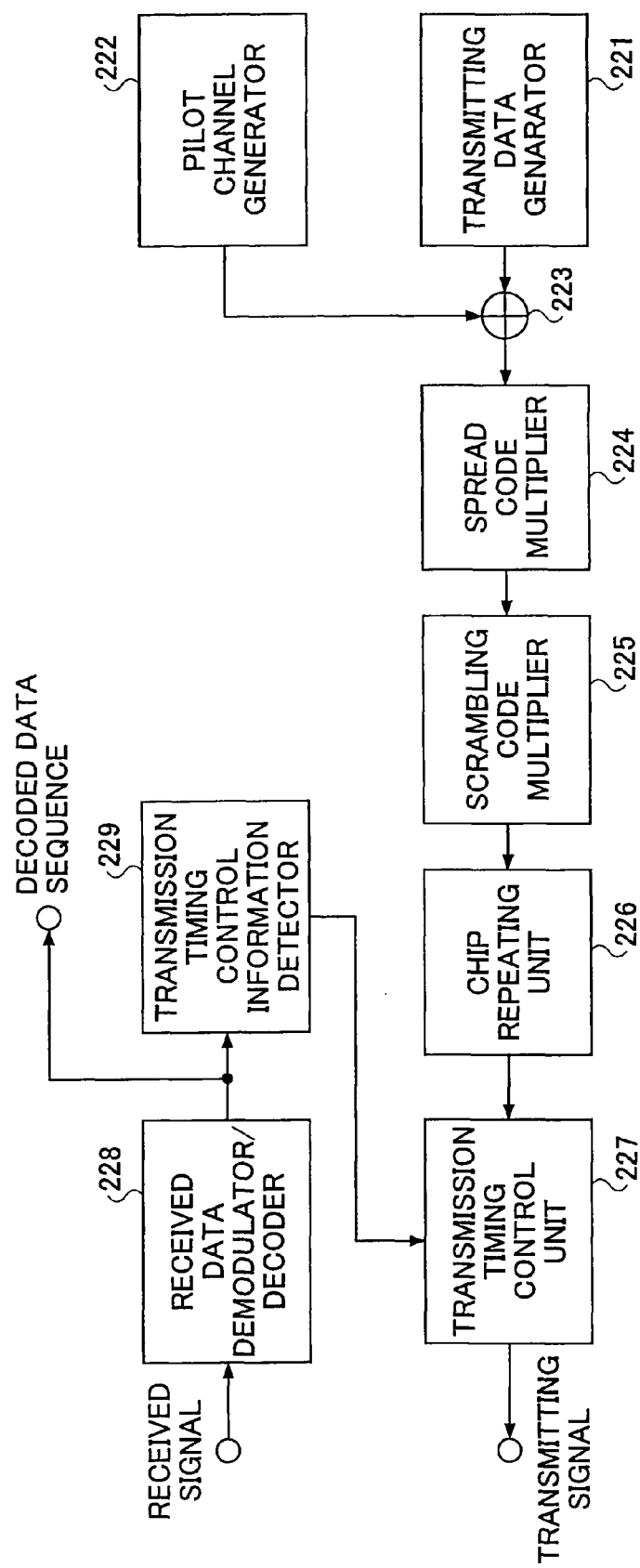
FIG. 20 is a schematic diagram of a configuration of a mobile station according to a sixth embodiment.

Next, a configuration of a mobile station according to the sixth embodiment is described. FIG. 20 is a schematic diagram of a configuration of a mobile station. A description of an operation of chip repetition applied to the mobile station which has already been provided is omitted.

In FIG. 20, the mobile station comprises as a transmitter a transmitting-data generator 221, a pilot-channel generator 222, an adder 223, a spreading-code multiplier 224, a scrambling-code multiplier 225, a chip-repetition unit 226, and a transmitting-timing controller 227, and as a receiver a receiving-data demodulator/decoder 228, and a transmission-timing control information detector 229.

Below an operation of the mobile station is described.

(An Operation of a Transmitter)

The pilot channel generated at the pilot-channel generator 222 and the transmitting data generated at the transmitting data generator 221 are added at the adder 223 so as to be multiplexed, and then spreading-code multiplying at the spreading-code multiplier 224 and scrambling-code multiplying at the scrambling-code multiplier 225 are performed. Then, chip repetition is performed at the chip-repetition unit 226 so as to generate the comb tooth-shaped frequency spectrum as a transmitting signal. Such generated transmitting signal is transmitted at a transmitting timing controlled at the transmission timing control unit 227. The transmission timing control unit 227 controls the transmitting timings of the transmitting signals based on the reporting from the transmission-timing control information detector 229 to be described below.

(An Operation of a Receiver)

The signal received at the mobile station (the received signal) is input to the received data demodulator/decoder 228 so as to be output as decoded sequence data after being data-demodulated and data-decoded in a case of the received signal being a data signal. On the other hand, in a case that the received signal is a controlling signal which includes the transmitting timing information, the received signal is sent to the transmission timing control information detector 229 via the received data demodulator/decoder 228. The transmission timing control information detector 229 detects a transmitting timing information from the received signal so as to report to the transmitting timing controller 228 of the transmitter.

Figure 21:
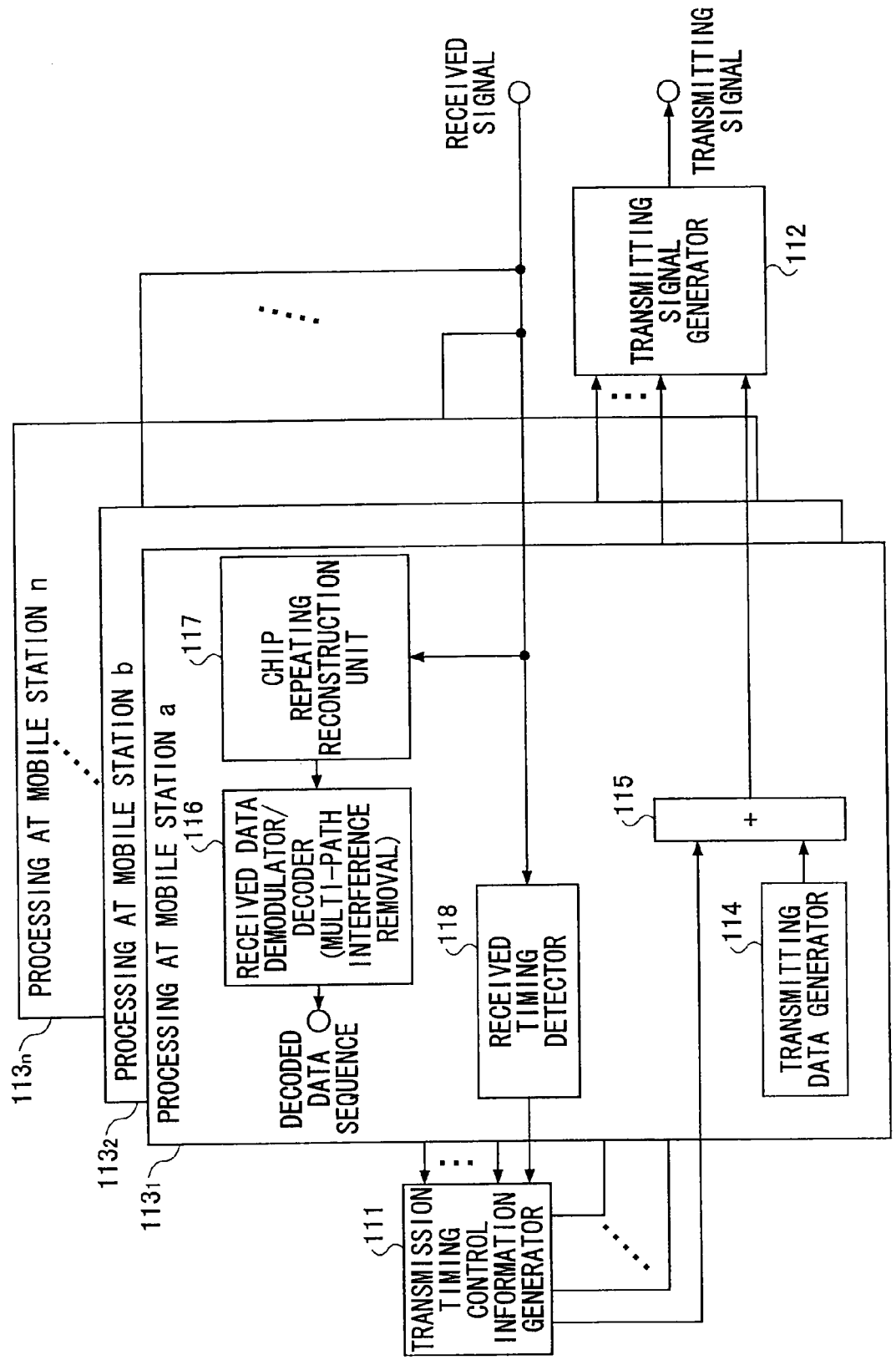
FIG. 21 is a schematic diagram of a configuration of a base station according to a sixth embodiment.

Next, a configuration of a base station according to the sixth embodiment is described. FIG. 21 is a schematic diagram of a configuration of a base station. A description of an operation of a multi-path interference canceller, a chip equalizer, and a frequency-domain equalizer already described herein is omitted.

In FIG. 21, this base station comprises a transmission-timing control information generator 111, a transmitting-signal generator 112, and processors 113-1 through 113-*n* of mobile stations 1 through n. As the configurations of the processors 113-1 through 113-*n* of the mobile stations a through n are the same, an exemplary configuration of the processor 113-1 of the mobile station a is described. The processor 113-1 of the mobile station a comprises as transmitting processing functions a transmitting data generator 114 and an adder 115 and as receiving processing functions a received data demodulator/decoder 116 which removes multi-path interference, a received data demodulator/decoder 116, a chip repetition reconstruction unit 117, and a received timing detector 118.

Below, an operation of the base station configured as described above is described.

The signals from the respective mobile stations (mobile station a through n) received at the base station undergo at the corresponding processors (the processors of the mobile stations a through n) 113-1 through 113-*n* the processing of the received signals.

The received signals from the respective mobile stations a through n input from the processors 113-1 through 113-*n* of the respective mobile stations a through n are multiplied with the mobile station-specific phase sequences comprised in the mobile stations a through n so as to undergo at the chip repetition reconstruction unit 117 an operation which restores chip repetition. Hereby, such demultiplexed signals from the respective mobile stations a through n undergo the removal of multi-path interference at the received data demodulator/decoder 116 so that the transmitting data are reconstructed for outputting as the decoded data sequence.

On the other hand, the received timing detector 118 uses the received pilot channels transmitted from the respective mobile stations a through n so as to perform the detection of the received timings. Herein, the detected received timing information is sent to the transmission timing control information generator 111 where the transmission timing control information such that the received timings at mobile stations a through n coincide with one another is generated.

Such generated transmission timing control information is sent to the adder 115 so as to be added with the transmitting data generated at the transmitting data generator 114 for transmission to the transmitting signal generator 112. The transmitting signal generator 112 includes the transmission timing control information as described above for reporting to the respective mobile stations.

As described above, in the wireless transmission system according to the sixth embodiment, mobile stations perform in addition to chip repetition a controlling of the transmitting timings so that the received timings at the base station coincide when the transmitting signals are sent to the base station, enabling a further reduction of the effect of multiple-access interference as the frequency spectrum of the respective mobile stations becomes fully orthogonal with one another on the frequency axis.

Figure 44:
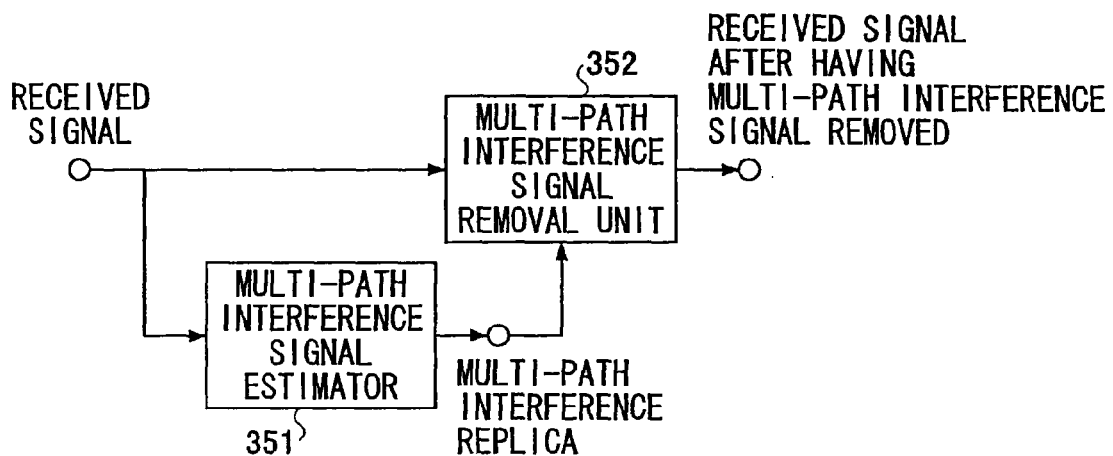
FIG. 44 is a schematic diagram of an exemplary configuration of a related-art multi-path interference canceller.
Figure 45:
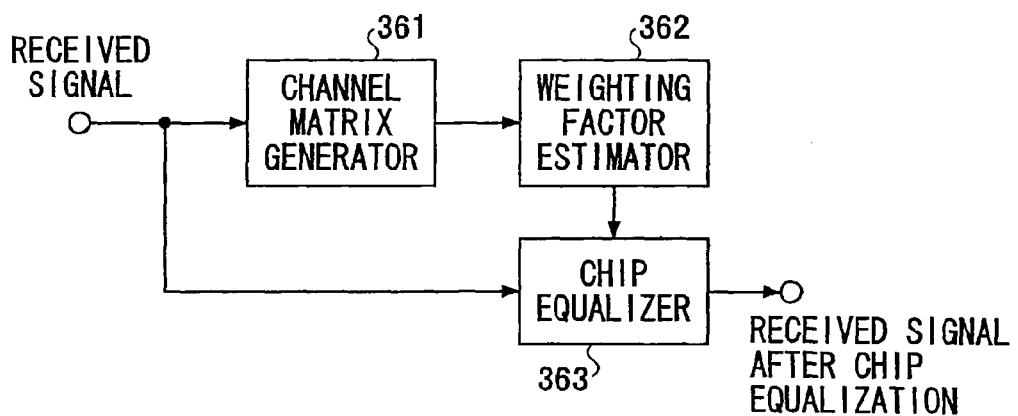
FIG. 45 is a schematic diagram of an exemplary configuration of a related-art chip equalizer.
Figure 46:
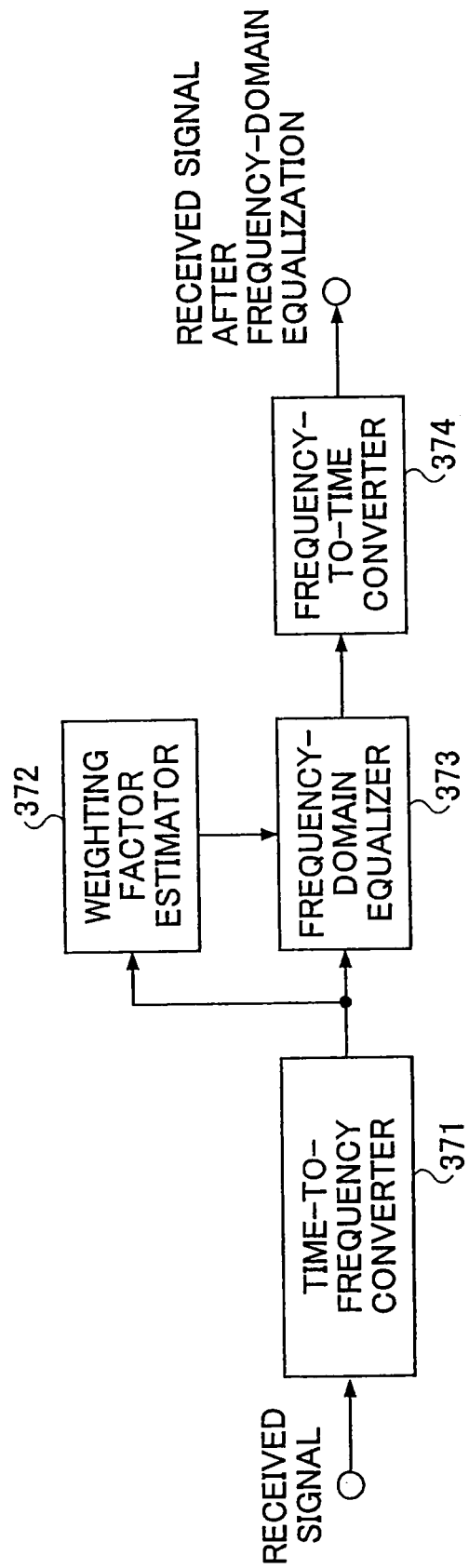
FIG. 46 is a schematic diagram of an exemplary configuration of a frequency-domain equalizer according to the related art.

Furthermore, at the base station, transmitting signals with a combined use of chip repetition and the transmission timing control received from the mobile stations are multiplied with the phase sequences corresponding to the respective mobile stations so as to restore the repeated chip pattern to the original form to demultiplex into the signals from the respective mobile stations. Then, those demultiplexed signals of the respective mobile stations are applied to the multi-path interference canceller, the chip equalizer, and the frequency-domain equalizer as illustrated in FIG. 44 through 46 in order to remove multi-path interference caused by the multi-path propagation of the own transmitting signal so as to reduce the effect of multiple interference. In other words, the receiver of the base station which performs the removal of interference caused by its own multiple signal enables a simplifying of the base station receiver configuration relative to the configuration which removes multiple-access interference from other mobile stations.

In the wireless transmission system according to the present embodiment, the mobile station comprises a function of changing the scrambling code multiplied to the spreading chip sequence. Below an operation of the mobile station as described above is described.

Figure 22:
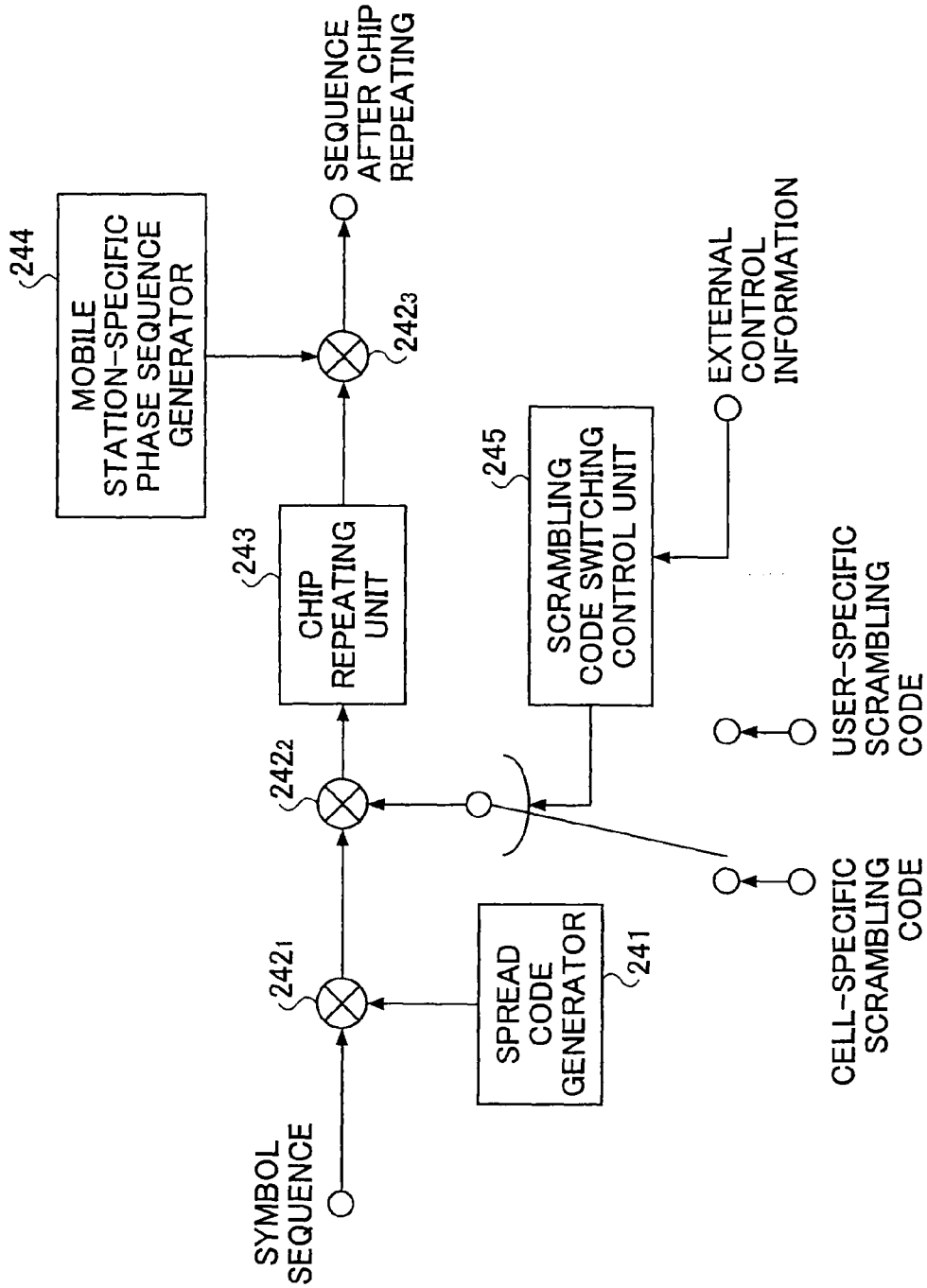
FIG. 22 is a schematic diagram of an exemplary mobile station according to a fifth embodiment which changes scrambling code according to external controlling information.

In FIG. 22, the data-symbol sequence is multiplied at the multiplier 242-1 with the spreading code generated at the spreading-code generator 241 so as to be multiplied at the multiplier 242-2 with the scrambling code. The scrambling code used in the multiplying of the scrambling code is used by switching at the scrambling code switching controlling unit 245 to one of the cell-specific scrambling code and the user-specific scrambling code. In the present embodiment, the scrambling code switching controlling unit 245 performs switching based on the external controlling information which instructs the switching of the scrambling code. As the external controlling information, the cell-configuration information indicating one of the multi-cell environment and the isolated cell environment, or one of the cell-specific and user-specific scrambling codes is used in accordance with the information such as the number of simultaneously-connecting mobile stations in an uplink. Subsequent to the scrambling code multiplying, the chip-repeated sequence is output via chip repetition at the data reuse unit 243 and the multiplying with the phase sequence generated at the mobile station-specific phase sequence generator 244 (multiplied at the multiplier 242-a).

Furthermore, in the wireless transmission system according to the present embodiment, the mobile station multiplies spreading codes different for the respective channels so as to multiplex multiple channels and then to perform chip repetition. Below, an operation of the mobile station is described, referring to FIG. 23.

Figure 23:
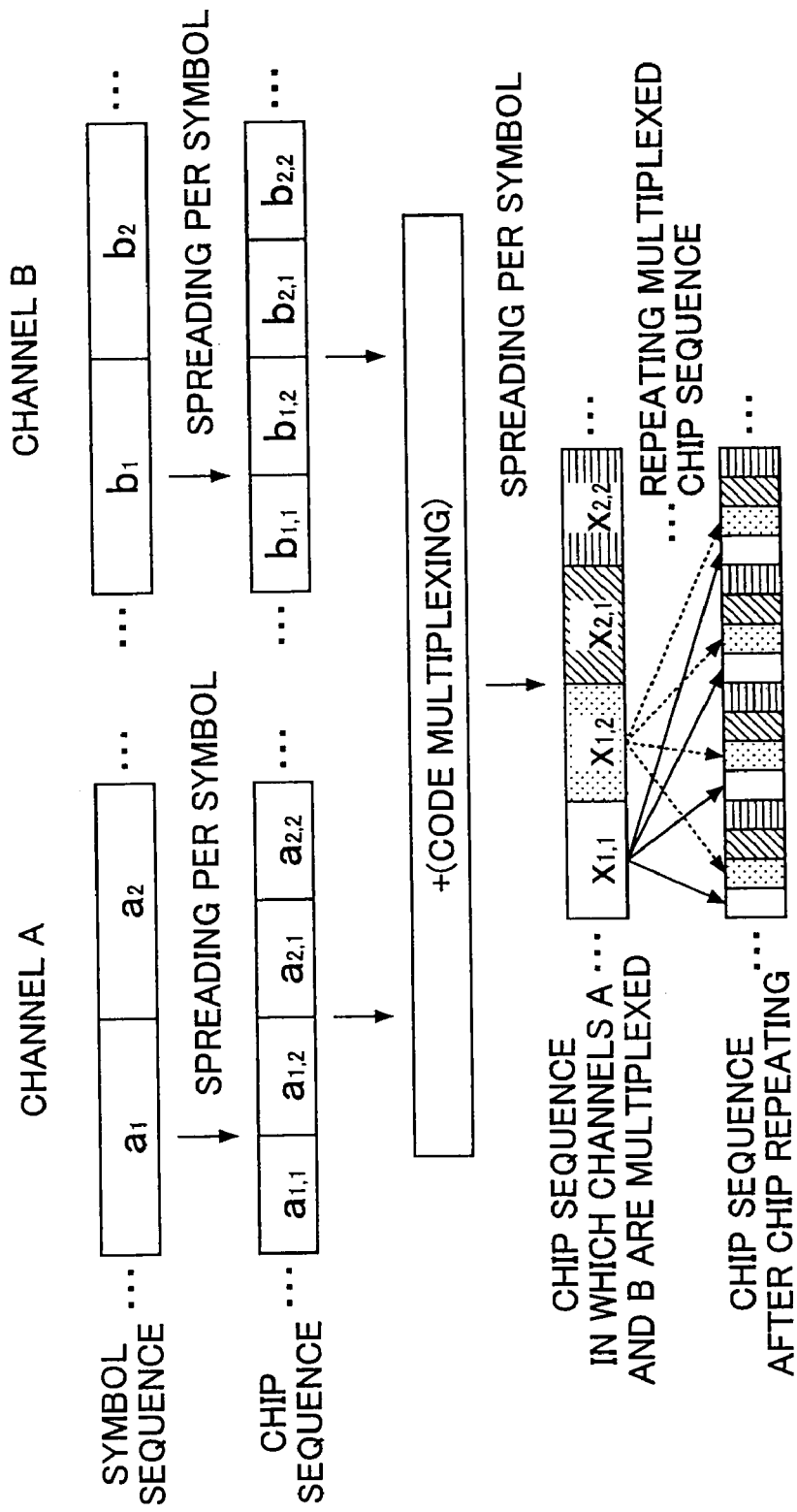
FIG. 23 is a diagram which describes an operation of a mobile station according to a sixth embodiment which applies chip repetition after multiplexing multiple channels.

In FIG. 23, a multiplying at the mobile station of different spreading codes having SF=2 to the different symbol sequences of channels A and B, or (a1, a2, . . . ) and (b1, b2, . . . ) enables a code-multiplexing of the two channels of the spreading chip sequence "a1,1", "a1,2", "a2,1", "a2,2", . . . , "b1,1", "b1,2", "b2,1", "b2,2" . . . . According to the present embodiment, a performing of chip repetition to such code-multiplexed chip sequence of channels A and B ("x1,1", "x1,2", "a2,1", "x2,2", . . . ) enables a flexible multiplexing of different channels within the comb tooth-shaped spectrum. Besides, for the channel multiplexing, there may be, for example, a case of multiplexing multiple data channels in accordance with the data transmission rate and a case of multiplexing a data channel and a controlling channel.

Furthermore, in a wireless transmission system according to the present embodiment, a mobile station comprises a function of changing a mobile station-specific phase sequence based on the external controlling information. Below an operation of the mobile station is described. The description of the process up to chip repetition according to the present embodiment which is the same as the process according to the embodiment as illustrated in FIG. 22 is omitted.

Figure 24:
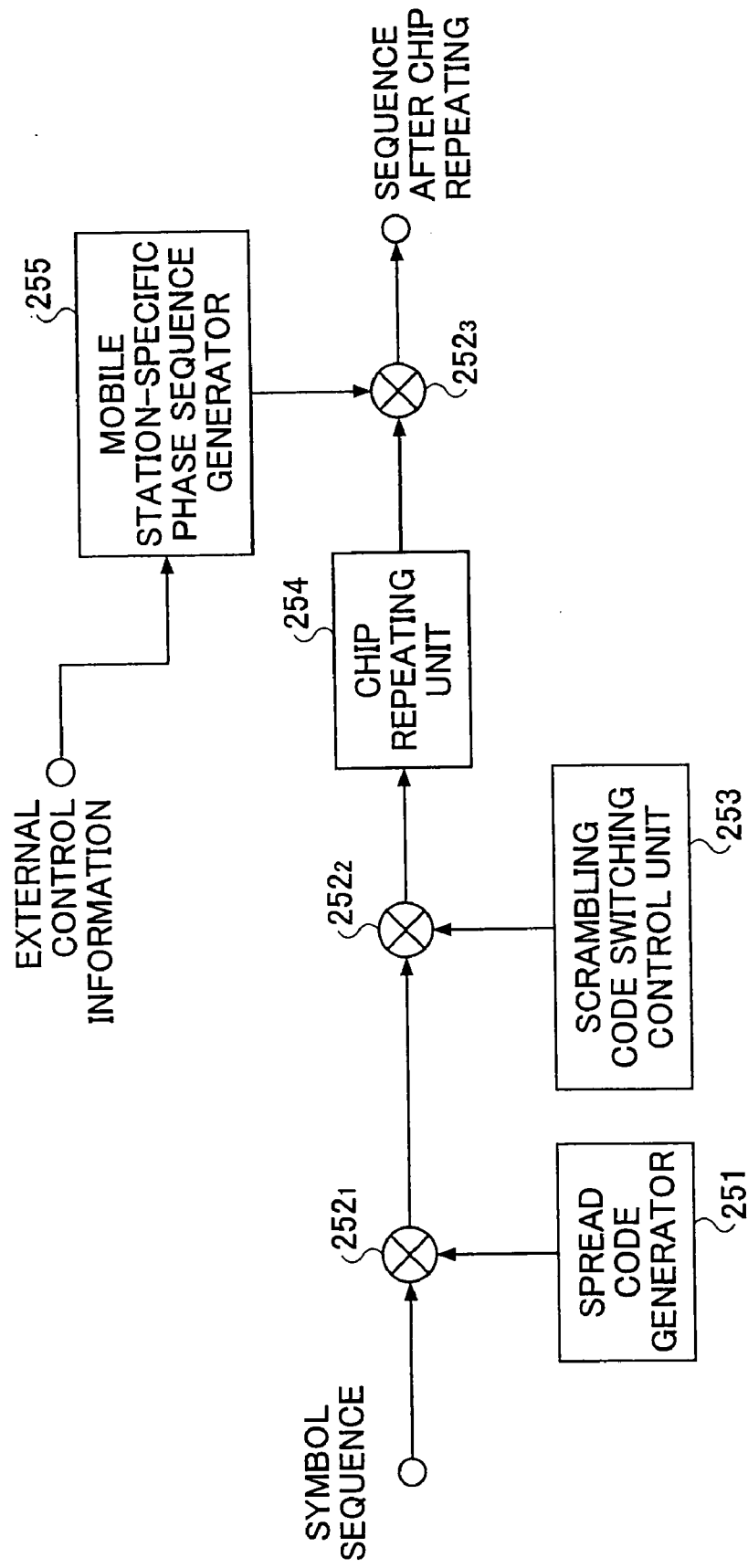
FIG. 24 is a schematic diagram of an exemplary configuration of a mobile station according to a fifth embodiment which changes a mobile station-specific phase sequence according to a set of controlling information from an outside source.

In FIG. 24, the external controlling information is input to the mobile station-specific phase sequence generator 255. According to the present embodiment, an inclusion as the external controlling information of the phase sequence information to be used as the information for reporting from the base station to the respective mobile stations enables a determination of the mobile station-specific phase sequence based on that reporting information. Furthermore, the method of determining the mobile station-specific phase sequence is not limited the method as described above. For example, it may comprise an aspect such that the respective mobile stations autonomously determine the mobile station-specific phase sequence by a predetermined method.

As described above, in order that the chip-repeated signals at the respective mobile stations be orthogonal to one another in the frequency domain, the received timings at the base station of the signals from the respective mobile stations need to coincide. Thus, in the wireless transmission system according to the present embodiment, the base station comprises a function of performing a loose transmitting timing control of the respective mobile stations so that the offsets among the received timings at the mobile stations are contained to within a predetermined time difference.

Figure 25:
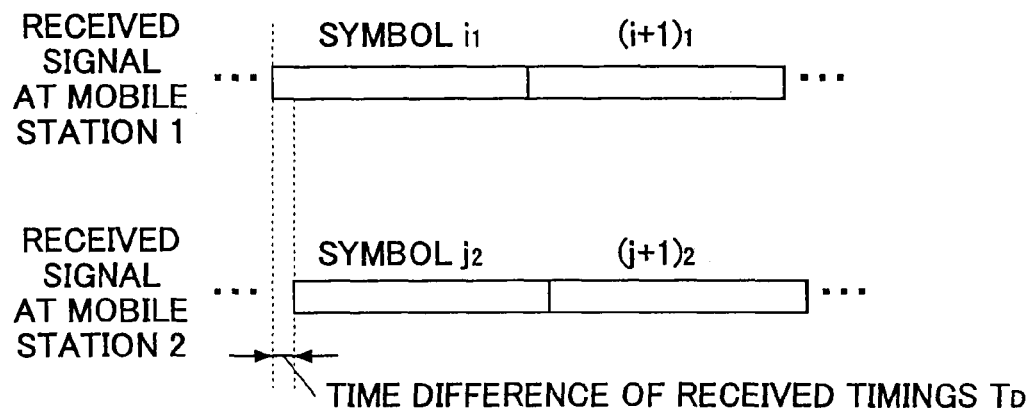
FIG. 25 is a diagram which describes the concept of a loose transmission timing control which is performed in a transmission system according to a sixth embodiment.

Below, the concept of a loose transmission timing control performed at the base station is described, referring to FIG. 25. Herein, for the brevity of the description, the target mobile stations for the transmission timing control are limited to the two mobile stations of the mobile station 1 and the mobile station 2.

According to the present embodiment, the loose transmission timing control is referred to a loose control of transmission timing so as to contain the time difference T-D between the received timings of a received symbol I-1 at the mobile station 1 and that of a received symbol j-2 at the mobile station 2 to within a predetermined time difference. This received time difference T-D needs only to be a time difference necessary for obtaining a frequency-domain orthogonality between the mobile stations and may be considered, for example, to be one or around a few blocks of a repetition pattern.

Such base station according to the present embodiment enables a reduction of the controlling load by performing transmission timing control of the respective mobile stations while allowing for the time difference T-D of the received timings.

Incidentally, in a case of applying the loose transmission timing control as described above, there may be a case in which multiple-access interference may occur as an offset of the received timings among the mobile stations at the base station causes the frequency-domain orthogonality of the chip-repeated signals at the respective mobile stations to be lost. Thus, in the wireless transmission system according to the present embodiment, the mobile station comprises a function of adding a guard interval so that the chip-repeated transmitting signal are fully orthogonal in the frequency domain. Below an operation of the mobile station is described, referring to FIG. 26.

Figure 26:
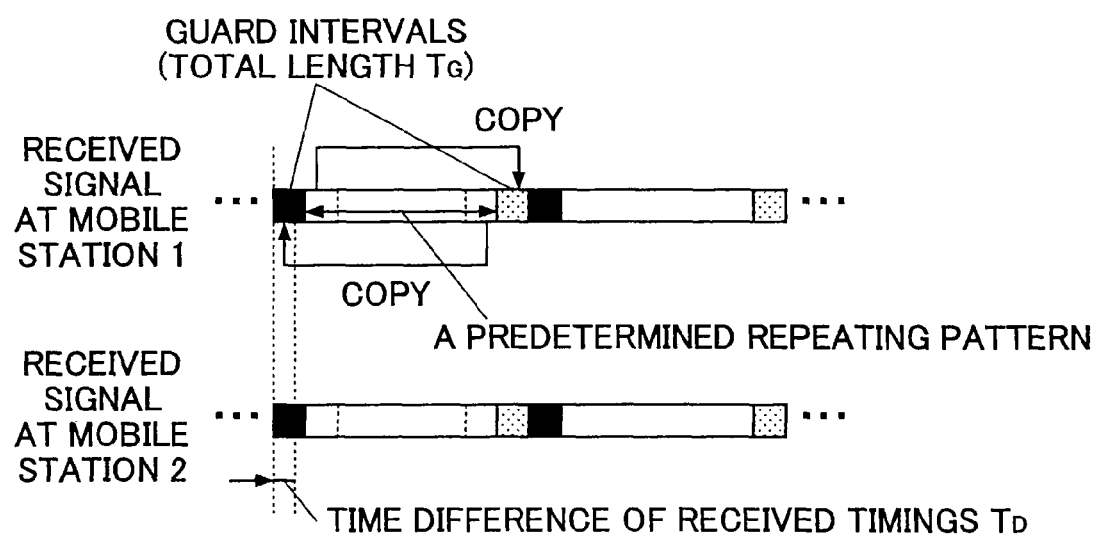
FIG. 26 is a diagram which describes an operation of a mobile station according to a sixth embodiment which inserts a guard interval per a predetermined repetition pattern.

In FIG. 26, an exemplary case of generating a guard interval by duplicating the respective portions of the tail-end and the head of the chip pattern generated by chip repetition to the tail-end and the head of the corresponding chip pattern is illustrated.

While the base station receives from the respective mobile stations such signal having the guard interval as described above added, the chip-repeated signals of the respective mobile stations are received with a frequency-domain orthogonality when the time difference T-D of the received timings due to the loose transmission timing control is small relative to the total length T-G of the guard interval generated as described above. In other words, even in a case of applying a loose transmission timing control, reduction of multiple-access interference is enabled by inserting at the mobile station the guard interval as described above.

Furthermore, the mobile station as described above comprises a function of setting the length of the chip-repeated chip pattern longer than the time difference at the base station of the received timings of the respective mobile stations from a point of view of reducing multiple-access interference. Below an operation of the mobile station is described, referring to FIG. 27.

Figure 27:
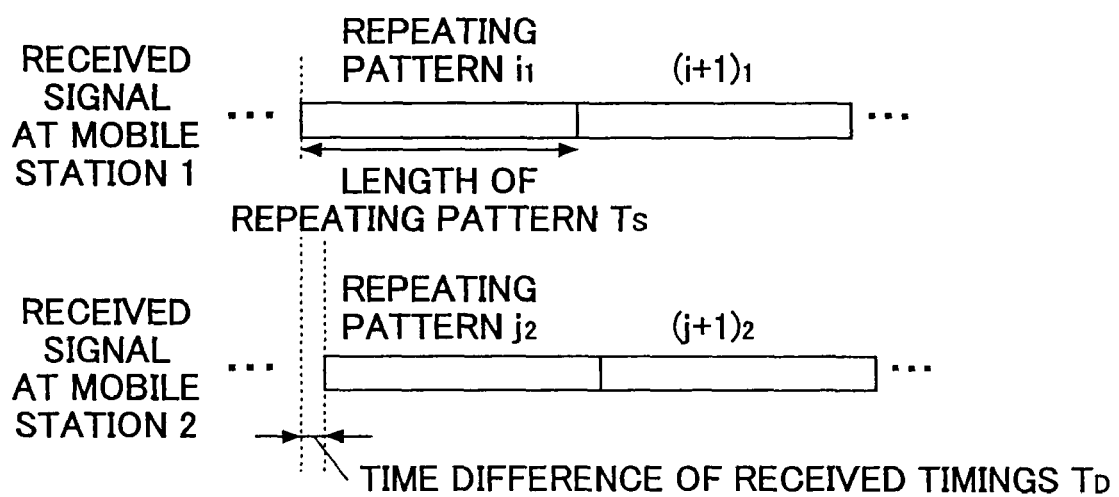
FIG. 27 is a diagram which describes an operation of a mobile station according to a sixth embodiment which sufficiently lengthens a predetermined reuse pattern.

In FIG. 27, the mobile station sets the chip-repeated chip pattern length T-S to be sufficiently longer than the time difference T-D of the received timings at the respective mobile stations. Hereby, reduction of the effect of losing frequency-domain orthogonality of the signals of the respective mobile stations and of multiple-access interference is enabled. Furthermore, according to the present embodiment, improvement in transmission efficiency is enabled by not performing the inserting of the guard interval as illustrated in FIG. 26 so as to reduce redundant data.

Figure 28:
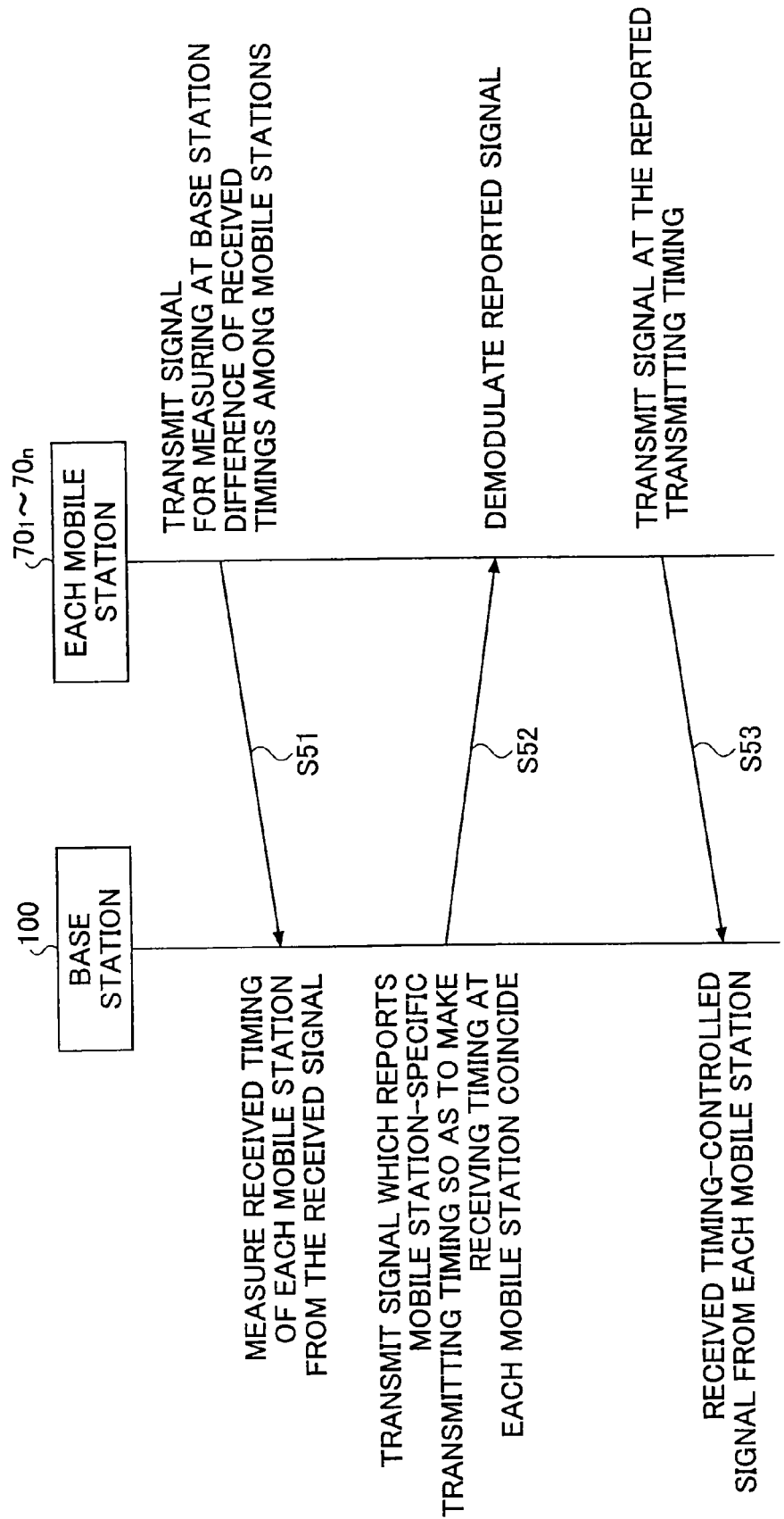
FIG. 28 is a sequence diagram of an operation of a loose transmission timing control performed in a wireless transmission system according to a sixth embodiment.

Next, a specific example of the transmission timing control performed in a wireless transmission system is described, referring to the sequence diagram in FIG. 28.

In FIG. 28, in S51, the signals for measuring at the base station 100 the differences among the respective mobile stations 70-1 through 70-n of the received timings are transmitted from the respective mobile stations 70-1 through 70-n. The base station 100 receives the signals as described above transmitted from the respective mobile stations 70-1 through 70-n so as to measure the received timings of the respective mobile stations.

In S52, the base station 100 computes the transmitting timings of the respective mobile stations 70-1 through 70-n so that the received timings of the respective mobile stations 70-1 through 70-n coincide so as to transmit the signal reporting these transmitting timings to the respective mobile stations 70-1 through 70-n. The respective mobile stations 70-1 and 70-n demodulate the signal as described above reported from the base station 100.

In S53, the respective mobile stations 70-1 through 70-n transmit the signals based on the transmitting timings obtained after demodulation as described above. Hereby, the base station 100 enables reception of the signal so that the received timings of the signals from the respective mobile stations 70-1 through 70-n coincide.

Thus, the base station 100 according to the present embodiment generates the transmission timing control information for the respective mobile stations 70-1 through 70-n based on the differences among the respective mobile stations of the received timings. In other words, a setting of more coarse resolution of such transmitting timing information enables implementation of loose transmission timing control which handles an operation as a step-like operation. On the other hand, a setting of finer resolution of the information on the transmitting timings to be reported to the respective mobile stations enables an implementation of more strict transmission timing control.

As described above, the base station according to the present embodiment comprises the function of measuring the received timings of the respective mobile stations for reporting transmission timing control information to the respective mobile stations. As a signal used for measuring this received timing, a pilot signal may be considered. In other words, using the wireless transmission system according to the present embodiment, the mobile station comprises a function of multiplexing to the transmitting signal a pilot channel having a known amplitude and phase so as to perform chip repetition. Below the method of multiplexing the pilot channel at the mobile station is described, referring to FIG. 29 through FIG. 31.

(A First Multiplexing Method of Pilot Channel)

Figure 29:
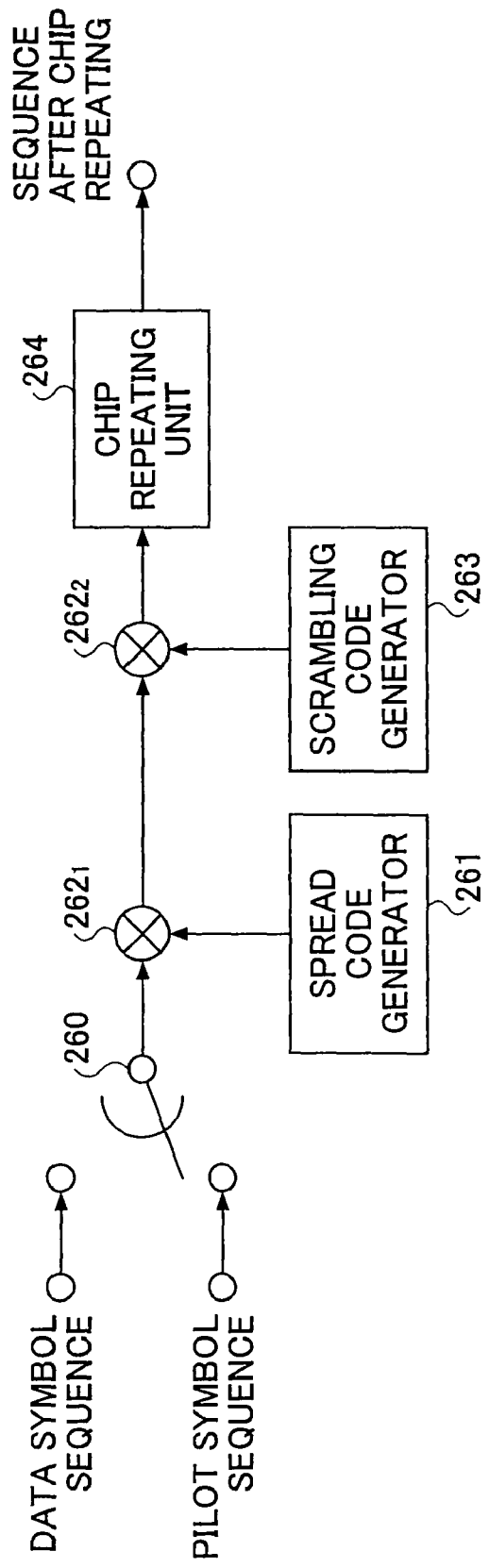
FIG. 29 is a schematic diagram of a first exemplary configuration of a mobile station according to a sixth embodiment which applies chip repetition and time-multiplexes pilot channels.

FIG. 29 is a schematic diagram of an exemplary embodiment in a case of time-multiplexing a data channel transmitting a data chip and a pilot channel transmitting a pilot symbol. As illustrated in FIG. 29, the data symbol input from the data symbol sequence input port and the pilot symbol input from the pilot symbol sequence input port are temporally switched at the switch 260 so as to be input at the multiplier 262-1 and then to be multiplied at the same multiplier 262-1 the spreading code generated at the spreading-code generator 261. Thereafter, as described above, scrambled-code multiplying and chip repetition are performed so as to output as the chip-repeated sequence.

(A Second Multiplexing Method of Pilot Channel)

Figure 30:
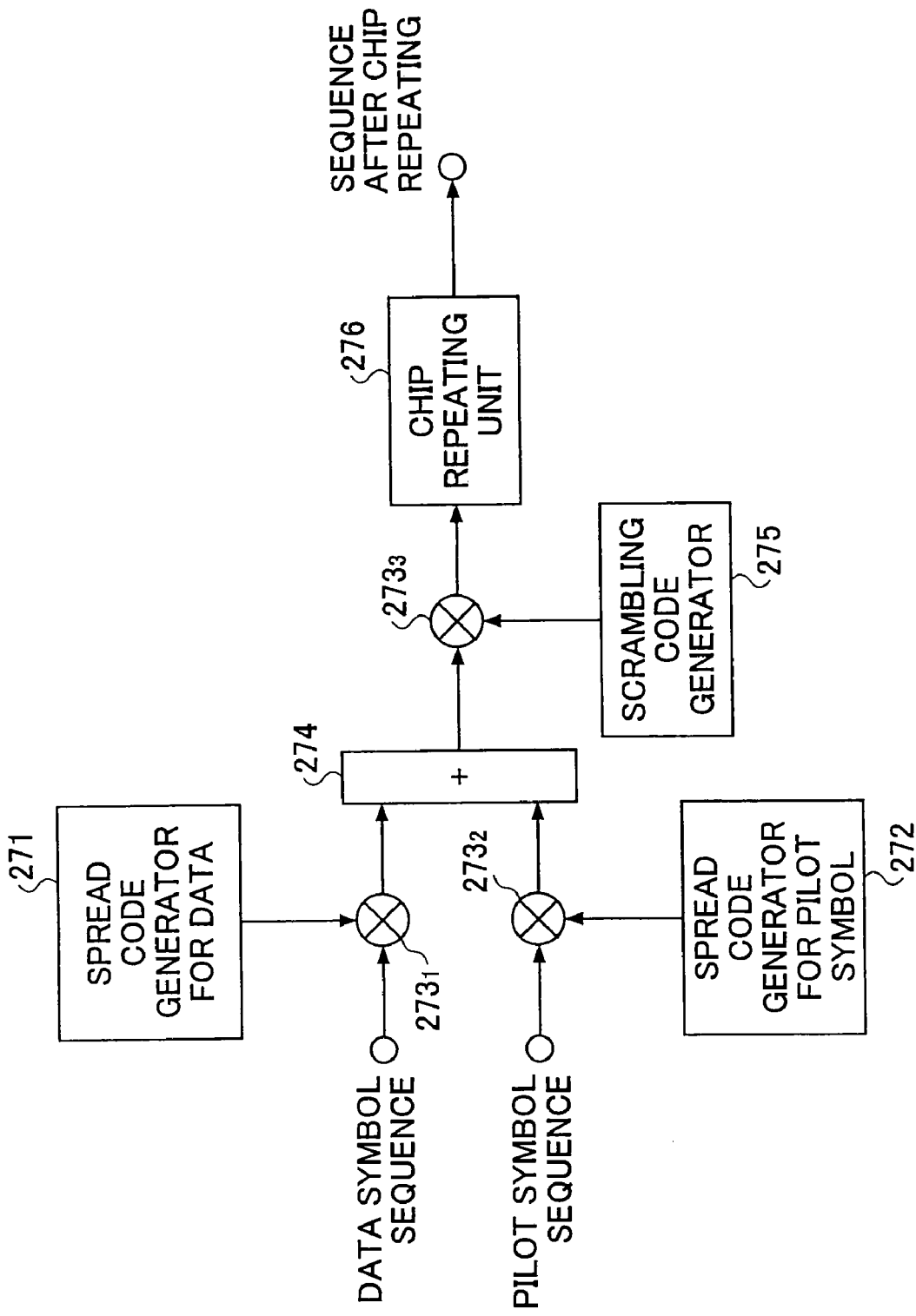
FIG. 30 is a schematic diagram of a second exemplary configuration of a mobile station according to a sixth embodiment which applies chip repetition and time-multiplexes pilot channels.

FIG. 30 is an exemplary embodiment in a case of assigning different spreading codes to a data channel transmitting a data symbol and a pilot channel transmitting a pilot symbol so as to code-multiplex. As illustrated in FIG. 30, the data symbol input from the data symbol sequence input port and the pilot symbol input from the pilot symbol sequence input port are respectively multiplied by the different spreading codes. More specifically, the data symbol is multiplied by the spreading code generated at the spreading-code generator for data symbol 271 while the pilot symbol is multiplied by the spreading code generated at the spreading code generator for pilot symbol 272.

Such spreading-code multiplied data symbol and pilot symbol are code-multiplexed at the adder 274 so as to undergo scrambling-code multiplying and chip repetition for outputting.

(A Third Multiplexing Method of Pilot Channel)

Figure 31:
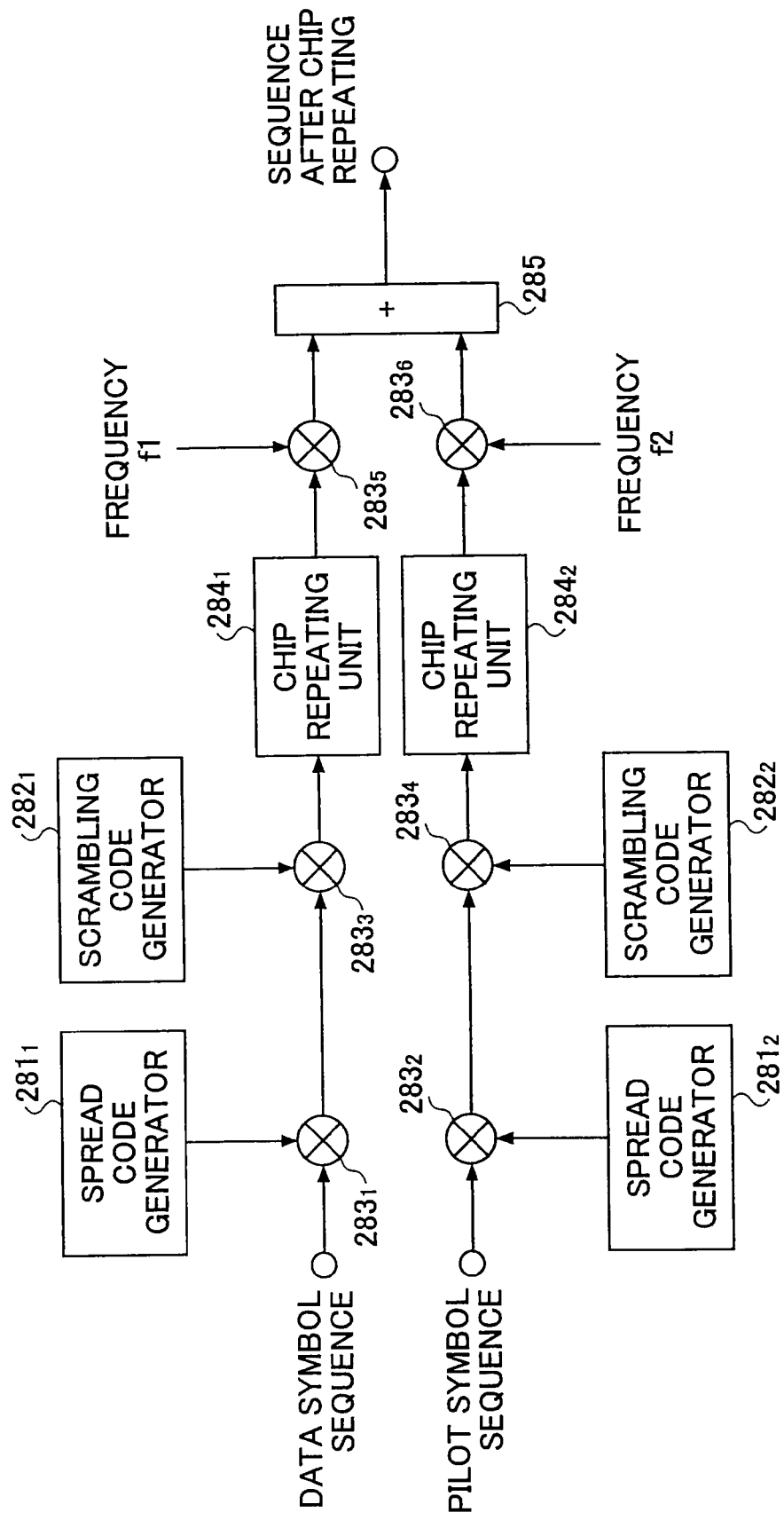
FIG. 31 is a schematic diagram of a third exemplary configuration of a mobile station according to a sixth embodiment which applies chip repetition and time-multiplexes pilot channels.

FIG. 31 is an exemplary embodiment in a case of assigning different frequencies to the data channel transmitting data symbol and the pilot channel transmitting pilot symbol so as to frequency-multiplex. As illustrated in FIG. 31, data symbol input from data symbol sequence input port and pilot symbol input from pilot symbol sequence input port are multiplied with the spreading codes generated at the respective spreading code generators 281-1 and 281-2, are multiplied with the scrambling codes generated at the respective scrambling-code generators 282-1 and 282-2, and then chip-repeated at the respective chip-repetition units 284-1 and 284-2 so as to be multiplied by different frequencies (in this case, f1 and f2). Then the symbols are frequency-multiplexed at the adder 285 for outputting.

As described above, according to the embodiments as illustrated in FIG. 29 through FIG. 31, the mobile station multiplexes the pilot channels so as to apply chip repetition to generate the comb tooth-shaped frequency spectrum. Hereby, an arrangement of transmitting signals from the mobile stations to have a frequency-domain orthogonality is enabled. Moreover, at the base station, a measurement of the received timings at the respective mobile stations using the pilot channel as described above is enabled.

Next, a method of measuring the received timing at the base station using the pilot channel as described above is described.

Figure 32:
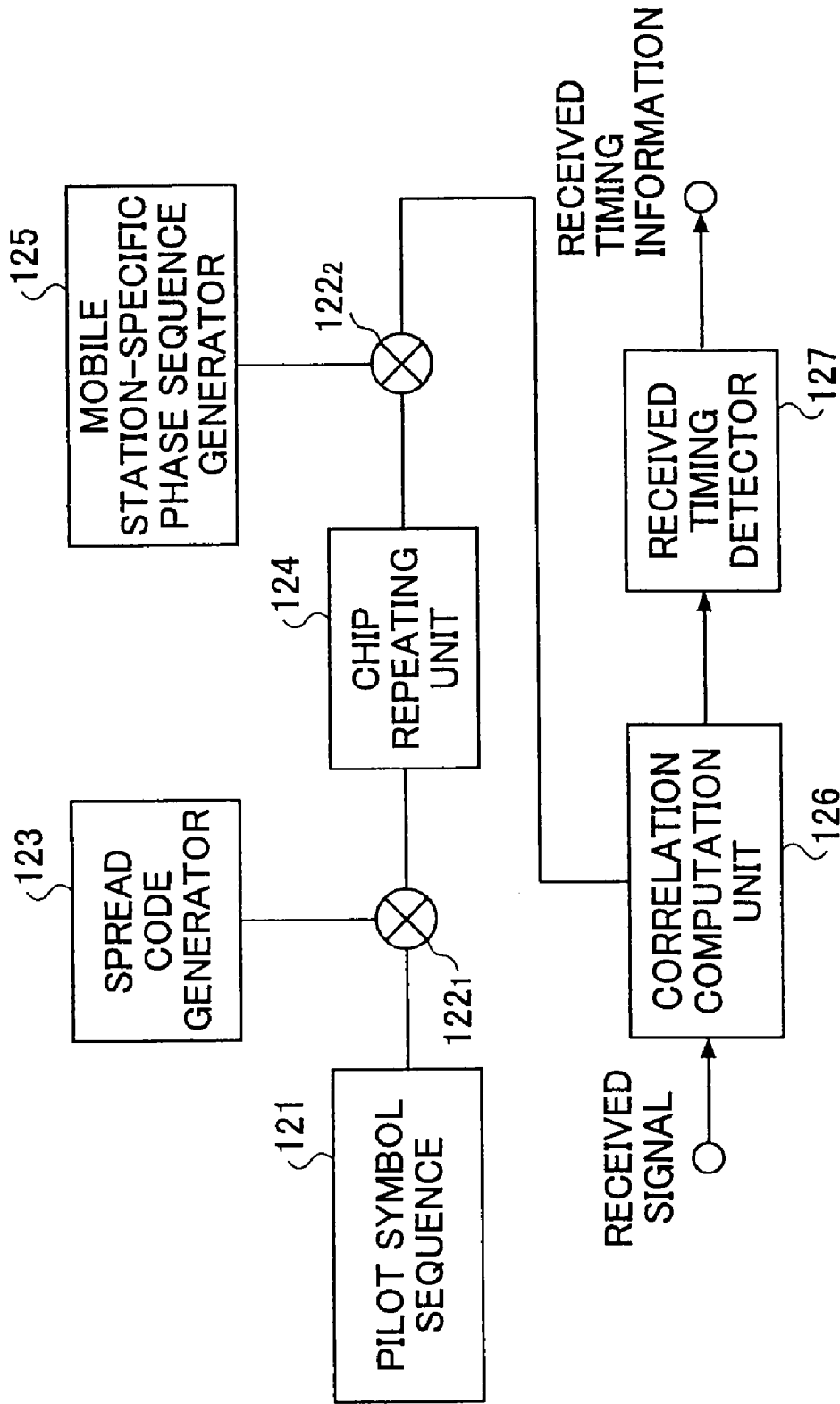
FIG. 32 is a schematic diagram of an exemplary configuration of a base station according to a sixth embodiment which measures received timing by pilot channels which apply chip repetition.

FIG. 32 is a schematic diagram of an exemplary configuration of a base station which measures received timings of the respective mobile stations by chip-repeated pilot channels. Below an operation of the base station as described is described, referring to FIG. 32.

In FIG. 32, the base station generates a signal by multiplying the pilot symbols corresponding to the respective mobile stations generated at the pilot-symbol pattern generator 291 with the spreading code generated at the spreading-code generator 293, applying chip-repetition at the chip-repetition unit 294, and multiplying the mobile station-specific phase generated at the mobile station-specific phase-sequence generator 295. Correlation of such generated signal with the received signal is computed at the correlation operator 296 so as to detect the received timings of the mobile station for the respective paths. Herein, the paths are referred to the respective transmitting signals received at the base station via different propagation routes. Hereby, a measurement of the received timings of the respective mobile stations using the pilot channel is enabled even in a case of applying chip repetition.

Next, the embodiment in a case of performing the transmission timing control of the respective mobile stations by using the detected received timings of the mobile stations as described above is described.

Figure 33:
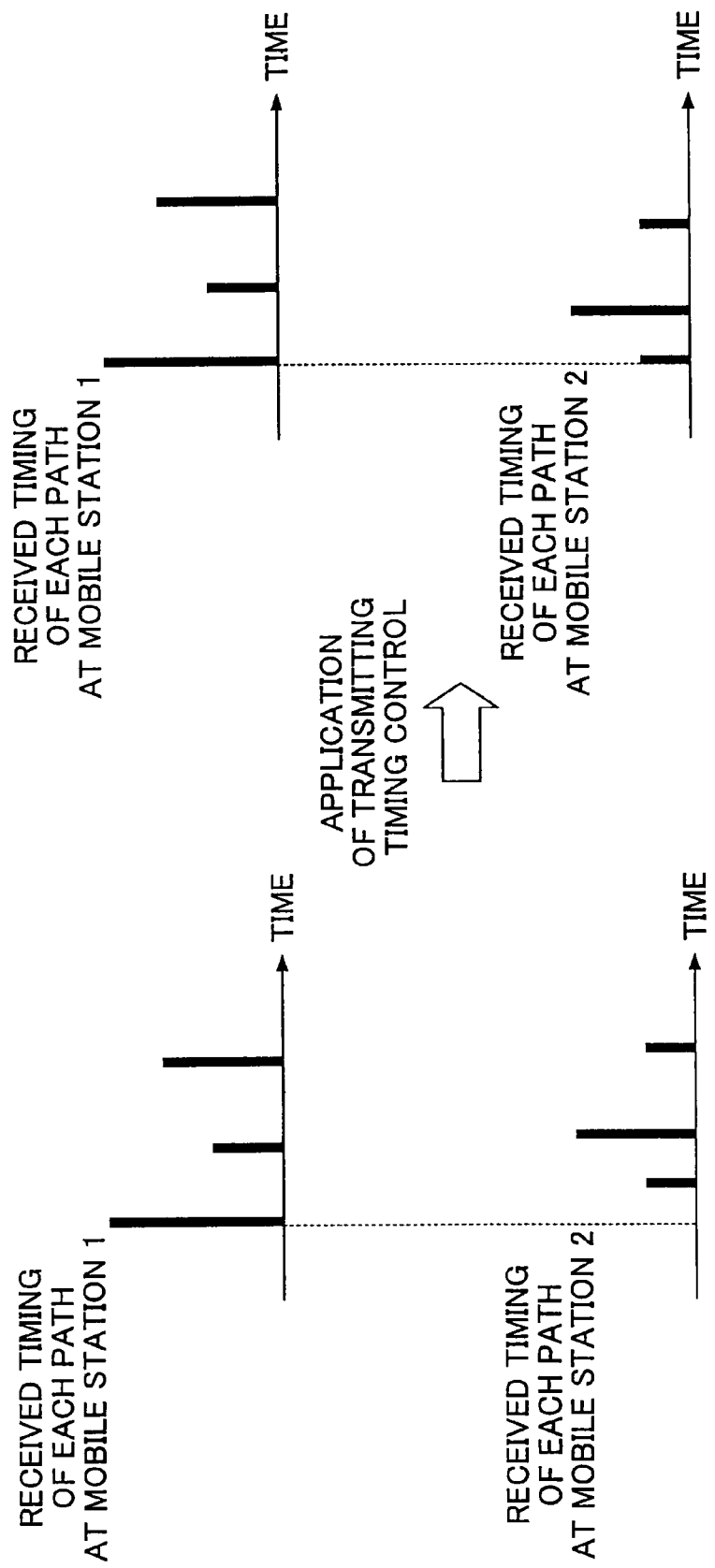
FIG. 33 is a diagram which describes a transmission timing control in accordance with received timings of first paths of the mobile stations.

FIG. 33 is a diagram which describes a transmission timing control in accordance with the received timings of first paths of the respective mobile stations.

In FIG. 33, the left portion is a schematic diagram of the received timings of the respective paths for the respective mobile station (herein, mobile station 1, mobile station 2) detected at the received-timing detector 297 as illustrated in FIG. 32.

According to the present embodiment, the base station detects for the respective mobile stations paths comprising received power above or equal to a predetermined received power as effective signal power path. Then, based on the detected result, the transmission timing control is performed such that the first paths of the respective mobile stations are received at the same timing. For example, as illustrated in the right portion of FIG. 32, the transmitting timings of the respective mobile stations is controlled so that the received timing of the first path of the mobile station 1 and the received timing of the first path of the mobile station 2 coincide. In other words, the base station according to the present embodiment enables a suppression of the effect of multiple-access interference from other mobile stations according to the principle of frequency-domain orthogonality with chip repetition by performing the transmission timing control.

While a case of measuring the received timings from the respective mobile stations so as to determine the amount of controlling of the transmission timings from the respective mobile stations based on the measurement result is described in the embodiment as described above, the wireless transmission system according to the present embodiment comprises a function of autonomously determining the transmitting timing of the own station. Below an operation of the mobile station as described above is described, referring to FIG. 34.

According to the present embodiment, the mobile station uses the common pilot signal transmitted to all mobile stations. This common pilot signal is used for such purposes as the estimation of the received power at the mobile station, and the estimation of the change in the propagation channel.

Figure 34:
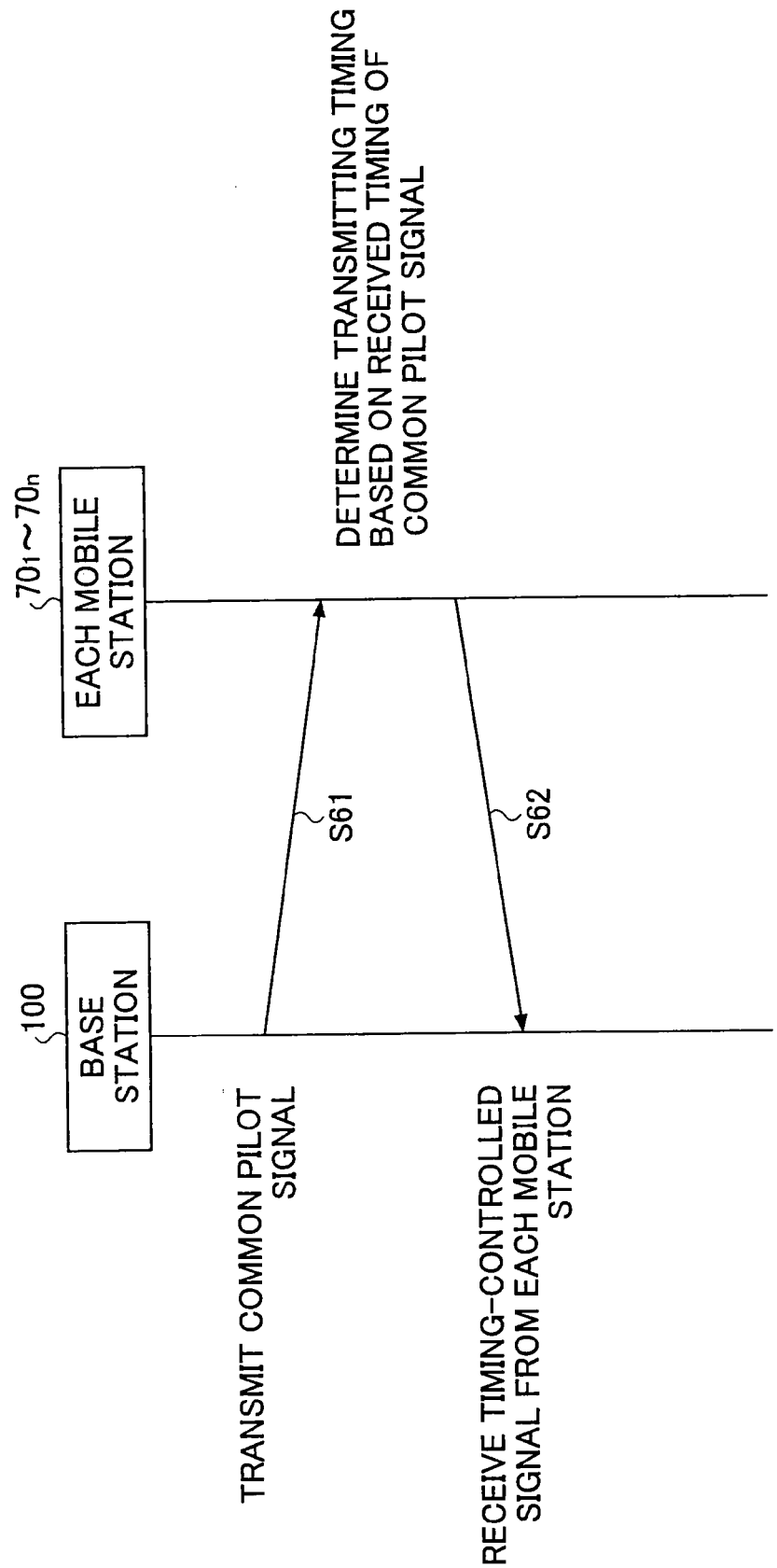
FIG. 34 is a schematic diagram of an operation of a wireless transmission system according to a sixth embodiment which performs transmission timing control using a common pilot signal.

In FIG. 34, in S61, the base station 100 transmits the common pilot signal to the respective mobile stations 70-1 through 70-n. The respective mobile stations 70-1 through 70-n receive the common pilot signal so as to determine the transmitting timing based on that received timing.

In S62, the respective mobile stations 70-1 through 70-n transmit the signal at the transmitting timing determined as described above, while the base station 100 receives the timing-controlled signals from the respective mobile stations 70-1 through 70-n.

The present embodiment, unlike the method of the transmission timing control as illustrated in FIG. 28, enables a simplifying of the configurations of the base station and the mobile stations as the controlling signal for reporting the transmitting timings fed back to the respective mobile stations from the base station is not needed. On the other hand, the time difference T-D among the mobile stations in the received timings, while considered to be larger relative to the embodiment as illustrated in FIG. 28, is considered to be applicable to the loose transmission control used in the condition in which the cell radius is small.

A Seventh Embodiment

A configuration of a wireless transmission system according to a seventh embodiment is described. The wireless transmission system according to the seventh embodiment, as in the sixth embodiment, comprises the mobile stations and the base station, applying the transmission timing control so that the received timings at the respective mobile stations of the paths having the maximum receiving power coincide. A summary of the functions of the mobile stations and the base station according to the seventh embodiment is provided below.

| TYPE OF INTERFERENCE | INTERFERENCE SIGNAL FROM OTHER MOBILE STATIONS (MULTIPLE-ACCESS INTERFERENCE) | | INTERFERENCE BY MULTI-PATH PROPAGATION OF TRANSMITTING SIGNAL (MULI-PATH INTERFERENCE) |
| --- | --- | --- | --- |
| | INTERFERENCE FROM MAXIMUM RECEIVED POWER PATHS | INTERFERENCE FROM OTHER PATHS | |
| APPLIED TECHNOLOGIES | APPLYING OF STRICT TRANSMISSION TIMING CONTROL | REMOVAL OF MULTI-PATH INTERFERENCE AT THE BASE STATION (MULTI-PATH INTERFERENCE CANCELLER, CHIP EQUALIZER, FREQUENCY-DOMAIN EQUALIZER) | |

Figure 35:
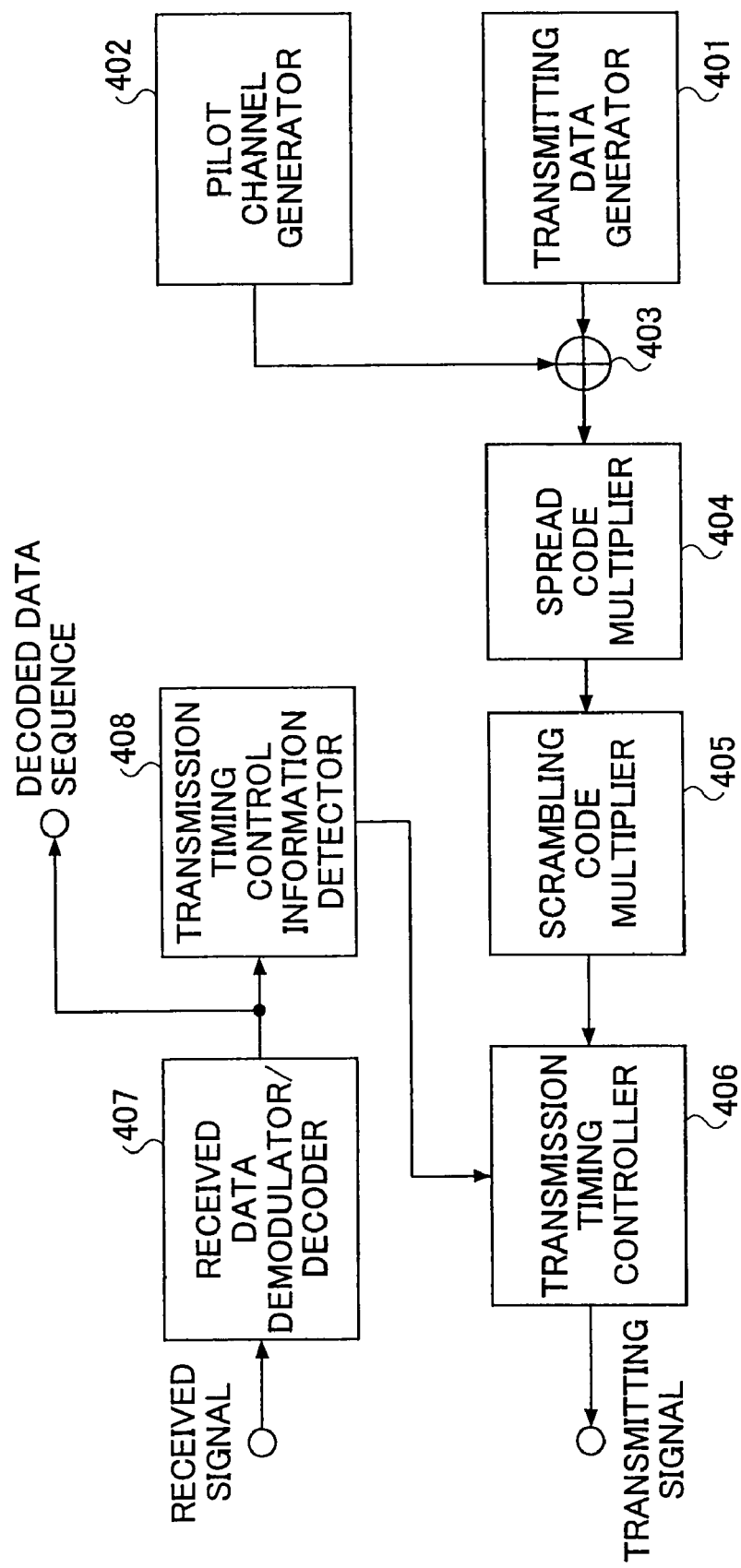
FIG. 35 is a schematic diagram of a configuration of a mobile station according to a seventh embodiment.

Next, the configuration of the mobile station according to the seventh embodiment is described. FIG. 35 is a functional block diagram which illustrates a configuration of a mobile station.

In FIG. 35, this mobile station has the configuration with the chip-repetition unit omitted when compared with the mobile station according to the sixth embodiment as illustrated in FIG. 20. Thus, herein such description is omitted.

Figure 36:
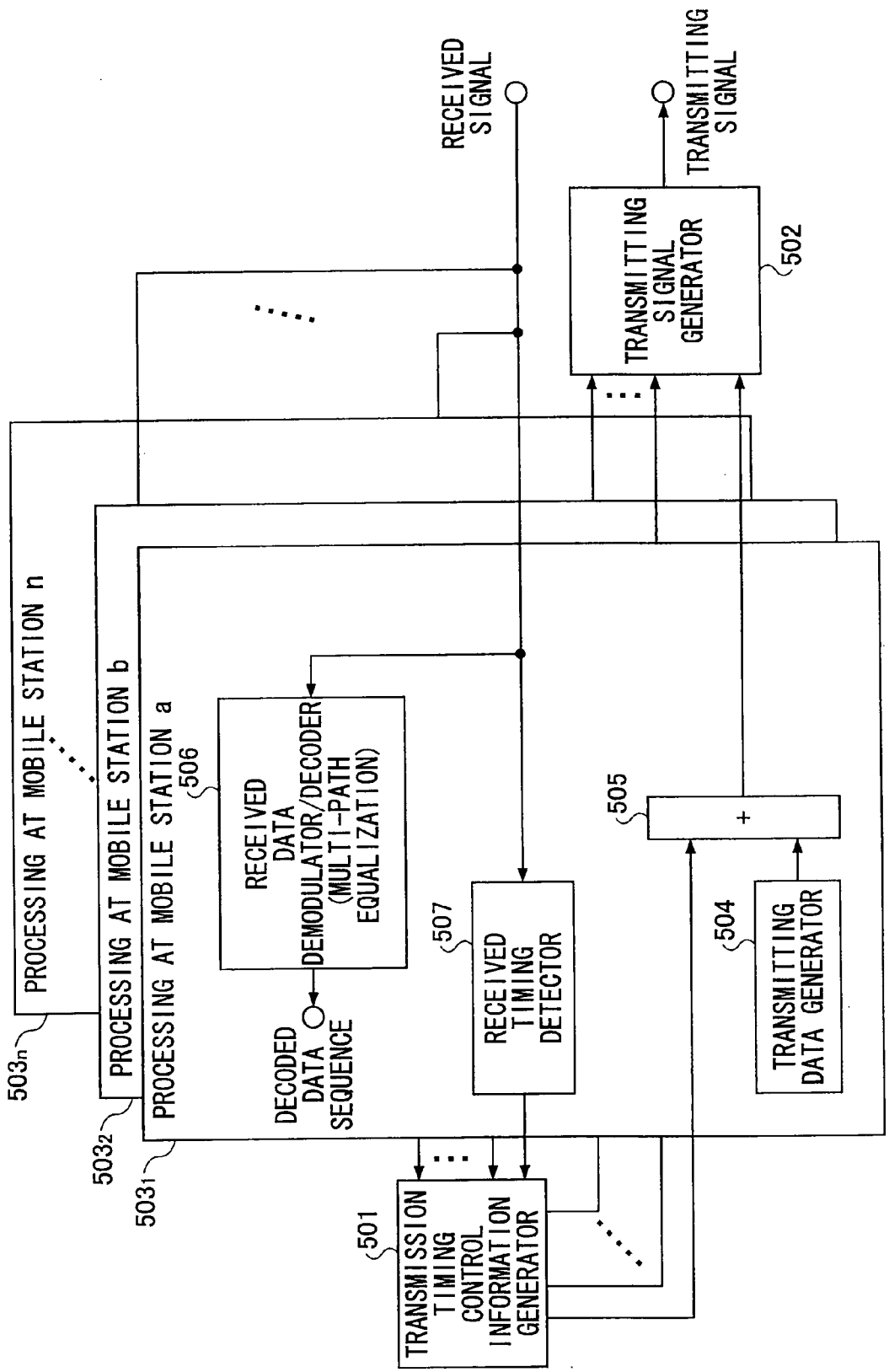
FIG. 36 is a schematic diagram of a configuration of a base station according to a seventh embodiment.

Moreover, the base station according to the seventh embodiment is configured as in FIG. 36, for example, the configuration having the chip-repetition unit omitted as compared with the base station according to the sixth embodiment as illustrated in FIG. 21. Thus, herein such description is omitted.

In the wireless transmission system according to the seventh embodiment, the base station performs a strict transmission timing control of the respective mobile stations so that the received timings of the paths comprising the maximum received power at the respective mobile stations coincide. Hereby, a reduction of multiple-access interference caused by the maximum received power paths of other mobile stations is enabled. Moreover, the multiple interference canceller, the chip equalizer, and the frequency-domain equalizer as illustrated in FIG. 44 through FIG. 46 are applied to interference due to the own delay wave caused by interference from the paths of other mobile stations having non-coincident received timings. Hereby, a reduction of the effect of interference is enabled.

Figure 37:
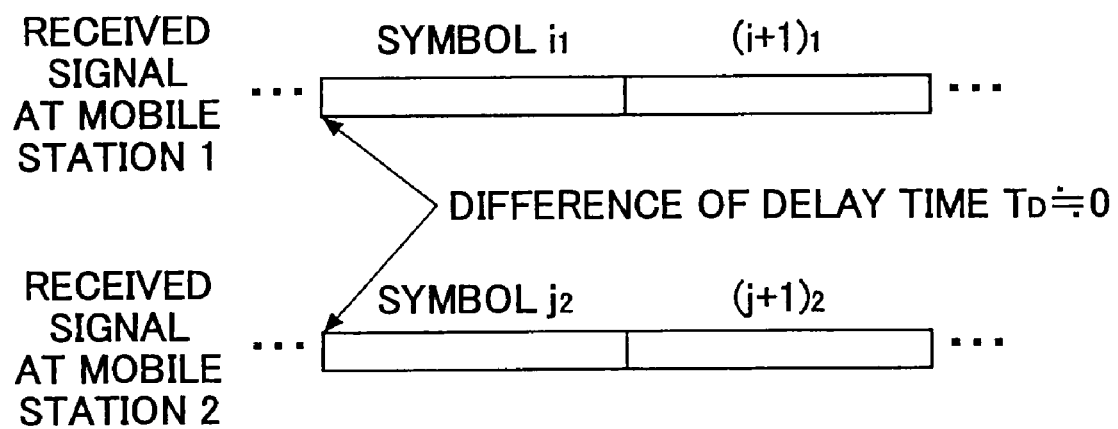
FIG. 37 is a diagram which describes the concept of a strict transmission timing control performed in a wireless transmission system according to a seventh embodiment.

Next, a specific example of the strict transmission timing control performed at the wireless transmission system according to the present embodiment is described, referring to FIG. 37.

FIG. 37 is a diagram which describes the strict transmission timing control between the mobile station 1 and the mobile station 2. In the present embodiment, the strict transmission timing control, as illustrated in FIG. 37, refers to performing the transmission timing control of the mobile station 1 and the mobile station 2 so that the time difference T-D between the mobile station 1 and the mobile station 2 in the received timings of the maximum received power paths becomes almost 0 (for example, the delay time difference T-D between the received symbol i-1 of the mobile station 1 and the received symbol i-2 of the mobile station 2 is set to be less than or equal to one-fourth of the chip length) so as to coincide the received timings at the base station. In other words, as the base station performs the transmission timing control so that the received timings from the mobile station 1 and from the mobile station 2 coincide, a suppression of multiple-access interference is enabled by setting the signals having the same received timing from the mobile station 1 and from the mobile station 2 orthogonal when the spreading codes applied to the mobile station 1 and the mobile station 2 are orthogonal codes.

Figure 38:
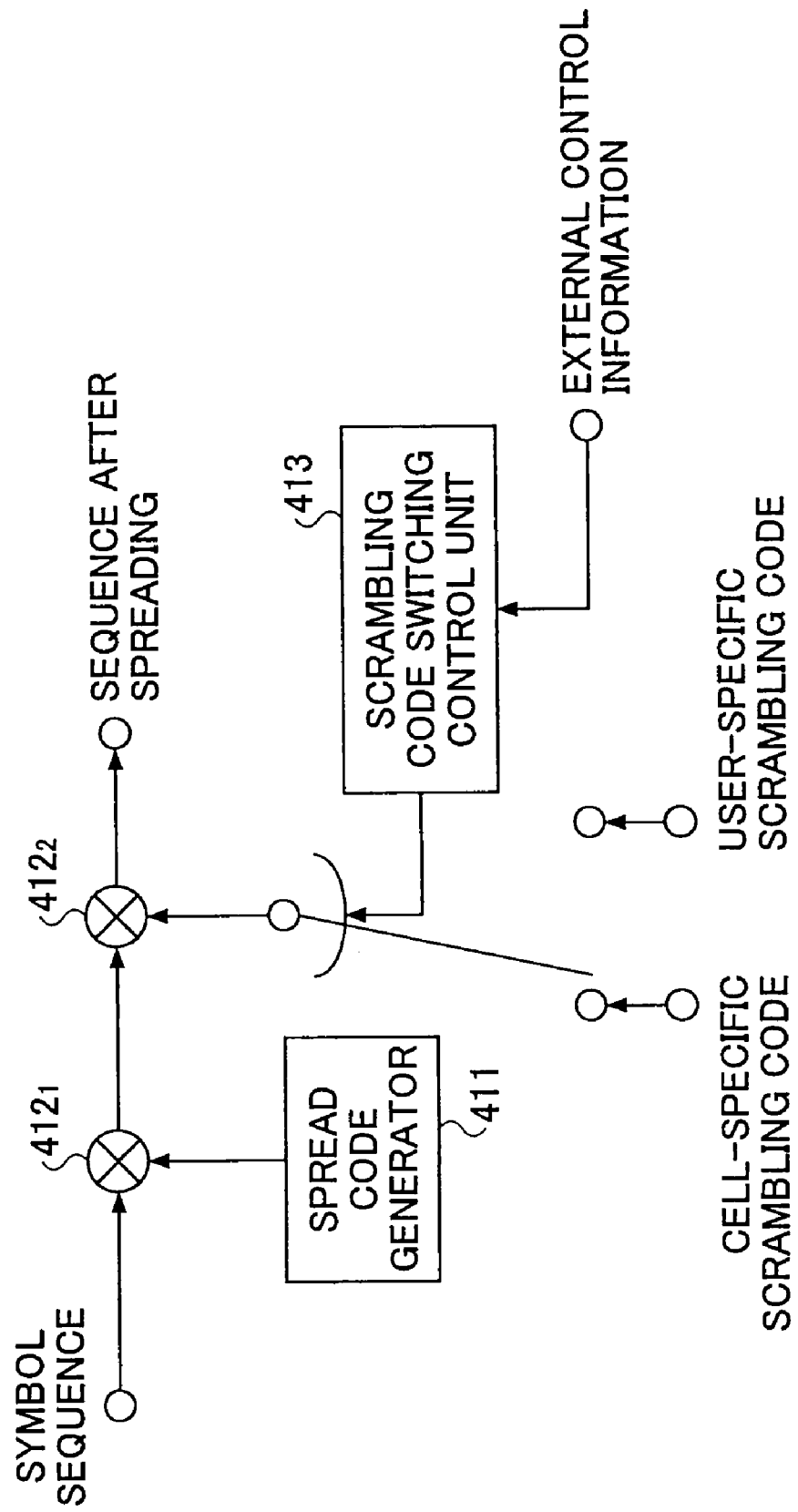
FIG. 38 is a schematic diagram of an exemplary configuration of a mobile station according to a seventh embodiment which changes scrambling code based on a set of controlling information from an outside source.

Furthermore, in the wireless transmission system according to the present embodiment, the mobile station comprises a function of changing the scrambling code multiplied to the spreading chip sequence. The mobile station as described above, is configured, for example, as in FIG. 38, having the chip-repetition unit omitted as compared with the mobile station according to the sixth embodiment as illustrated in FIG. 22. Therefore, herein such description is omitted.

As described above, according to the wireless transmission system according to the seventh embodiment, the mobile station enables an omission of the chip repetition process by applying the strict transmission timing control.

A Eighth Embodiment

While in the sixth embodiment as described above an exemplary form of removing the interfering signal from other mobile stations with a combined use of the chip repetition and the transmission timing control and in the seventh embodiment an exemplary form of removing the interfering signal from other mobile stations by applying the strict transmission timing control are described, a wireless transmission system according to the present embodiment comprises a function of variably controlling the number of chip repetitions and the spreading factor based on the controlling information reported from the base station in a case of applying chip repetition and transmission timing control in an isolated cell environment.

Figure 39:
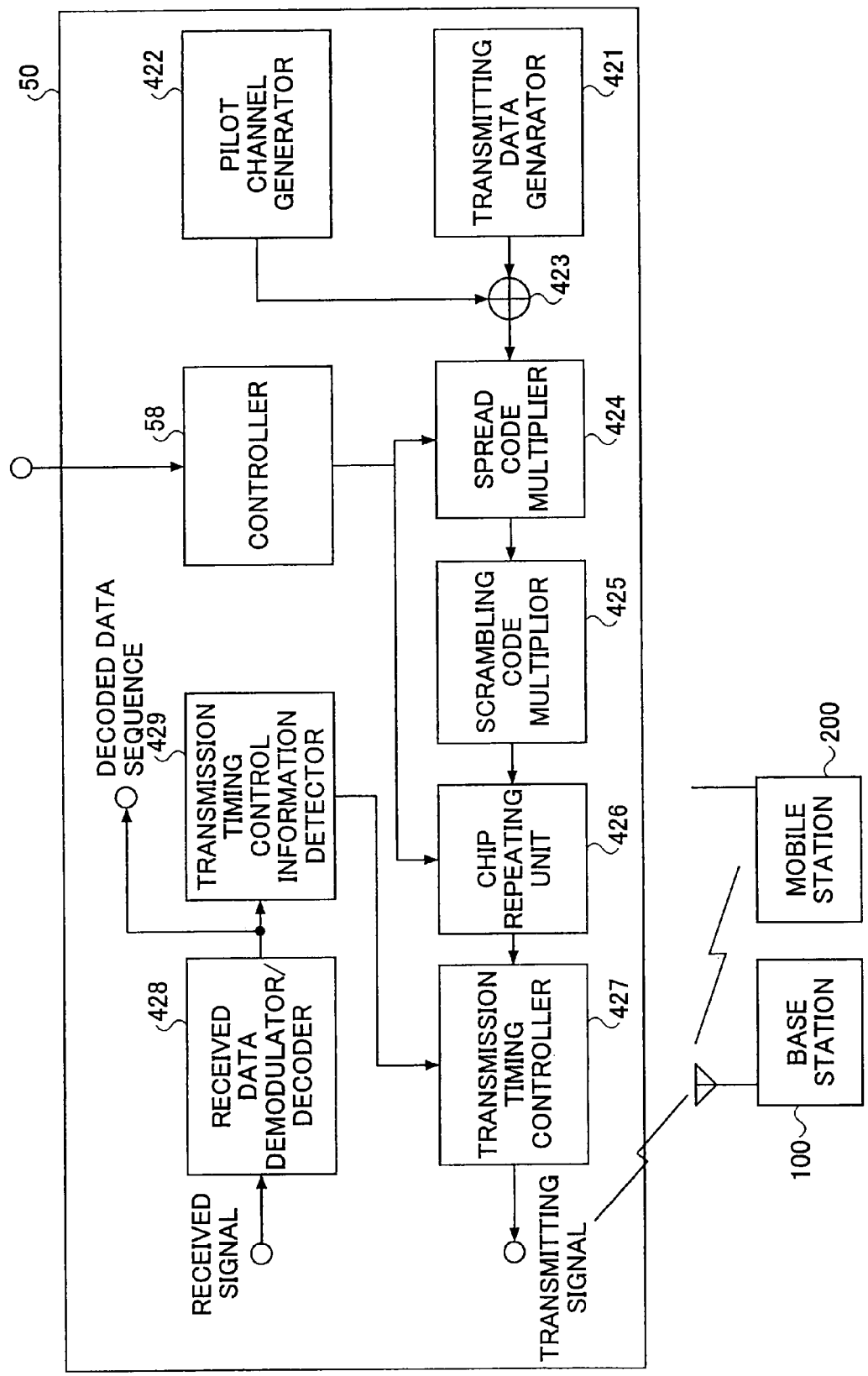
FIG. 39 is a schematic diagram of an overall configuration of a wireless transmission system and a configuration of a mobile station according to an eighth embodiment.
Figure 40:
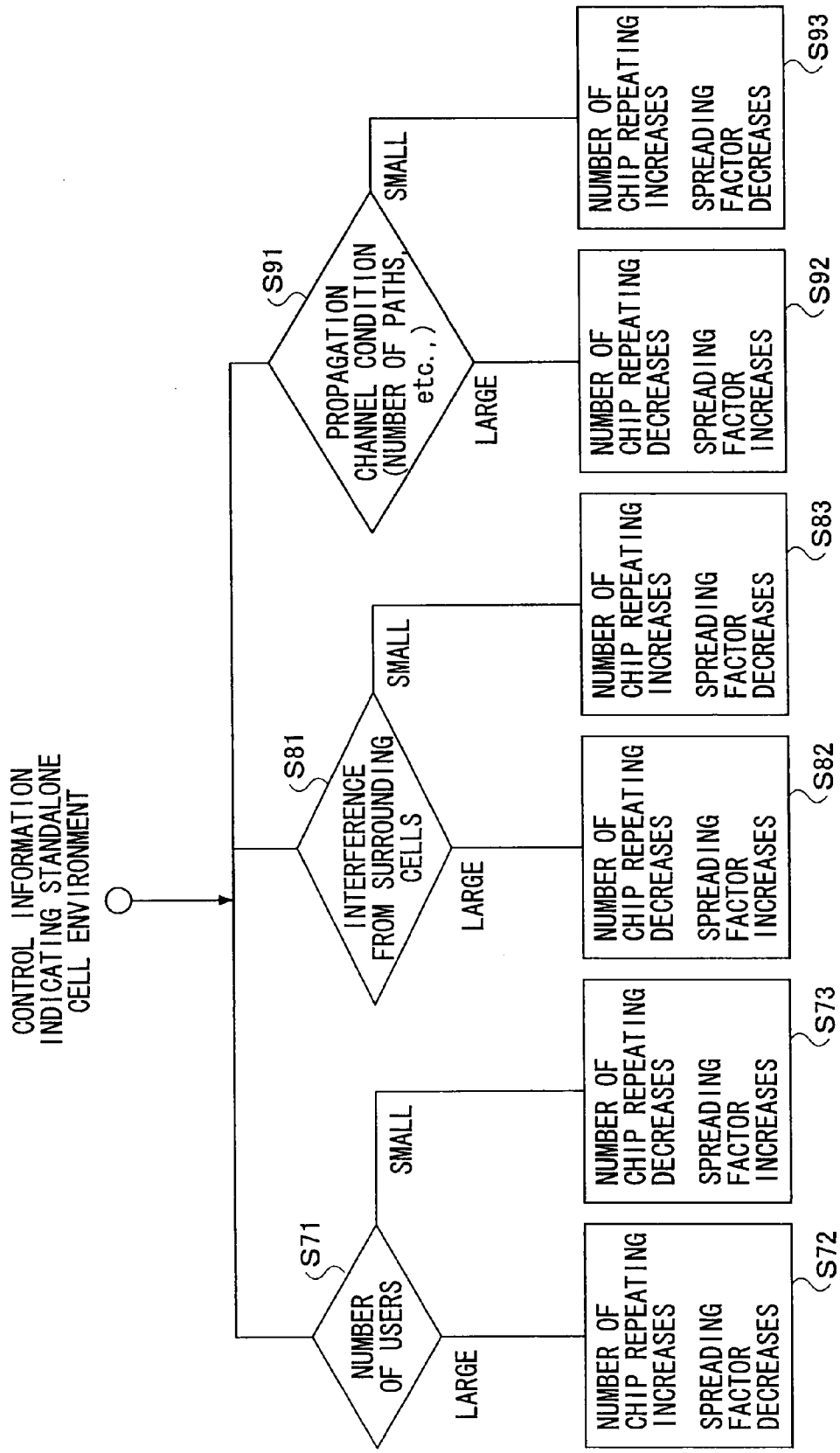
FIG. 40 is a flowchart which illustrates an operational procedure of a mobile station according to an eighth embodiment.

FIG. 39 is a schematic diagram of an overall configuration of a wireless transmission system and a configuration of a mobile station according to the present embodiment. The controller 58 which is an element specific to the mobile station 50 variably controls the number of chip repetitions and the spreading factor based on one of the controlling information indicating the number of mobile stations (mobile station 200 in the present example) simultaneously connected to the base station transmitted from the base station 100 as an external apparatus, the controlling information indicating the power of interference from surrounding cells, and the controlling information indicating the propagation channel conditions (for example, the number of multi-paths). More specifically, the process is performed according to the flowchart as illustrated in FIG. 40. Besides, it is assumed that the controller according to the present embodiment has already received from the base station 100 the controlling information indicating the isolated cell environment.

Below an operation of the mobile station as described above is described, referring to the flowchart in FIG. 40.

(1) A Case of Indicating the Number of Simultaneously-Accessing Users

Besides, in FIG. 40, the number of users and the number of mobile stations have the same meaning.

In FIG. 40, in S71, the mobile station receives the number of mobile stations within the isolated cell simultaneously-connected to the base station so as to determine whether that number of mobile stations exceeds a predetermined threshold value. Moving on to S72 in a case that the number of mobile stations exceeds a predetermined threshold value so as to be determined as "having a large number of simultaneously-accessing users" (large in S71), the variable controlling which increases the number of chip repetitions while decreasing the spreading factor by an amount corresponding to the amount of the increase as described above is performed. In other words, in an isolated cell environment, with a large number of simultaneously-accessing users, the number of simultaneously-accessing users is made frequency-domain orthogonal so as to reduce multiple access-interference. Hereby, high spectral usage efficiency is enabled.

On the other hand, moving on to S73 in a case that the number of mobile stations is determined not to exceed a predetermined threshold value (small in S71), the variable controlling which decreases the number of chip repetition while decreasing the spreading factor by an amount corresponding to the amount of the decrease as described above is performed. In other words, in an isolated cell environment, the effect of multiple-access interference becomes relatively small with a smaller number of simultaneously-accessing users. Therefore, an increase in the spreading factor enables improvement in the interference immunity so as to achieve higher spectral usage efficiency.

(2) A Case in which the Controlling Information from the Base Station Indicates the Power of Interference from the Surrounding Cells.

In FIG. 40, in S81, the mobile station receives the information indicating the power level of interference from surrounding cells so as to determine whether that power level of interference from surrounding cells exceeds a predetermined threshold value. Moving on to S82 in a case that the power of interference from surrounding cells exceeds a predetermined threshold value (large in S81), the variable controlling which decreases the number of chip repetition while increasing the spreading factor by an amount corresponding to the amount of the decrease as described above is performed. In other words, in an isolated cell environment, with a larger power of interference from surrounding cells, an increase in the spreading factor increases the neighboring-cell interference immunity. Hereby, higher spectral usage efficiency is enabled.

On the other hand, moving on to S83 in a case that the power of interference from surrounding cells is determined not to exceed a predetermined threshold value (small in S81), the variable controlling which increases the number of chip repetitions while decreasing the spreading factor by an amount corresponding to the amount of the increase as described above is enabled. In other words, in an isolated cell environment, as the effect of intra-cell multiple-access interference is predominant with a small power level of interference from surrounding cells, a reduction of multiple-access interference is enabled by setting a number of simultaneously-accessing users frequency-domain orthogonal. Hereby, high spectral usage efficiency is enabled.

(3) A Case in which the Controlling Information from the Base Station Indicates the Propagation Channel Conditions (Such as the Number of Multi-Paths)

In FIG. 40, in S91, the mobile station receives the information indicating the propagation channel conditions such as the number of paths so as to determine whether that number of paths exceeds a predetermined threshold value. Moving on to S92 in a case that the number of paths exceeds a predetermined threshold value (large in S91), the variable controlling which decreases the number of chip repetitions while increasing the spreading factor by an amount corresponding to the amount of the decrease as described above is performed. In other words, in an isolated cell environment, with a large number of paths, an increase in the spreading factor enables an obtaining of an increased multiple interference immunity.

On the other hand, moving on to S93 in a case that the number of paths is determined not to exceed a predetermined threshold value (small in S91), the variable controlling which increases the number of chip repetitions while decreasing the spreading factor by an amount corresponding to the amount of the increase as described above is performed. In other words, in an isolated cell environment, as the effect of multiple-access interference becomes relatively large with a small number of paths, a reduction of multiple-access interference is enabled by setting a number of simultaneously-accessing users frequency-domain orthogonal. Hereby, high spectral usage efficiency is enabled.

In the embodiment as described above, while an exemplary aspect is described in which the respective sets of information indicating the cell environment and of information indicating the number of users, the power of interference from surrounding cells, and the propagation channel conditions are individually received at the controller, it may of course comprise an aspect such that the set of information indicating the number of users, the power of interference from surrounding cells, and the propagation channel condition is received when the set of information indicating the cell environment is received.

A Ninth Embodiment

While an exemplary aspect of variably controlling the number of chip repetitions and the spreading factor at the mobile station in a case of applying chip repetition and transmission timing control in an isolated environment is described in the eighth embodiment, in the wireless transmission system according to the present embodiment, the mobile station comprises a function of determining whether a strict transmission timing control needs to be applied based on the controlling information reported from the base station regardless of the multi-cell/isolated cell environments.

Figure 41:
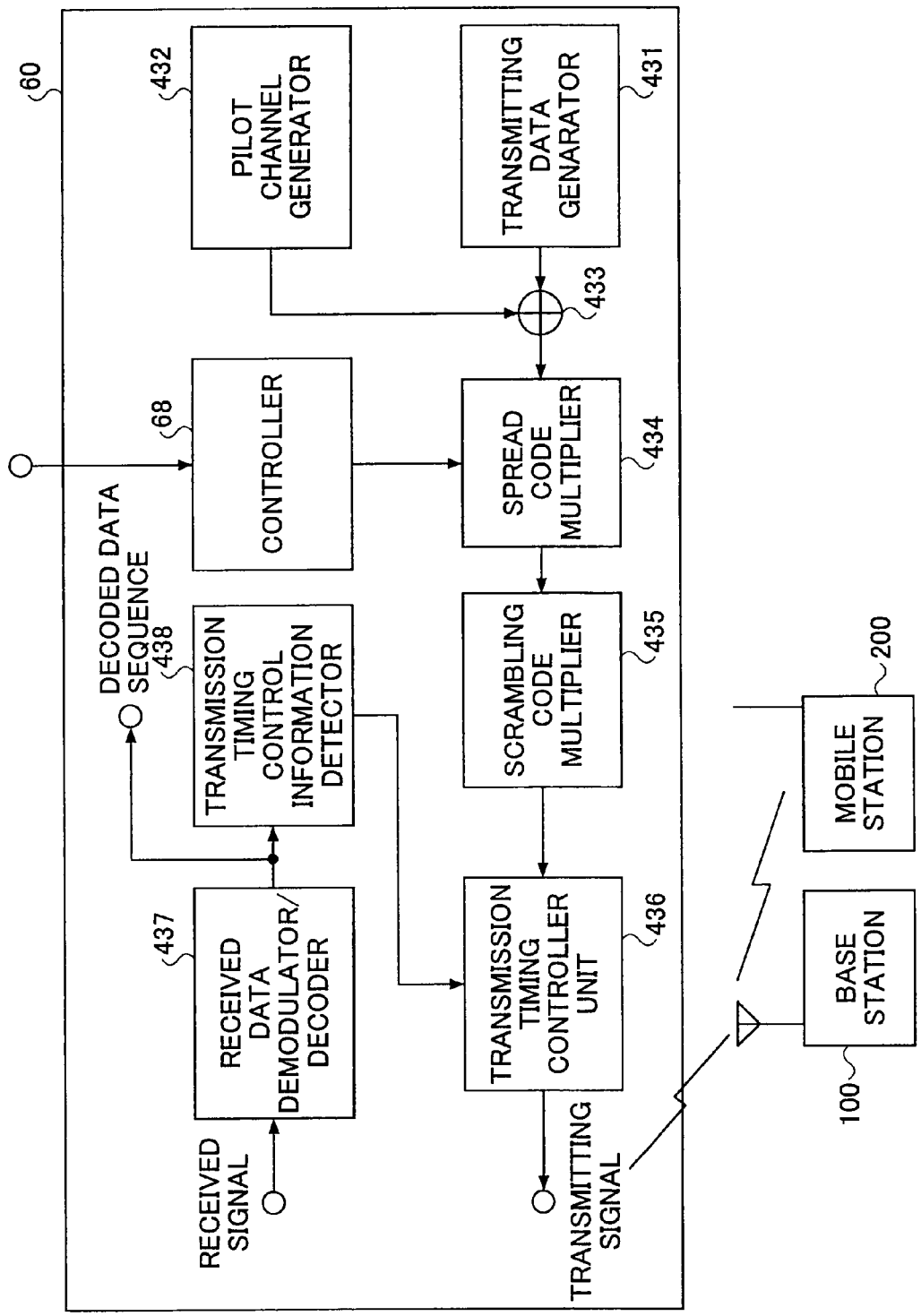
FIG. 41 is a schematic diagram of an overall configuration of a wireless transmission system and a configuration of a mobile station according to a ninth embodiment.
Figure 42:
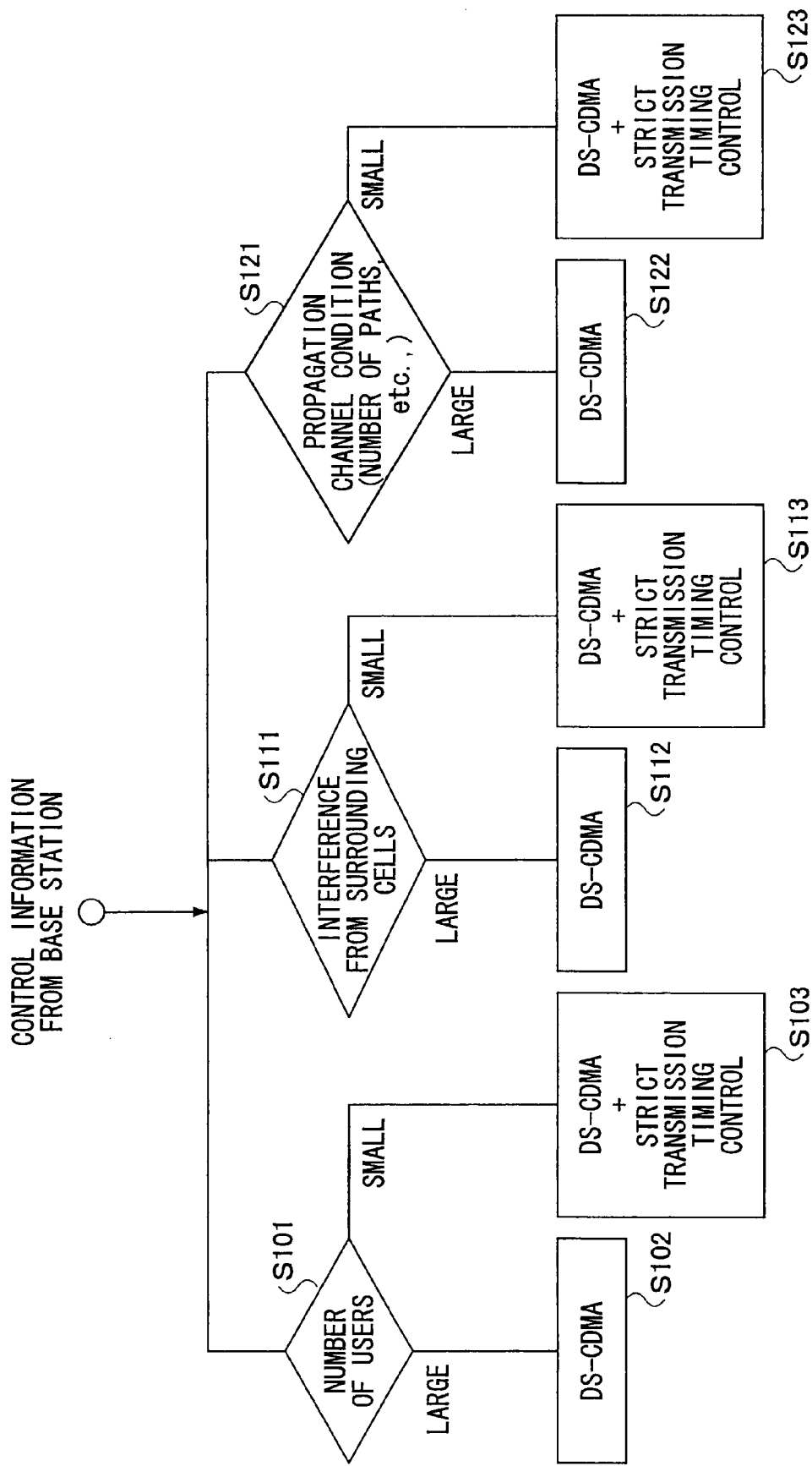
FIG. 42 is a flowchart which illustrates an operational procedure of a mobile station according to a ninth embodiment.
Figure 43B:
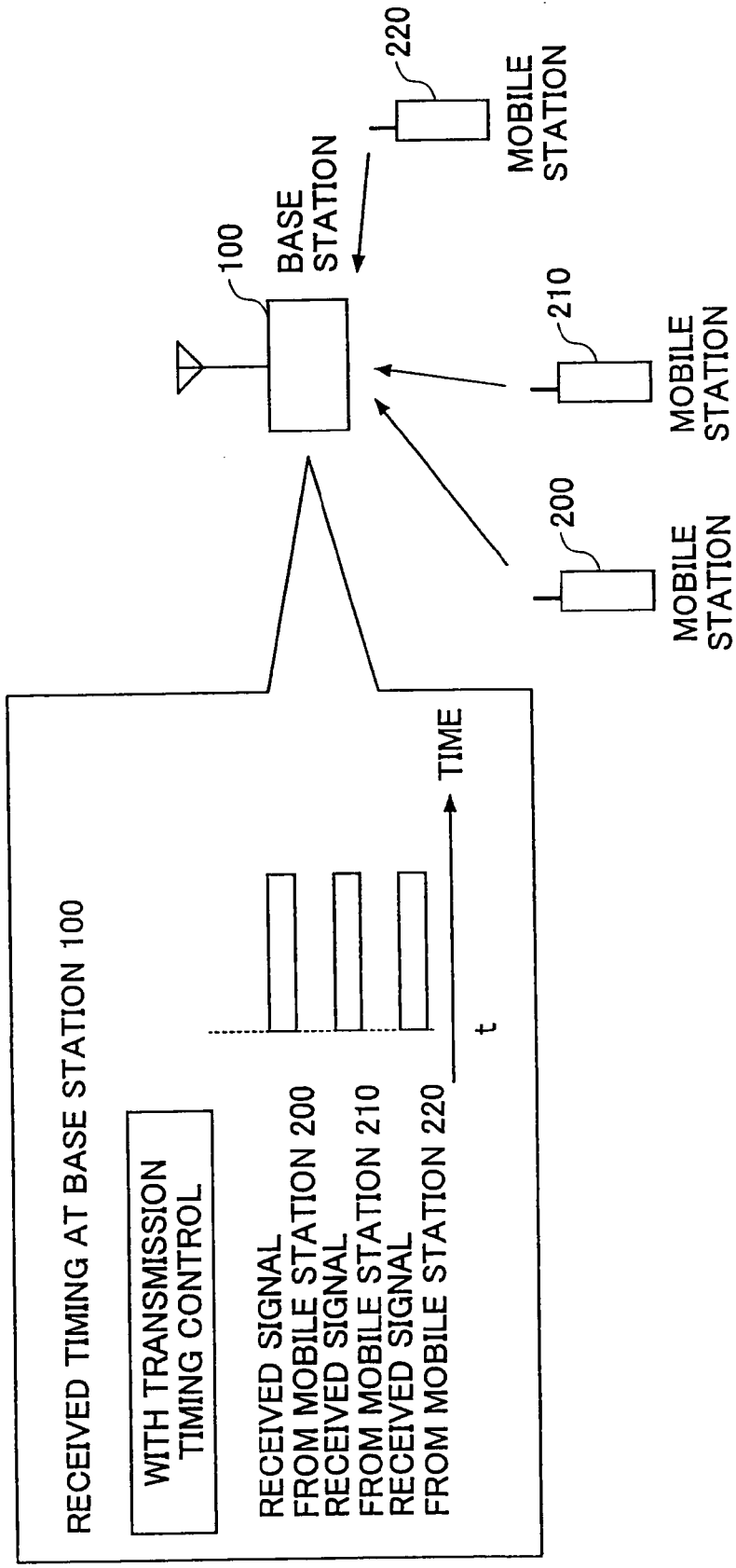

FIG. 41 is a schematic diagram of an overall configuration of a wireless transmission system and a configuration of a mobile station 60 according to the present embodiment. The controller 68 which is an element specific to the mobile station 60 determines whether the strict transmission timing control needs to be executed based on one of the sets of information indicating the number of mobile stations (mobile station 200 in the present example) simultaneously connected to the base station transmitted from the base station 100 as the external apparatus, controlling information indicating the power of interference from surrounding cells, and controlling information indicating the propagation channel condition (for example, the number of multi-paths). More specifically, the process is performed according to the flowchart as illustrated in FIG. 42.

(1) A Case in which the Controlling information from the Base Station Indicates the Number of Simultaneously-Accessing Users In FIG. 41, in S101, the mobile station receives the number of mobile stations simultaneously-connected to the base station so as to determine whether that number of mobile stations exceeds a predetermined threshold value. Moving on to S102 in a case that the number of mobile stations exceeds a predetermined threshold value so as to be determined as "having a large number of simultaneously-accessing users" (large in S101), no strict transmission timing control is performed so that the same operations as the related-art DS-CDMA are performed. In other words, with a large number of users, the effect of performing the strict transmission timing control diminishes so as not to apply such controlling.

On the other hand, moving on to S103 in a case that the number of mobile stations is determined not to exceed a predetermined threshold value (less in S101), the combined use of the related-art DS-CDMA and the strict transmission timing control is applied. In other words, with a large number of users, the effect of performing strict transmission timing control enhances so as to apply such controlling.

(2) A Case in which the Controlling Information from the Base Station Indicates the Power of Interference from the Surrounding Cells In FIG. 41, in S111, the mobile station receives the information indicating the power level of interference from surrounding cells so as to determine whether that power level of interference from surrounding cells exceeds a predetermined threshold value. Moving on to S112 in a case that the power of interference from surrounding cells exceeds a predetermined threshold value (large in S111), no strict transmission timing control is performed so as to perform the related-art DS-CDMA operations. In other words, with a large power of interference from surrounding cells, the effect of performing the strict transmission timing control diminishes so as not to apply such controlling.

On the other hand, moving on to S113 in a case that the power of interference from surrounding cells is determined in S111 not to exceed a predetermined threshold value (small in S111), the combined use of the related-art DS-CDMA and the strict transmission timing control is applied. In other words, with a large power of interference from surrounding cells, the effect of performing strict transmission timing control enhances so as to apply such controlling.

(3) A Case in which the Controlling Information from the Base Station Indicates the Propagation Channel Conditions (Such as the Number of Multi-Paths)

In FIG. 41, in S121, the mobile station receives the information indicating the propagation channel conditions such as the number of paths so as to determine whether that number of paths exceeds a predetermined threshold value. Moving on to S122 in a case that the number of paths exceeds a predetermined threshold value (large in S121), no strict transmission timing control is performed so that the related-art DS-CDMA operations are performed. In other words, with a large number of paths, the effect of performing the strict transmission timing control diminishes so as not to apply such controlling.

On the other hand, moving on to S123 in a case that the number of paths is determined in S121 not to exceed a predetermined threshold value (less in S121), the combined use of the related-art DS-CDMA and the strict transmission timing control is applied. In other words, with a small number of users, the effect of performing strict transmission timing control enhances so as to apply such controlling.

In the seventh and the eighth embodiments as described above, while exemplary aspects are described in which the determination of whether the number of users is large or small is performed at the controller of the mobile station side, it may comprise an aspect of determining the number of users at the base station side so as to report such determined result to the mobile station.

As described above, according to the ninth wireless transmission system, the mobile station controls the number of chip repetitions and the spreading factor in accordance with such conditions as the number of users, the power of interference from surrounding cells, and the propagation channel. Hereby, the mobile station enables suppressing interference to a minimum level so as to improve as a result the spectral usage efficiency.

A Tenth Embodiment

In the wireless transmission system according to the present embodiment, the mobile station comprises a function of switching the operational modes based on the cell environment reported from the base station.

(An Operational Mode 1)
Multi-Cell Environment: DS-CDMA
Isolated cell environment: Based on DS-CDMA, the transmitter applies chip repetition and loose transmission timing control, while the receiver removes the own station multi-path signal by applying the multi-path interference canceller, the chip equalizer, and the frequency-domain equalizer as illustrated in FIG. 44 through FIG. 46.

(An Operational Mode 2)
Multi-cell environment: Based on DS-CDMA, the transmitter applies strict transmission timing control and the cell-specific scrambling code.
Isolated cell environment: Based on DS-CDMA, the transmitter applies chip repetition and loose transmission timing control, while the receiver removes the own station multi-path signal by applying the multi-path interference canceller, the chip equalizer, and the frequency-domain equalizer as illustrated in FIG. 44 through FIG. 46.

(An Operational Mode 3)
Multi-cell environment: Based on DS-CDMA, the transmitter applies strict transmission timing control and the cell-specific scrambling code.
Isolated cell environment: Based on DS-CDMA, the transmitter applies strict transmission timing control and the cell-specific scrambling code.

(An Operational Mode 4)
Multi-Cell Environment: DS-CDMA
Isolated cell environment: Based on DS-CDMA, the transmitter applies strict transmission timing control and the cell-specific scrambling code.

As described above, using the wireless transmission system according to the tenth embodiment, the mobile station uses the controlling information indicating the cell environments as described above to switch the operational modes based on the cell environment. Hereby, the mobile station enables an efficient reduction of interference so as to improve the spectral usage efficiency.

(A Variation)

While the above embodiments describe the forms of controlling the transmission timings of the transmitting signals at the mobile stations so as to set the received timings at the base station coincide among the mobile stations, the present invention would not only be limited to the above embodiments, but also may comprise a variety of variations.

Furthermore in the network environment built temporarily on demand (referred to as an ad-hoc network), in a case of a terminal A and a terminal B having a small propagation delay time difference so as to be enabled to communicate directly, the terminal A receives a transmission timing control information from the base station so as to report the transmission timing control information as described above by this terminal A communicating with the terminal B. Hereby, the base station is enabled an omission of the process of transmitting a controlling signal to a mobile station neighboring a mobile station to be a target of transmission timing control so as to efficiently utilize the wireless resources.

What is claimed is:

1. A mobile station for wirelessly transmitting to a base station by Direct Sequence-Code Division Multiple Access (DS-CDMA) a signal which is spread by multiplying a spreading code, comprising:
   a high-precision transmission timing control unit configured to control transmitting timings of transmitting signals so that a time difference at the base station among timings of receiving from a plurality of mobile stations approaches zero; and
   a determining unit configured to determine whether to conduct transmitting timing control by the high-precision transmitting timing control unit based on at least one of an information set including a number of mobile stations simultaneously connected to the base station, the information set being reported from an outside source, the information set also including an interference power from surrounding cells and a propagation channel condition.

2. A method of wireless transmission, wherein a mobile station which wirelessly transmits to a base station by Direct Sequence-Code Division Multiple Access (DS-CDMA) a signal which is spread by multiplying a spreading code, the method comprising:
   controlling transmission timings of transmitting signals so that a time difference at the base station among timings of receiving from a plurality of mobile stations approaches zero; and
   determining whether to conduct transmitting timing control by the controlling based on at least one of an information set including a number of mobile stations simultaneously connected to the base station, the information set being reported from an outside source, the information set also including an interference power from surrounding cells and a propagation channel condition.

3. The method according claim 2, wherein the controlling transmission timing includes increasing a number of chip repeating and decreasing a spreading factor if the number of mobile stations simultaneously connected to the base station exceeds a threshold.

4. The method according claim 2, wherein the controlling transmission timing includes decreasing a number of chip repeating and increasing a spreading factor if the interference power from surrounding cells exceeds a threshold.

5. The method according claim 2, wherein the propagation channel condition includes a number of multi-paths.

6. The method according claim 5, wherein the controlling transmission timing includes decreasing a number of chip repeating and increasing a spreading factor if the number of multi-paths exceeds a threshold.

7. The mobile station according claim 1, wherein the high-precision transmission timing control unit increases a number of chip repeating and decreases a spreading factor if the number of mobile stations simultaneously connected to the base station exceeds a threshold.

8. The mobile station according claim 1, wherein the high-precision transmission timing control unit decreases a number of chip repeating and increases a spreading factor if the interference power from surrounding cells exceeds a threshold.

9. The mobile station according claim 1, wherein the propagation channel condition includes a number of multi-paths.

10. The mobile station according claim 9, wherein the high-precision transmission timing control unit decreases a number of chip repeating and increases a spreading factor if the number of multi-paths exceeds a threshold.

* * * * *